(12) United States Patent
Dollens

(10) Patent No.: US 10,614,513 B2
(45) Date of Patent: Apr. 7, 2020

(54) METHOD AND SYSTEM FOR MANAGING AND DISPLAYING PRODUCT IMAGES WITH PROGRESSIVE RESOLUTION DISPLAY

(71) Applicant: Joseph R. Dollens, Chicago, IL (US)

(72) Inventor: Joseph R. Dollens, Chicago, IL (US)

( * ) Notice: Subject to any disclaimer, the term of this patent is extended or adjusted under 35 U.S.C. 154(b) by 375 days.

(21) Appl. No.: 15/632,438

(22) Filed: Jun. 26, 2017

(65) Prior Publication Data

US 2017/0293971 A1    Oct. 12, 2017

Related U.S. Application Data

(63) Continuation-in-part of application No. 14/047,581, filed on Oct. 7, 2013, now Pat. No. 9,691,098, which
(Continued)

(51) Int. Cl.
| | |
|---|---|
| *G06Q 30/00* | (2012.01) |
| *G06Q 30/06* | (2012.01) |
| *G06F 3/147* | (2006.01) |
| *G06F 3/0484* | (2013.01) |
| *G06T 11/60* | (2006.01) |

(Continued)

(52) U.S. Cl.
CPC ..... *G06Q 30/0643* (2013.01); *G06F 3/04842* (2013.01); *G06F 3/147* (2013.01); *G06F 16/9558* (2019.01); *G06Q 30/06* (2013.01); *G06Q 30/0601* (2013.01); *G06Q 30/0603* (2013.01); *G06Q 30/0623* (2013.01);
(Continued)

(58) Field of Classification Search
CPC .............. G06Q 30/0643; G06Q 30/06; G06Q 30/0623; G06Q 30/0603; G06Q 30/0601; G06Q 30/0633; G06T 15/04; G06T 11/60; G06T 2210/36; G06F 16/9558; G06F 3/04842; G06F 3/147
See application file for complete search history.

(56) References Cited

U.S. PATENT DOCUMENTS

| | | |
|---|---|---|
| 4,779,135 A | 10/1988 | Judd |
| 5,181,745 A | 1/1993 | Jacobsen |
| | (Continued) | |

OTHER PUBLICATIONS

"Adobe's New View," by Ron Pacchiano, Computer Shopper 19.4: 346 (1), Apr. 1999) (Year: 1999).*
(Continued)

*Primary Examiner* — Anne M Georgalas
(74) *Attorney, Agent, or Firm* — Lesavich High-Tech Law Group, S.C.; Stephen Lesavich

(57) ABSTRACT

A method and system displaying and managing images of consumer products with cloud computing. One or more consumer products are selected. An N-layer digital image is created that includes an M-layer hierarchy of vector images and/or visual overlays stored in one or more cloud storage objects in progressive resolution format and allows progressive resolution display without loss of image quality on the selected plural consumer products that appear in the N-layer digital image. Selected consumer products are placed in a graphical shopping cart/bag that provides progressive resolution display directly from the graphical shopping cart/bag and allows new or different consumer products to be selected directly from the graphical shopping cart/bag.

17 Claims, 32 Drawing Sheets

Related U.S. Application Data is a continuation-in-part of application No. 12/984,685, filed on Jan. 5, 2011, now Pat. No. 8,554,639, which is a continuation-in-part of application No. 11/820,342, filed on Jun. 19, 2007, now Pat. No. 8,260,689.

(60) Provisional application No. 60/819,456, filed on Jul. 7, 2006.

(51) Int. Cl.
G06F 16/955 (2019.01)
G06T 15/04 (2011.01)

(52) U.S. Cl.
CPC .......... *G06Q 30/0633* (2013.01); *G06T 11/60* (2013.01); *G06T 15/04* (2013.01); *G06T 2210/36* (2013.01)

(56) References Cited

U.S. PATENT DOCUMENTS

| | | | |
|---|---|---|---|
| 5,451,998 A | 9/1995 | Hamrick | |
| 5,680,528 A | 10/1997 | Korszun | |
| 5,715,331 A * | 2/1998 | Hollinger | G06T 3/403 |
| | | | 382/199 |
| 5,726,898 A | 3/1998 | Jacobs | |
| 5,768,142 A | 6/1998 | Jacobs | |
| 5,848,399 A | 12/1998 | Burke | |
| 5,897,622 A | 4/1999 | Blinn | |
| 5,970,471 A | 10/1999 | Hill | |
| 5,983,200 A | 11/1999 | Slotznick | |
| 5,986,670 A | 11/1999 | Dries | |
| 6,026,377 A | 2/2000 | Burke | |
| 6,058,373 A | 5/2000 | Blinn | |
| 6,108,640 A | 8/2000 | Slotznick | |
| 6,137,498 A * | 10/2000 | Silvers | G06T 11/00 |
| | | | 345/629 |
| 6,304,855 B1 | 10/2001 | Burke | |
| 6,344,853 B1 * | 2/2002 | Knight | G06Q 10/087 |
| | | | 345/629 |
| 6,466,975 B1 | 10/2002 | Sterling | |
| 6,484,150 B1 | 11/2002 | Blinn | |
| 6,532,345 B1 | 3/2003 | Gluck | |
| 6,587,835 B1 | 7/2003 | Treyz | |
| 6,625,581 B1 | 9/2003 | Perkowski | |
| 6,629,135 B1 | 9/2003 | Ross, Jr. | |
| 6,634,550 B1 | 10/2003 | Walker | |
| 6,658,424 B1 | 12/2003 | Boehm | |
| 6,698,943 B2 | 3/2004 | Gluck | |
| 6,728,706 B2 | 4/2004 | Aggarwal | |
| 6,751,620 B2 | 6/2004 | Orbanes et al. | |
| 6,879,322 B2 | 4/2005 | Iida | |
| 6,912,293 B1 | 6/2005 | Korobkin | |
| 6,917,853 B2 | 7/2005 | Chirnomas | |
| 6,937,755 B2 | 8/2005 | Orpaz | |
| 6,961,712 B1 | 11/2005 | Perkowski | |
| 6,975,937 B1 | 12/2005 | Kantarjiev | |
| 6,976,028 B2 | 12/2005 | Fenton | |
| 6,980,962 B1 | 12/2005 | Arganbright | |
| 6,985,876 B1 | 1/2006 | Lee | |
| 6,985,897 B1 | 1/2006 | Abrahams | |
| 6,993,572 B2 | 1/2006 | Ross, Jr. | |
| 7,003,526 B1 | 2/2006 | Lee | |
| 7,016,865 B1 | 3/2006 | Weber | |
| 7,065,520 B2 | 6/2006 | Langford | |
| 7,077,581 B2 | 7/2006 | Gluck | |
| 7,084,838 B2 | 8/2006 | Yoon | |
| 7,091,931 B2 | 8/2006 | Yoon | |
| 7,111,252 B1 * | 9/2006 | Harris | G06F 17/5018 |
| | | | 715/851 |
| 7,127,261 B2 | 10/2006 | Van Erlach | |
| 7,127,415 B1 | 10/2006 | Verchere | |
| 7,139,006 B2 | 11/2006 | Wittenburg | |
| 7,139,721 B2 | 11/2006 | Borders | |
| 7,149,754 B2 | 12/2006 | Miller | |
| 7,149,984 B1 | 12/2006 | Rock | |
| 7,156,306 B1 | 1/2007 | Kenney | |
| 7,158,878 B2 | 1/2007 | Rasmussen et al. | |
| 7,168,617 B2 | 1/2007 | Walker | |
| 7,177,825 B1 | 2/2007 | Borders | |
| 7,178,108 B1 | 2/2007 | Workman | |
| 7,188,333 B1 | 3/2007 | LaMotta | |
| 7,190,825 B2 | 3/2007 | Yoon | |
| 7,196,733 B2 | 3/2007 | Aratani | |
| 7,197,479 B1 | 3/2007 | Franciscus de Heer | |
| 7,216,092 B1 | 5/2007 | Weber | |
| 7,228,283 B1 | 6/2007 | Hornstein | |
| 7,233,914 B1 | 6/2007 | Wijaya | |
| 7,249,708 B2 | 7/2007 | McConnell | |
| 7,269,571 B2 | 9/2007 | Kar | |
| 7,272,577 B1 | 9/2007 | LaMotta | |
| 7,283,650 B1 | 10/2007 | Sharma | |
| 7,284,007 B1 | 10/2007 | Franciscus de Heer | |
| 7,308,423 B1 | 12/2007 | Woodward | |
| 7,599,790 B2 | 10/2009 | Rasmussen et al. | |
| 7,616,834 B2 | 11/2009 | Kramer et al. | |
| 8,260,689 B2 | 9/2012 | Dollens | |
| 8,341,141 B2 | 12/2012 | Krislov | |
| 8,363,806 B2 | 1/2013 | Bookstaff | |
| 8,463,765 B2 | 6/2013 | Lesavich | |
| 8,533,015 B2 | 9/2013 | Meegan | |
| 8,542,809 B2 | 9/2013 | Bookstaff | |
| 8,554,639 B2 | 10/2013 | Dollens | |
| 8,566,145 B2 | 10/2013 | Dollens | |
| 8,589,372 B2 | 11/2013 | Krislov | |
| 9,037,564 B2 | 5/2015 | Lesavich et al. | |
| 9,137,250 B2 | 9/2015 | Lesavich et al. | |
| 9,361,479 B2 | 6/2016 | Lesavich et al. | |
| 9,569,771 B2 | 2/2017 | Lesavich et al. | |
| 9,961,098 B2 | 5/2018 | Antony | |
| 2001/0010546 A1 * | 8/2001 | Chen | H04N 5/23293 |
| | | | 348/218.1 |
| 2001/0029465 A1 | 10/2001 | Strisower | |
| 2001/0037373 A1 | 11/2001 | Cambridge | |
| 2001/0047285 A1 | 11/2001 | Borders | |
| 2001/0050687 A1 | 12/2001 | Iida | |
| 2002/0002511 A1 | 1/2002 | Yim | |
| 2002/0004735 A1 | 1/2002 | Gross | |
| 2002/0035512 A1 | 3/2002 | Pavlik | |
| 2002/0055833 A1 | 5/2002 | Sterling | |
| 2002/0065737 A1 | 5/2002 | Aliabadi | |
| 2002/0071604 A1 | 6/2002 | Orpaz | |
| 2002/0072993 A1 | 6/2002 | Sandus et al. | |
| 2002/0077930 A1 | 6/2002 | Trubey | |
| 2002/0080163 A1 | 6/2002 | Morey | |
| 2002/0082952 A1 | 6/2002 | Johnston | |
| 2002/0087431 A1 | 7/2002 | Morishima | |
| 2002/0087583 A1 | 7/2002 | Morgan | |
| 2002/0099622 A1 | 7/2002 | Langhammer | |
| 2002/0103737 A1 | 8/2002 | Briere | |
| 2002/0120674 A1 | 8/2002 | Son | |
| 2002/0138481 A1 | 9/2002 | Aggarrwal | |
| 2002/0155878 A1 | 10/2002 | Lert | |
| 2002/0158916 A1 | 10/2002 | Gusler | |
| 2002/0169801 A1 | 11/2002 | Barnes | |
| 2002/0184104 A1 | 12/2002 | Litman | |
| 2002/0184359 A1 | 12/2002 | Keneko | |
| 2002/0194081 A1 | 12/2002 | Perkowski | |
| 2002/0194195 A1 | 12/2002 | Fenton | |
| 2002/0198785 A1 | 12/2002 | Chae | |
| 2002/0198791 A1 | 12/2002 | Perkowski | |
| 2003/0009392 A1 | 1/2003 | Perkowski | |
| 2003/0018777 A1 | 1/2003 | Miller | |
| 2003/0033237 A1 | 2/2003 | Bawri | |
| 2003/0083949 A1 | 5/2003 | Kar | |
| 2003/0083955 A1 | 5/2003 | Ookura | |
| 2003/0083961 A1 | 5/2003 | Bezos | |
| 2003/0093321 A1 | 5/2003 | Bodmer | |
| 2003/0093335 A1 * | 5/2003 | Silverbrook | G06Q 20/10 |
| | | | 705/26.1 |
| 2003/0098862 A1 * | 5/2003 | Hunt | G06T 17/00 |
| | | | 345/418 |
| 2003/0103070 A1 | 6/2003 | Tiongson | |

(56) References Cited

U.S. PATENT DOCUMENTS

| | | |
|---|---|---|
| 2003/0107643 A1 | 6/2003 | Yoon |
| 2003/0107645 A1 | 6/2003 | Yoon |
| 2003/0107646 A1 | 6/2003 | Yoon |
| 2003/0108236 A1 | 6/2003 | Yoon |
| 2003/0112326 A1 | 6/2003 | Yoon |
| 2003/0112328 A1 | 6/2003 | Yoon |
| 2003/0112508 A1 | 6/2003 | Yoon |
| 2003/0113012 A1 | 6/2003 | Yoon |
| 2003/0117395 A1 | 6/2003 | Yoon |
| 2003/0117396 A1 | 6/2003 | Yoon |
| 2003/0120534 A1 | 6/2003 | Giacchetti |
| 2003/0120562 A1 | 6/2003 | Clark |
| 2003/0122925 A1 | 7/2003 | Yoon |
| 2003/0126018 A1 | 7/2003 | LaMotta |
| 2003/0126139 A1 | 7/2003 | Lee |
| 2003/0139975 A1 | 7/2003 | Perkowski |
| 2003/0139996 A1 | 7/2003 | D'Antoni |
| 2003/0142236 A1 | 7/2003 | Aratani |
| 2003/0167206 A1 | 9/2003 | Shirai |
| 2003/0174178 A1 | 9/2003 | Hodges |
| 2003/0177072 A1 | 9/2003 | Bared |
| 2003/0200156 A1 | 10/2003 | Rozeman |
| 2003/0204447 A1 | 10/2003 | Dalzell |
| 2003/0204449 A1 | 10/2003 | Kotas |
| 2003/0212596 A1 | 11/2003 | DiPaolo |
| 2003/0227484 A1 | 12/2003 | Hao |
| 2004/0015408 A1 | 1/2004 | Rauen |
| 2004/0044627 A1 | 3/2004 | Russell |
| 2004/0049728 A1 | 3/2004 | Langford |
| 2004/0114801 A1 | 6/2004 | Boose et al. |
| 2004/0140352 A1 | 7/2004 | Walker |
| 2004/0143585 A1 | 7/2004 | Antener |
| 2004/0144472 A1 | 7/2004 | Cowie |
| 2004/0145660 A1 | 7/2004 | Kusaka |
| 2004/0148366 A1 | 7/2004 | Ross |
| 2004/0150657 A1 | 8/2004 | Wittenburg |
| 2004/0153371 A1 | 8/2004 | Razumov |
| 2004/0153378 A1 | 8/2004 | Perkowski |
| 2004/0186620 A1 | 9/2004 | Chirnomas |
| 2004/0199575 A1 | 10/2004 | Geller |
| 2004/0204063 A1 | 10/2004 | Van Erlach |
| 2004/0210479 A1 | 10/2004 | Perkowski |
| 2004/0232227 A1 | 11/2004 | Kusakawa |
| 2004/0250083 A1 | 12/2004 | Schwab |
| 2004/0260618 A1 | 12/2004 | Larson |
| 2005/0004838 A1 | 1/2005 | Perkowski |
| 2005/0010475 A1 | 1/2005 | Perkowski |
| 2005/0021472 A1 | 1/2005 | Gettmmn |
| 2005/0022139 A1 | 1/2005 | Gettmmn |
| 2005/0030309 A1 | 2/2005 | Gettmmn |
| 2005/0052469 A1* | 3/2005 | Crosby ............... G06F 16/9577 |
| | | 345/619 |
| 2005/0065855 A1 | 3/2005 | Geller |
| 2005/0071216 A1 | 3/2005 | Yoshitake |
| 2005/0086612 A1 | 4/2005 | Gettmmn |
| 2005/0097005 A1 | 5/2005 | Fargo |
| 2005/0102199 A1 | 5/2005 | Lee |
| 2005/0131837 A1 | 6/2005 | Sanctis |
| 2005/0156028 A1 | 7/2005 | Chirnomas |
| 2005/0162419 A1 | 7/2005 | Kim et al. |
| 2005/0165663 A1 | 7/2005 | Razumov |
| 2005/0167487 A1 | 8/2005 | Conlon |
| 2005/0188057 A1 | 8/2005 | Joo |
| 2005/0192873 A1 | 9/2005 | Roche |
| 2005/0203724 A1 | 9/2005 | Orpaz |
| 2005/0203809 A1 | 9/2005 | Stone |
| 2005/0229227 A1 | 10/2005 | Rogers |
| 2005/0246627 A1 | 11/2005 | Sayed |
| 2005/0251456 A1 | 11/2005 | Perkowski |
| 2005/0285876 A1* | 12/2005 | Balaga ................. G06T 3/0062 |
| | | 345/629 |
| 2006/0011716 A1 | 1/2006 | Perkowski |
| 2006/0050014 A1 | 3/2006 | Yoon |
| 2006/0085250 A1 | 4/2006 | Kantarjiev |
| 2006/0085277 A1 | 4/2006 | Arnston |
| 2006/0109283 A1 | 5/2006 | Shipman |
| 2006/0143095 A1* | 6/2006 | Sandus ................. G06Q 30/02 |
| | | 705/26.1 |
| 2006/0149721 A1 | 7/2006 | Langford |
| 2006/0175403 A1 | 8/2006 | Fossen McConnell |
| 2006/0178947 A1 | 8/2006 | Zsigmond |
| 2006/0179033 A1 | 8/2006 | Stanke |
| 2006/0179062 A1 | 8/2006 | Weber |
| 2006/0179076 A1 | 8/2006 | Weber |
| 2006/0190333 A1 | 8/2006 | Choi |
| 2006/0190348 A1 | 8/2006 | Ofer |
| 2006/0195325 A1 | 8/2006 | Tateson |
| 2006/0212361 A1 | 9/2006 | Perkowski |
| 2006/0218148 A1 | 9/2006 | Weber |
| 2006/0235764 A1 | 10/2006 | Bamborough |
| 2007/0016463 A1 | 1/2007 | Borders |
| 2007/0022020 A1 | 1/2007 | Bernstein |
| 2007/0033059 A1 | 2/2007 | Adkins |
| 2007/0035619 A1 | 2/2007 | Yoon |
| 2007/0055580 A1 | 3/2007 | Woodward |
| 2007/0088805 A1 | 4/2007 | Cyster |
| 2007/0112612 A1 | 5/2007 | Dollens |
| 2007/0112647 A1 | 5/2007 | Borders |
| 2007/0124110 A1 | 5/2007 | Tung |
| 2007/0124721 A1 | 5/2007 | Cowing |
| 2007/0125851 A1 | 6/2007 | Walker |
| 2007/0136149 A1 | 6/2007 | Woodward |
| 2007/0150368 A1 | 6/2007 | Arora |
| 2007/0150370 A1 | 6/2007 | Staib |
| 2007/0162353 A1 | 7/2007 | Borders |
| 2007/0174089 A1 | 7/2007 | Koo |
| 2007/0174144 A1 | 7/2007 | Borders |
| 2007/0205596 A1 | 9/2007 | Mizuno |
| 2007/0213948 A1 | 9/2007 | Hornstein |
| 2007/0226082 A1 | 9/2007 | Leal |
| 2007/0228169 A1 | 10/2007 | Kenney |
| 2007/0250403 A1 | 10/2007 | Altschuler |
| 2007/0250478 A1 | 10/2007 | Copperman |
| 2007/0250492 A1 | 10/2007 | Angel |
| 2007/0260520 A1 | 11/2007 | Jha |
| 2007/0282693 A1 | 12/2007 | Staib |
| 2007/0299740 A1 | 12/2007 | Kar |
| 2007/0299784 A1 | 12/2007 | Kar |
| 2008/0010169 A1 | 1/2008 | Dollens |
| 2011/0145286 A1 | 6/2011 | LaRowe |
| 2011/0208710 A1 | 8/2011 | Lesavich |
| 2012/0278622 A1 | 11/2012 | Lesavich et al. |
| 2014/0189792 A1 | 7/2014 | Lesavich et al. |
| 2015/0379301 A1 | 12/2015 | Lesavich et al. |
| 2016/0321654 A1 | 11/2016 | Lesavich et al. |

OTHER PUBLICATIONS

"A Model of the Relationship Among Consumer Trust, Web Design, and User Attributes," by Zhang, Xiaoni; Prybutok, Victor R.; Ryan, Sherry; and Pavur, Robert, Journal of Organizational and End User Computing, vol. 21, Issue 2, Apr.-Jun. 2009, pp. 44-66.

W3C Geospatial Vocabulary, W3C Incubator Group Report, Oct. 23, 2007, www.w3.org/2005/Incubator/gro/XGR-geo-20071023/ (14 pages).

W3C Image Annotation on the Semantic Web, W3C Incubator Group Report Aug. 14, 2007, www.w3.org/2005/Incubator/mmsem/XGR-image-annotation200708141 (33 pages).

"Designing a virtual exhibition using Scalable Vector Graphics," by Dion Hoe-Lian Goh and Julie Chih-Ee Wang, Aslib Proceedings: New Information Perspectives, vol. 56, No. 3, 2004, pp. 144-155.

Ace Media Visual Resources, Ace Media (FP6-001765), 2004 www.acemedia.org/aceMedia/reference/resource/index.html (2 pages) (referenced by W3C Image Annotation on the Semantic Web).

* cited by examiner

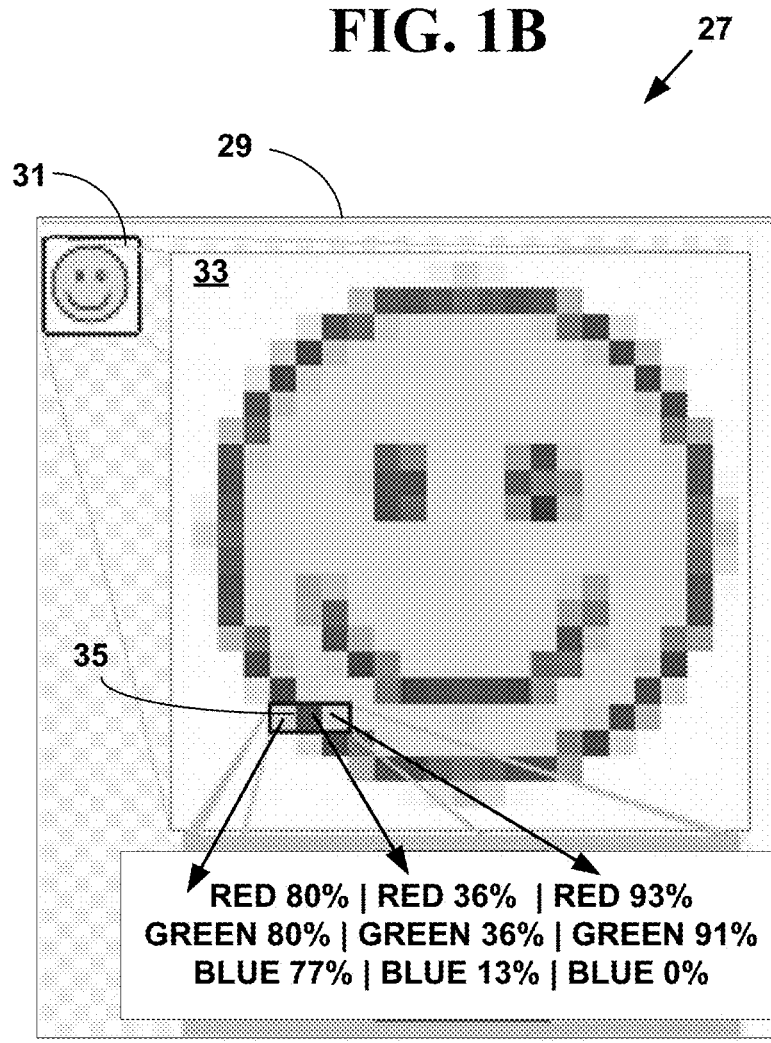

BITMAP/RASTER

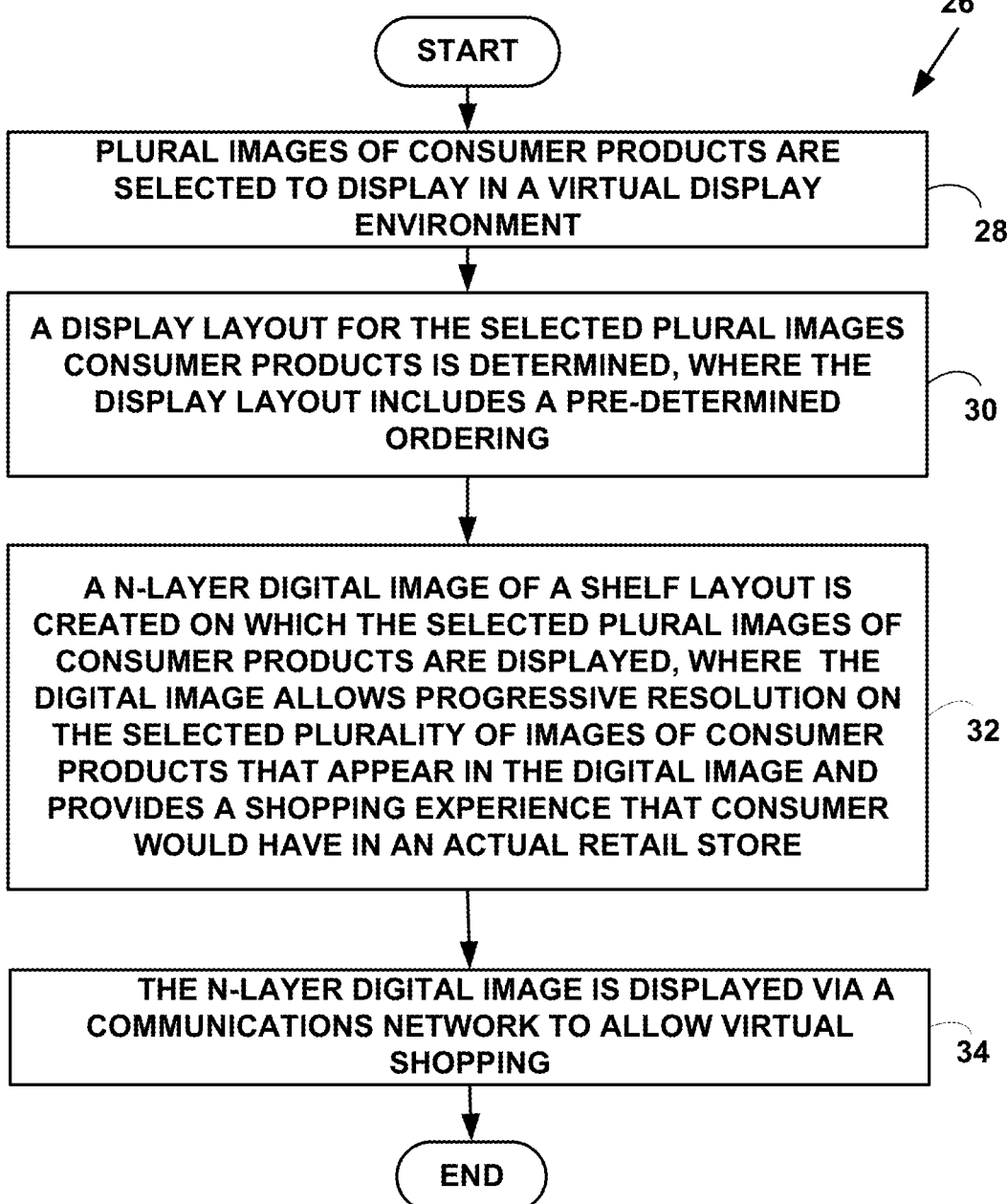

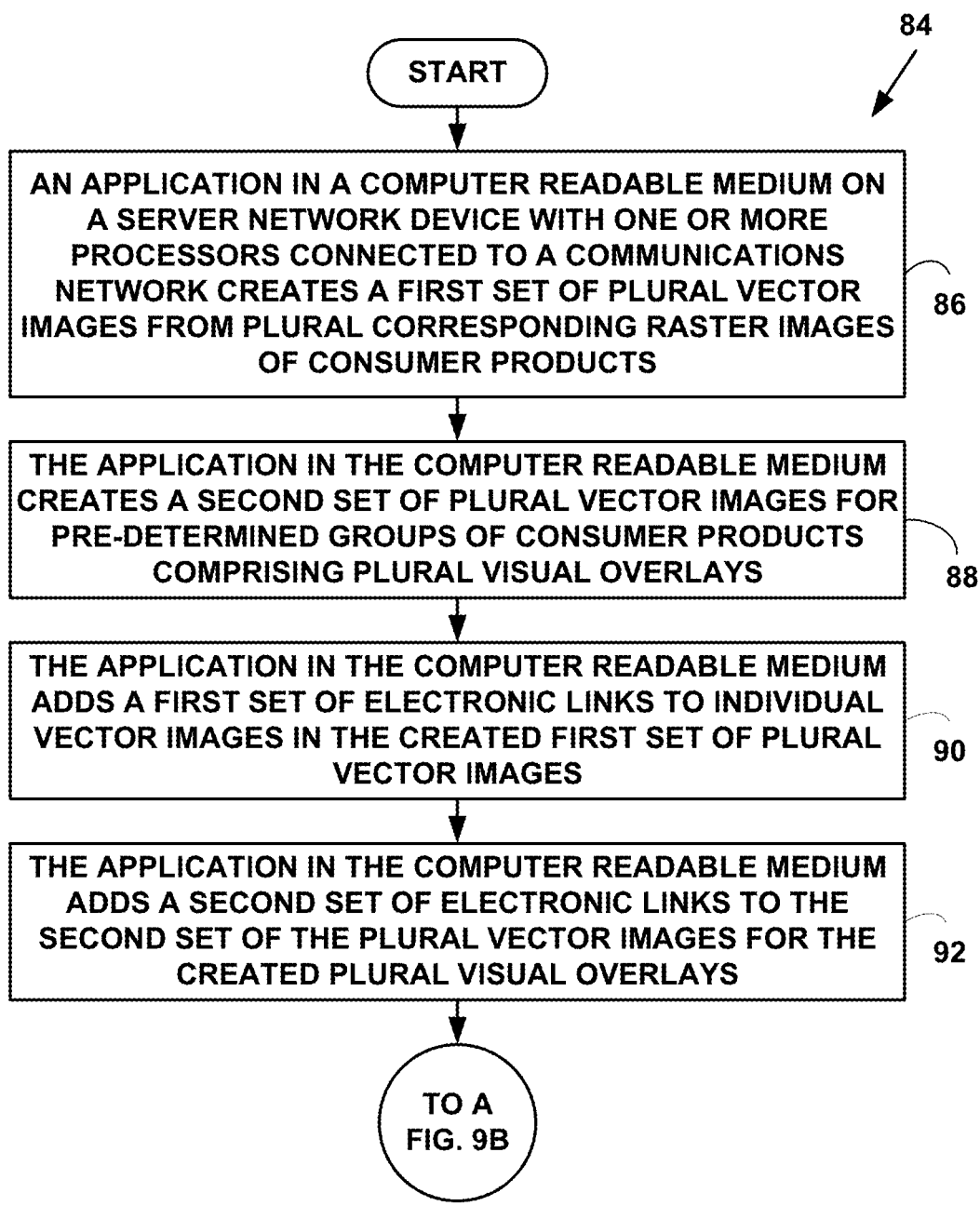

FIG. 12
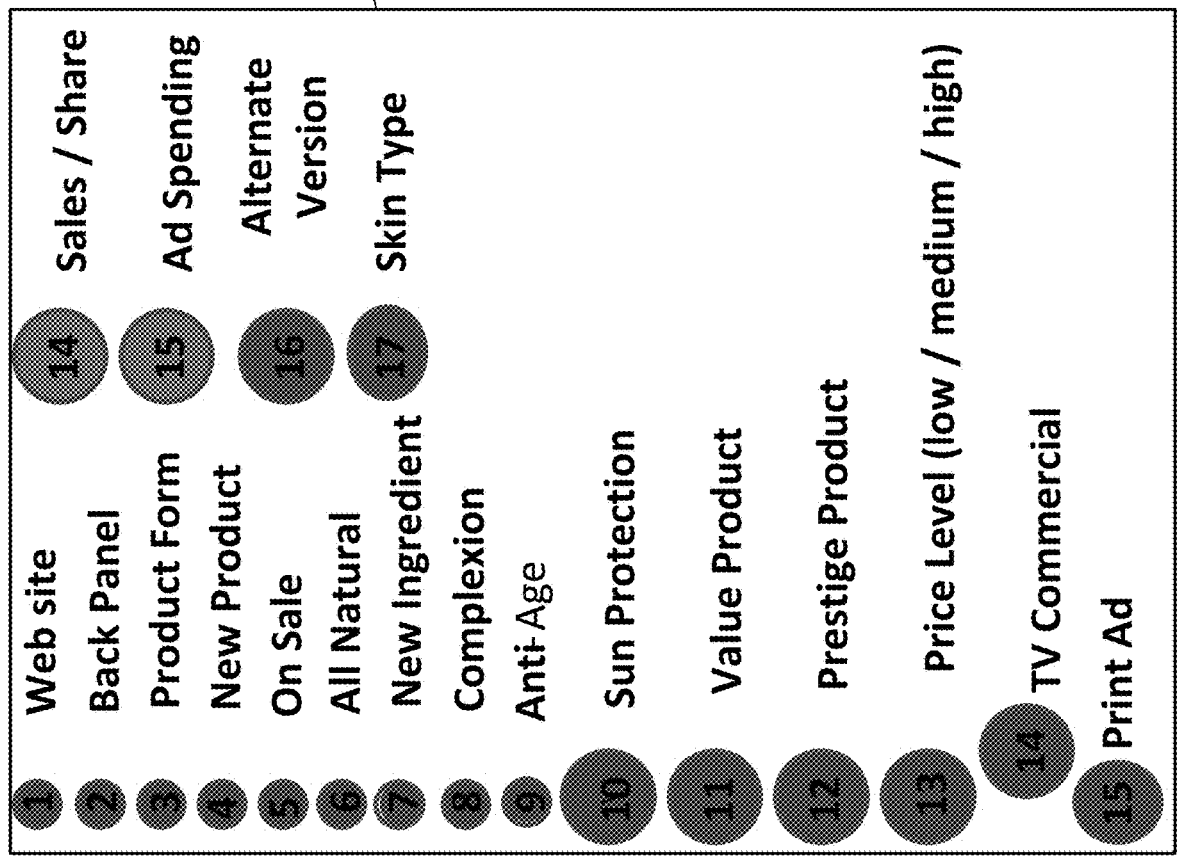
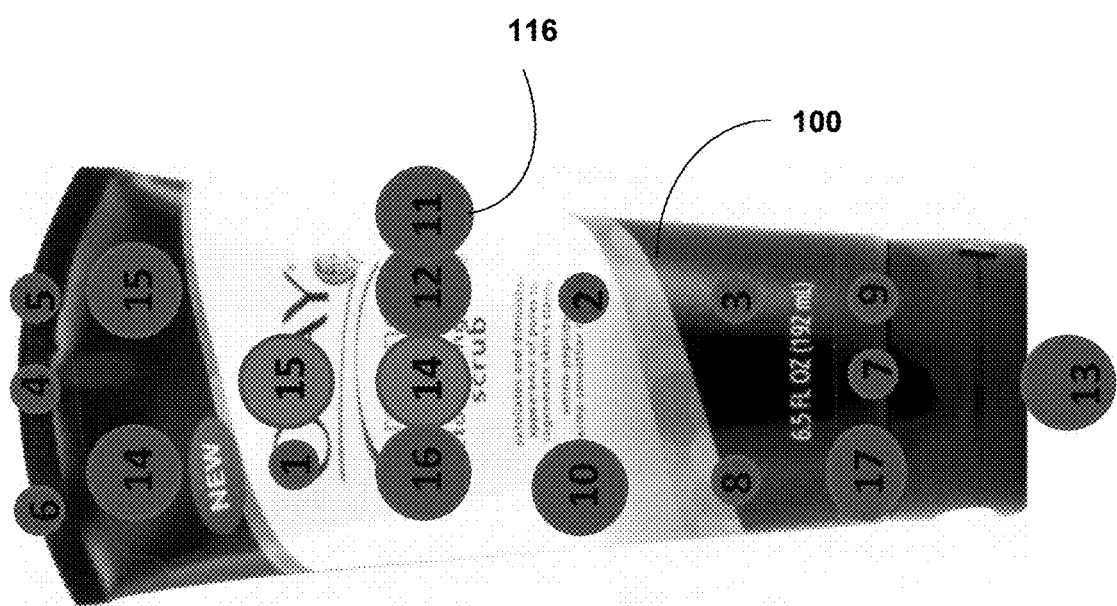

LEVEL-N DISPLAY IN
THE N-LEVEL DIGITAL
IMAGE 106
LEVEL-M DISPLAY IN
THE M-LAYER VECTOR
IMAGE HIERARCHY

FIG. 22B

THE CLOUD APPLICATION ON THE CLOUD SERVER NETWORK DEVICE ADDS A SECOND SET OF ELECTRONIC LINKS TO THE CREATED SECOND SET OF THE PLURAL VECTOR IMAGES FOR THE CREATED PLURAL OF VISUAL OVERLAYS. ONLY SELECTED ONES OF ELECTRONIC LINKS FROM THE SECOND SET OF ELECTRONIC LINKS ADDED TO AN INDIVIDUAL VECTOR IMAGE ARE VISIBLE AND DISPLAYABLE WHEN THE INDIVIDUAL VECTOR IMAGE FOR A VISUAL OVERLAY FROM THE PLURALITY OF VISUAL OVERLAYS IS DISPLAYED — 206

THE CLOUD APPLICATION ON THE CLOUD SERVER NETWORK DEVICE CREATES A MULTI-RESOLUTION MOSAIC (MRM) DIGITAL IMAGE STORED IN ONE OR MORE CLOUD STORAGE OBJECTS IN A PROGRESSIVE RESOLUTION FORMAT FOR A PRE-DETERMINED DISPLAY LAYOUT OF THE CONSUMER PRODUCTS WITH THE CREATED FIRST SET AND THE CREATED SECOND SET OF THE PLURAL VECTOR IMAGES AND THE ADDED FIRST AND THE ADDED SECOND SETS OF ELECTRONIC LINKS. THE MRM DIGITAL IMAGE INCLUDES AN LAYERED VECTOR IMAGE HIERARCHY OF THE CREATED FIRST SET AND THE CREATED SECOND SET OF THE PLURAL VECTOR IMAGES AND WHEREIN THE LAYERED VECTOR IMAGE HIERARCHY INCLUDES SELECTED ONES OF VECTOR IMAGES FROM THE CREATED FIRST SET OF THE PLURAL VECTOR IMAGES DISPLAYING THE GENERAL DETAILS FOR THE CONSUMER PRODUCTS OR GROUPS OF CONSUMER PRODUCTS AT A FIRST SET OF HIGHEST LEVELS IN THE LAYERED VECTOR IMAGE HIERARCHY AND OTHER SELECTED ONES OF VECTOR IMAGES FROM THE CREATED FIRST SET OF PLURAL VECTOR IMAGES DISPLAYING THE SPECIFIC DETAILS FOR THE CONSUMER PRODUCTS AT LOWEST LEVELS IN THE LAYERED HIERARCHY AND SELECTED ONES FROM THE CREATED SECOND SET OF VECTOR IMAGES DISPLAYING VISUAL OVERLAYS OF VARYING LEVEL OF DETAILS FROM THE GENERAL DETAILS TO SPECIFIC DETAILS FOR THE PRE-DETERMINED GROUPS OF CONSUMER PRODUCTS AT A SECOND SET OF HIGHEST LEVELS IN THE LAYERED VECTOR IMAGE HIERARCHY — 208

210 — THE CLOUD APPLICATION ON THE CLOUD SERVER NETWORK DEVICE DISPLAYS THE CREATED MRM DIGITAL IMAGE WITH A PROGRESSIVE RESOLUTION DISPLAY FROM THE ONE OR MORE CLOUD STORAGE OBJECTS VIA THE CLOUD COMMUNICATIONS NETWORK TO ALLOW VIRTUAL SHOPPING VIA THE CLOUD COMMUNICATIONS NETWORK, THEREBY CREATING A SELLER CUSTOMIZED ON-LINE STORE OF CONSUMER PRODUCTS WITH THE CREATED MRM DIGITAL IMAGE

↓

212 — THE CLOUD APPLICATION ON THE CLOUD SERVER NETWORK DEVICE DISPLAYS FROM THE ONE OR MORE CLOUD STORAGE OBJECTS THE CREATED MRM DIGITAL IMAGE WITH THE PROGRESSIVE RESOLUTION DISPLAY OF CONSUMER PRODUCTS WITH THE CREATED PLURAL VECTOR IMAGES IN THE LAYERED VECTOR IMAGE HIERARCHY, THE PROGRESSIVE RESOLUTION DISPLAY INCLUDING DISPLAYING, ZOOMING IN AND ZOOMING OUT ON SELECTED PORTIONS OF THE CREATED MRM DIGITAL IMAGE AND DISPLAYING SELECTED ONES OF THE ADDED ONE OR MORE SETS OF ELECTRONIC LINKS IN THE PLURAL VECTOR IMAGE LAYERS AND ALLOWING LINKING TO ONE OR MORE SETS OF ELECTRONIC INFORMATION FROM DIFFERENT VECTOR IMAGE LAYERS IN THE PLURAL VECTOR IMAGE LAYERS DURING THE PROGRESSIVE RESOLUTION DISPLAY OF THE CREATED MRM DIGITAL IMAGE. THE PROGRESSIVE RESOLUTION DISPLAY OF THE MRM DIGITAL IMAGE DISPLAYS ONLY THOSE ONE OR MORE SETS OF ELECTRONIC LINKS ADDED TO A VECTOR IMAGE LAYER CURRENTLY BEING VIEWED IN THE MRM DIGITAL IMAGE

↓

214 — THE CLOUD APPLICATION ON THE CLOUD SERVER NETWORK DEVICE DISPLAYS FROM THE ONE OR MORE CLOUD STORAGE OBJECTS WITH THE PROGRESSIVE RESOLUTION DISPLAY OF DIFFERENT VECTOR IMAGES AND DIFFERENT SETS OF ELECTRONIC LINKS PROVIDING VECTOR IMAGES AND ELECTRONIC LINKS TO SELECTED ELECTRONIC INFORMATION VARYING FROM GENERAL ELECTRONIC INFORMATION TO SPECIFIC ELECTRONIC INFORMATION AS LOWER LAYERS ARE VIEWED IN THE PLURALITY OF VECTOR IMAGE LAYERS

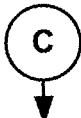

THE CLOUD APPLICATION ON THE CLOUD SERVER NETWORK DEVICE DISPLAYS FROM THE ONE OR MORE CLOUD STORAGE OBJECTS WITH THE PROGRESSIVE RESOLUTION DISPLAY OF THE MRM DIGITAL IMAGE THE CREATED PLURAL VECTOR IMAGES IN THE PLURAL VECTOR IMAGE LAYERS WITHOUT CONVERTING ANY OF THE CREATED PLURAL VECTOR IMAGES TO ANOTHER FORMAT OR DOWNLOADING ANY RASTER IMAGES ASSOCIATED WITH THE CREATED PLURAL VECTOR IMAGES OVER THE CLOUD COMMUNICATIONS NETWORK — 216

THE CLOUD APPLICATION ON THE CLOUD SERVER NETWORK DEVICE DISPLAYS FROM THE ONE OR MORE CLOUD STORAGE OBJECTS A GRAPHICAL PRODUCT SELECTION TOOL VIA THE CLOUD COMMUNICATIONS NETWORK. — 218

THE GRAPHICAL PRODUCT SELECTION TOOL DISPLAYS PLURAL TYPES OF DIFFERENT CONSUMER PRODUCT CATEGORIES AND PLURAL PRE-DETERMINED DEMOGRAPHIC GROUPS — 220

ONE OR MORE SELECTION INPUTS ARE RECEIVED ON THE GRAPHICAL PRODUCT SELECTION TOOL ON THE CLOUD APPLICATION ON THE CLOUD SERVER NETWORK DEVICE VIA THE CLOUD COMMUNICATIONS NETWORK TO SELECT ONE OR MORE OF THE PLURAL TYPES OF DIFFERENT CONSUMER PRODUCT CATEGORIES OR ONE OR MORE OF PLURAL PRE-DETERMINED DEMOGRAPHIC GROUPS — 222

FIG. 22E

↓

| THE GRAPHICAL PRODUCT SELECTION TOOL ON THE CLOUD APPLICATION ON THE CLOUD SERVER NETWORK DEVICE CREATES ON THE CREATED PLURAL VECTOR IMAGES FROM THE MRM DIGITAL IMAGE PLURAL GRAPHICAL MARKERS AND A PLURAL ELECTRONIC LINKS ONLY FOR ANY SELECTED ONES OF THE PLURAL SELECTED TYPES OF DIFFERENT CONSUMER PRODUCT CATEGORIES OR THE PRE-DETERMINED DEMOGRAPHIC GROUPS RECEIVED IN THE ONE OR MORE SELECTION INPUTS, THEREBY CREATING A FURTHER SELLER CUSTOMIZED ON-LINE STORE OF CONSUMER PRODUCTS WITH THE CREATED MRM DIGITAL IMAGE | 224 |

↓

| THE CLOUD APPLICATION ON THE CLOUD SERVER NETWORK DEVICE STORES THE CREATED PLURAL GRAPHICAL MARKERS AND THE PLURAL ELECTRONIC LINKS CREATED WITH THE GRAPHICAL PRODUCT SELECTION TOOL WITH THE CREATED MRM DIGITAL IMAGE IN THE ONE OR MORE CLOUD STORAGE OBJECTS | 226 |

↓

| MORE CLOUD STORAGE OBJECTS IN THE PROGRESSIVE RESOLUTION DISPLAY THE CREATED MRM DIGITAL IMAGE WITH THE PLURAL GRAPHICAL MARKERS AND THE PLURAL ELECTRONIC LINKS CREATED WITH THE GRAPHICAL PRODUCT SELECTION TOOL ON THE CREATED PLURAL VECTOR IMAGES AND ON THE MRM DIGITAL IMAGE ON ONE OR MORE TARGET NETWORK DEVICES EACH WITH ONE OR MORE PROCESSORS VIA THE CLOUD COMMUNICATIONS NETWORK | 228 |

↓

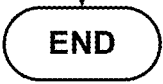

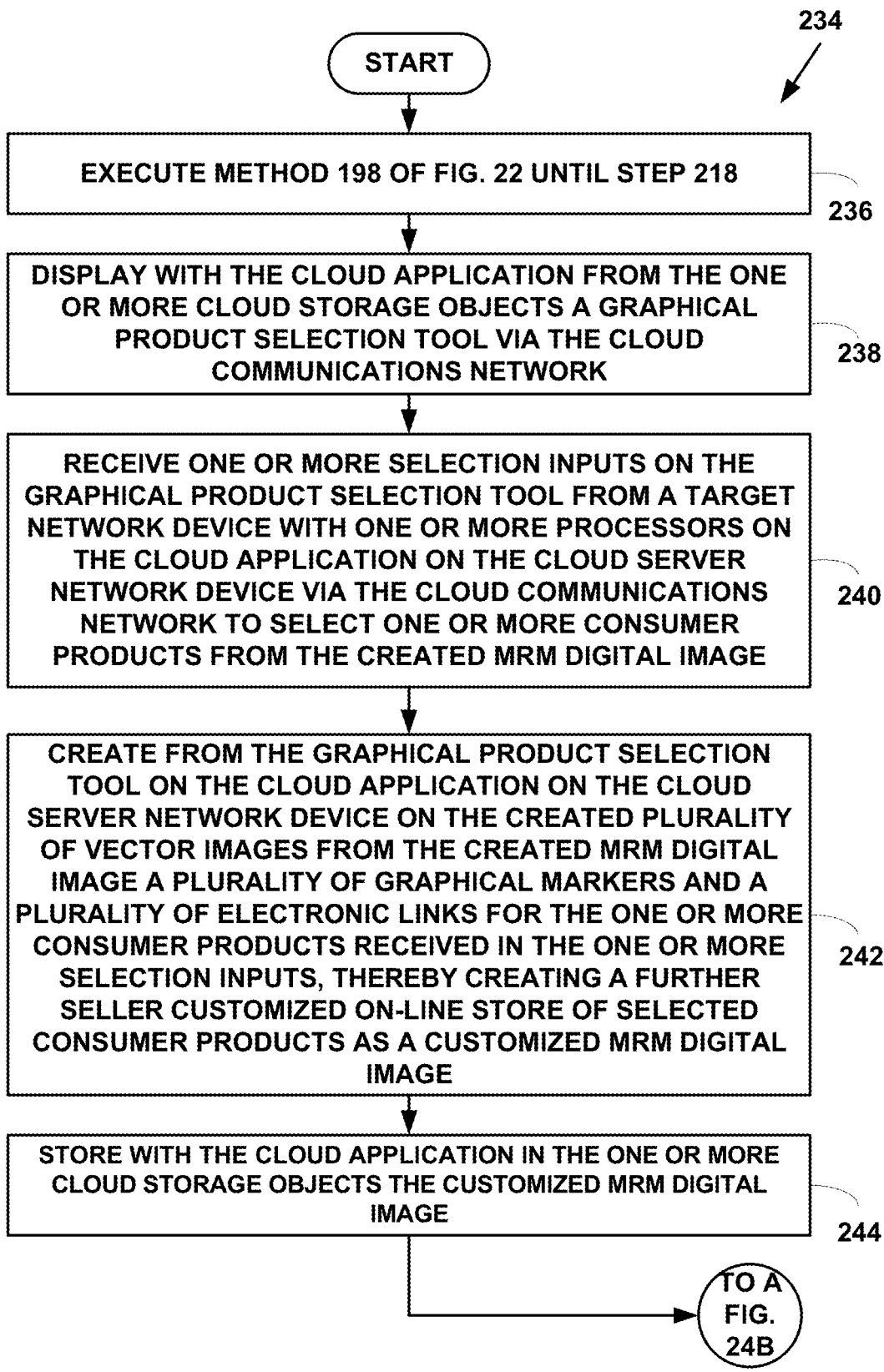

METHOD AND SYSTEM FOR MANAGING AND DISPLAYING PRODUCT IMAGES WITH PROGRESSIVE RESOLUTION DISPLAY

CROSS REFERENCES TO OTHER APPLICATIONS

This application is a Continuation-In-Part (CIP) of U.S. patent application Ser. No. 14/047,581, filed Oct. 7, 2013, which issued as U.S. Pat. No. 9,691,098 on Jun. 27, 2017, which is a CIP of U.S. patent application Ser. No. 12/984,685, filed on Jan. 5, 2011, which issued as U.S. Pat. No. 8,554,639, on Oct. 8, 2013, which is a CIP of U.S. patent application Ser. No. 11/820,342, filed Jun. 19, 2007, which is an application that claims priority to U.S. Provisional patent application No. 60/819,456, filed Jul. 7, 2006, U.S. patent application Ser. No. 11/820,342, issued as U.S. Pat. No. 8,260,689, on Sep. 4, 2012, the contents of all of which are incorporated by reference.

FIELD OF THE INVENTION

This invention relates to product display. More specifically, it relates to a method and system displaying and managing images of consumer products with cloud computing.

BACKGROUND OF THE INVENTION

The display of consumer products in a retail environment is a very important. The display of consumer products in pre-determined formats creates desired shopping experience for a shopper and generate sales for a retailer.

Consumer products are typically placed in pre-determined formats on shelves based on categories (e.g., health and beauty, liquor, grocery, etc.) For a category, plural display tactics are determined. The display tactics include such tactics as shelf management, promotion, pricing, assortment, etc.

The consumer products displayed on a shelf includes an assortment of products. An assortment of products increases shopper interest, increases shopper satisfaction and provides a retailer with more sales. However, too large an assortment of products may frustrate a consumer lead to higher costs for a retailer.

Most consumer products are sold off shelves stores. Consumers can browse shelves and physically pick up a product, remove it from the shelf, read the label, etc. However, when products are virtually displayed on a web-site and sold via electronic commerce (e-commerce) such as via the Internet or other communications network, consumers have a totally different shopping experience.

There are several problems associated with virtually displaying consumer products on a web-site. One problem is that consumer products are typically displayed one or a few at a time on a web-site. This is much different shopping experience than seeing all products for a category of products displayed on a shelf at the same time.

Another problem is that all products in a category of products typically are not displayed at the same time. Many consumers don't remember product details, and sometimes even the product's actual name. Instead many consumers rely on a size, shape, color or other packaging feature of the product to affect its purchase.

Another problem is that consumer products are typically displayed with one or more digital images. However, the digital image may not include the whole product package to allow a consumer to make an appropriate choice. For example, the digital image of the product may not include packing information for the reverse or back of the product. Such a virtual display would prevent the consumer from checking the product ingredients, warning labels, etc.

Another problem is that there have been some attempts to display three-dimensional or other views of consumer products. For example, video images are often created that provide a 360 degree view of the product. However, such video images are typically large and slow to download and display.

Another problem is that consumer products are not displayed on cloud computing networks.

Another problem is that consumer products are not displayed in a virtual shopping cart with any kind of progressive resolution display and do not allow new or additional products to be selected via progressive resolution display.

Thus, it would thus be desirable solve some of the problems associated with creating, displaying and managing images of consumer products.

SUMMARY OF THE INVENTION

In accordance with preferred embodiments of the present invention, some of the problems associated with displaying products are overcome. A method and system for displaying and managing products with cloud computing is presented.

A method and system displaying and managing images of consumer products with cloud computing. One or more consumer products are selected. An N-layer digital image is created that includes an M-layer hierarchy of vector images and/or visual overlays stored in one or more cloud storage objects in progressive resolution format and allows progressive resolution display without loss of image quality on the selected plural consumer products that appear in the N-layer digital image. Selected consumer products are placed in a graphical shopping cart/bag that provides progressive resolution display directly from the graphical shopping cart/bag and allows new or different consumer products to be selected directly from the graphical shopping cart/bag.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 1B is a block diagram of a raster image of a smiley face graphic;

FIG. 2 is a flow diagram illustrating a method for displaying and managing products;

FIGS. 9A and 9B are a flow diagram illustrating a method for displaying and managing products in a virtual shopping environment;

FIG. 12 is a block diagram illustrating exemplary electronic links added to an individual vector image of a consumer product;

FIGS. 24A and 24B are a flow diagram illustrating method for progressive resolution display of selected consumer products directly from a graphical shopping cart/bag.

DETAILED DESCRIPTION OF THE INVENTION

Product Display and Management System

Figure 1A:
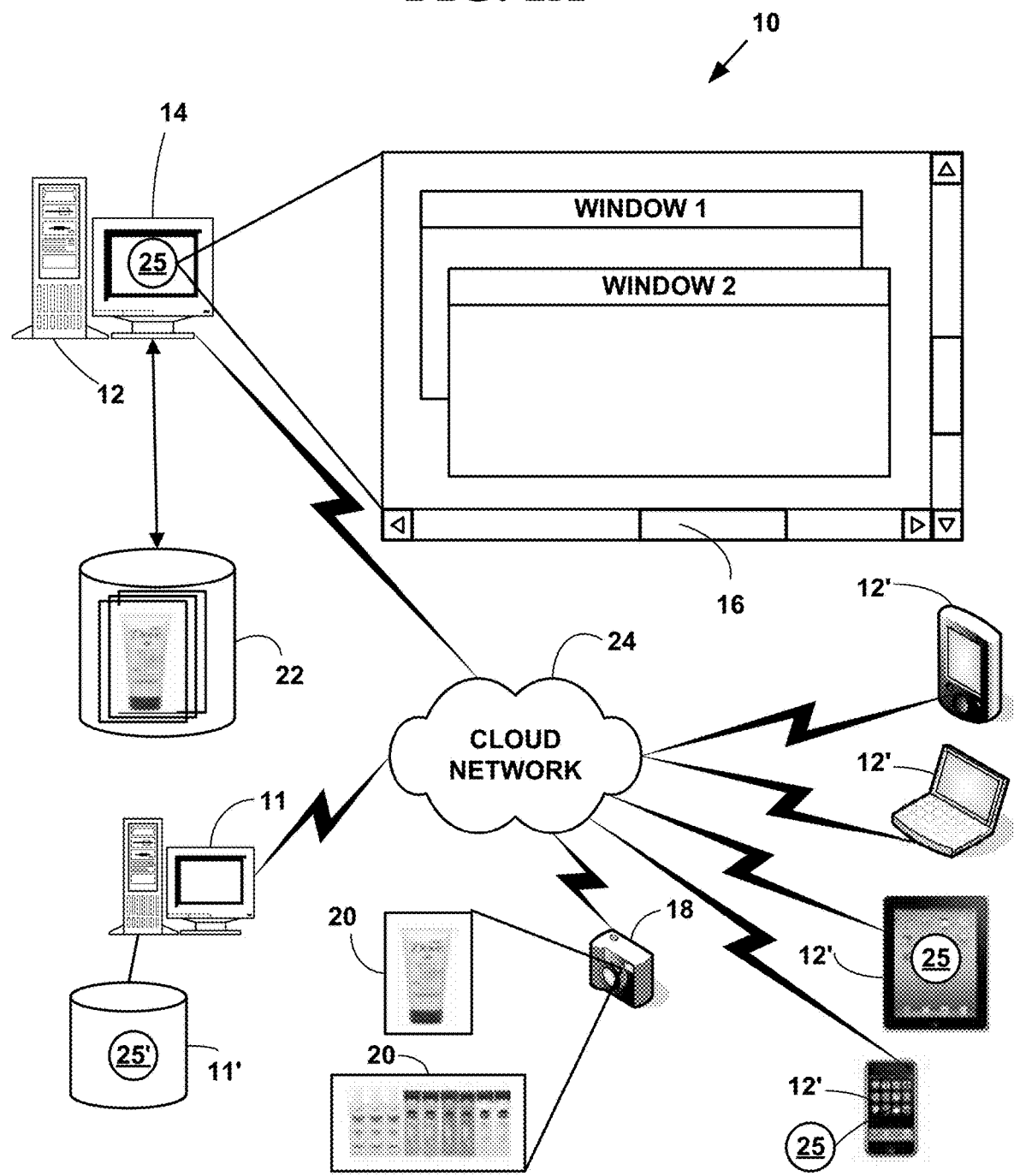
FIG. 1A is a block diagram illustrating a product display and management system.

FIG. 1A is a block diagram illustrating an exemplary product management and display system 10. The exemplary system 10 includes one or more server network devices 11, 12 with a display 14. The display 14 presents a windowed graphical user interface ("GUI") 16 with multiple windows to a user. The system 10 further includes a digital camera 18 (or analog camera) used to provide plural digital images 20 in various digital images or digital data formats (e.g., raster, vector, etc.) One or more databases 11', 22 (two of which is illustrated) include consumer product information in various digital images or digital data formats. (e.g., raster, vector, etc.) The databases 11' 22 may be integral to a memory system or computer readable medium on the network device 12 or in secondary storage such as a hard disk, floppy disk, optical disk, or other non-volatile mass storage devices. The one or more network devices 12 and the databases 22 may also be connected to an accessible via one or more communications networks 24 including cloud communications networks. The one or more network devices 12 also include a virtual store application 25. The virtual store application 25, 25' may be included on a client network device, server network device 11, and/or on both a client and server network device. In one embodiment, the application 25 is a software application. In another embodiment, the application 25 is a plug-in for a network browser. In one embodiment, the application is a cloud application 25.

The one or more server network devices 11, 12 may be replaced with one or more client/target network devices 12' (designated 12' prime) including, but not limited to, client terminals, personal digital/data assistants (PDA), laptop computers, mobile computers, wearable network devices comprising, eye ware, wrist ware, jewelry, clothing, etc., Internet appliances, one or two-way pagers, mobile phones, smart phones, as the iPhone by Apple, Inc., Blackberry Storm, by Research In Motion, Inc., Droid by Motorola, Inc., other types of smart phones, tablet computers such as the iPad, by Apple, Inc., non-mobile phones, set top boxes for cable television, or other similar desktop, mobile or hand-held electronic devices in communications with one or more server network devices 12.

The communications network 24 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 24.

The communications network 24 may include one or more gateways, routers, or bridges. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

The communications network 24 may include one or more servers 11 and one or more web-sites accessible by users to send and receive information useable by the one or more computers 12. The one ore more servers 11, may also include one or more associated databases 11' for storing electronic information.

The communications network 24 includes, but is not limited to, data networks using the Transmission Control Protocol (TCP), User Datagram Protocol (UDP), Internet Protocol (IP), cloud communication protocols (e.g., REST, SOAP, LDAP, etc.) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is know in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

IP is an addressing protocol designed to route traffic within a network or between networks. IP is described in IETF Request For Comments (RFC)-791, the contents of which are incorporated herein by reference. However, more fewer or other protocols can also be used on the communications network 24 and the present invention is not limited to TCP/UDP/IP.

The one or more database 22 include plural digital images 20 of consumer products taken with a camera such as a digital camera and stored in a variety of digital image formats including, raster, vector, bit-mapped, etc. The plural digital images 20 may be stored in a compressed format including, but not limited to, joint pictures expert group (JPEG), graphics interchange format (GIF), etc. The plural digital images may also be stored in progressive resolution format. However, the present invention is not limited to these digital image formats and other digital image or digital data formats can also be used to practice the invention.

In one embodiment of the invention, a virtual store application 25 is a stand alone software application. In another embodiment, virtual store application is plug-in application that is used with another application (e.g., a browser plug-in used with a network browser, etc.). However, the virtual store application 25 can also include plural software, firmware, hardware applications and/or combinations thereof and the present invention is not limited to a software virtual store application 25.

An operating environment for the devices and interfaces of the exemplary system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals or biological signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

In one embodiment of the present invention, wireless interfaces for network devices of the present invention, include but are not limited to, an IEEE 802.11a, 802.11b, 802.11g, 802.11n, 802.15.4 (ZigBee), 802.16a, 802.16g, "Wireless Fidelity" (Wi-Fi), "Worldwide Interoperability for Microwave Access" (WiMAX), ETSI High Performance Radio Metropolitan Area Network (HIPERMAN) "RF Home," or other types of wireless interfaces. However, the present invention is not limited to such wireless interface and other types of wireless interfaces can also be used.

In another embodiment of the present invention, the wireless interface includes a wireless sensor device that comprises an integral or separate Bluetooth and/or infra data association (IrDA) module for wireless Bluetooth or wireless infrared communications.

In one embodiment, of the invention, the wireless interfaces include WPAN wireless personal area network (WPAN) interfaces. A WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, two-way pager, etc.)

Typically, a wireless personal area network uses some technology that permits communication only within about 10 meters. One such technology is "Bluetooth." Another such technology is "Zigbee."

A key concept in WPAN technology is known as "plugging in." In the ideal scenario, when any two WPAN-equipped devices come into close proximity (within several meters of each other) or within a few kilometers of a central server (not illustrated), they can communicate via wireless communications as if connected by a cable. WPAN devices can also lock out other devices selectively, preventing needless interference or unauthorized access to secure information.

An 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

The one or more target network devices and one or more server network devices communicate with each other and other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as image viewing, etc.), which is relayed through a network (wireless, wired cloud, etc.) to a cloud application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

Digital Images

A digital image 20 typically includes an array, usually a rectangular matrix, of pixels. Each "pixel" is one picture element and is a digital quantity that is a value that represents some property of the image at a location in the array corresponding to a particular location in the image. Typically, in continuous tone black and white images the pixel values represent a gray scale value.

Pixel values for a digital image 20 typically conform to a specified range. For example, each array element may be one byte (i.e., eight bits). With one-byte pixels, pixel values range from zero to 255. In a gray scale image a 255 may represent absolute white and zero total black (or visa-versa).

Color images consist of three color planes, generally corresponding to red, green, and blue (RGB). For a particular pixel, there is one value for each of these color planes, (i.e., a value representing the red component, a value representing the green component, and a value representing the blue component). By varying the intensity of these three components, all colors in the color spectrum typically may be created.

However, many images do not have pixel values that make effective use of the full dynamic range of pixel values available on an output device. For example, in the eight-bit or byte case, a particular image may in its digital form only contain pixel values ranging from 100 to 150 (i.e., the pixels fall somewhere in the middle of the gray scale) Similarly, an eight-bit color image may also have RGB values that fall within a range some where in middle of the range available for the output device. The result in either case is that the output is relatively dull in appearance.

A "raster image" is a digital image format composed of a rectangular grid of pixels. Each pixel contains a defined value about its color, size, and location in the image. An image composed of a rectangular grid of pixels. Each pixel contains a defined value about its color, size, and location in the image. In one embodiment, a "raster digital image" or "bitmap" is a data structure representing a generally rectangular grid of pixels, or points of color, viewable via a display 14 or other display medium. Raster images are stored in image files with varying formats and varying compression formats. A bitmap corresponds bit-for-bit with a digital image and is characterized by a width and height of the raster image in pixels and by a number of bits per pixel (i.e., a color depth, which determines the number of colors it can represent).

As a raster image is displayed at larger levels of magnification and/or zoom, it loses resolution and a rectangular grid of pixels that make up a raster image become more and more visible. There is a significant loss of image quality at larger levels of magnification. (See FIGS. 1B and 1D).

FIG. 1B is a block diagram 27 of a raster image 29 of a smiley face graphic 31. The smiley face 31 in the top left corner is a bitmap image. This image was obtained on the Internet from the URL "en.wikipedia.org/wiki/Raster-_graphics."

When such a raster image is enlarged or magnified 33, individual pixels appear as squares (e.g., 35). Zooming in further, the pixels can be analyzed, with their colors constructed by adding the values for red, green and blue. For example, square 35 is a gray color created with 80% red and green and 77% blue colors.

A "vector image" is a digital image format that records geometric information to define properties and objects of an original raster digital image with mathematical definitions and formulas. Colors, angles, curves, lines, boxes, fills, and other image properties from the raster digital are included in the vector image. In one embodiment, the vector images comprise one or more mathematical formulas and are directly dependent on resolution of an original raster digital image the vector image was created from. In another embodiment, the vector images are not dependent on resolution of a corresponding raster digital image the vector image was created from. Vector images provide, rotation, movement, mirroring, stretching, skewing, affine transformations, changing of z-order and combination of raster image primitives into complex vector image objects that are displayed at any magnification without loss of quality.

Figure 1C:
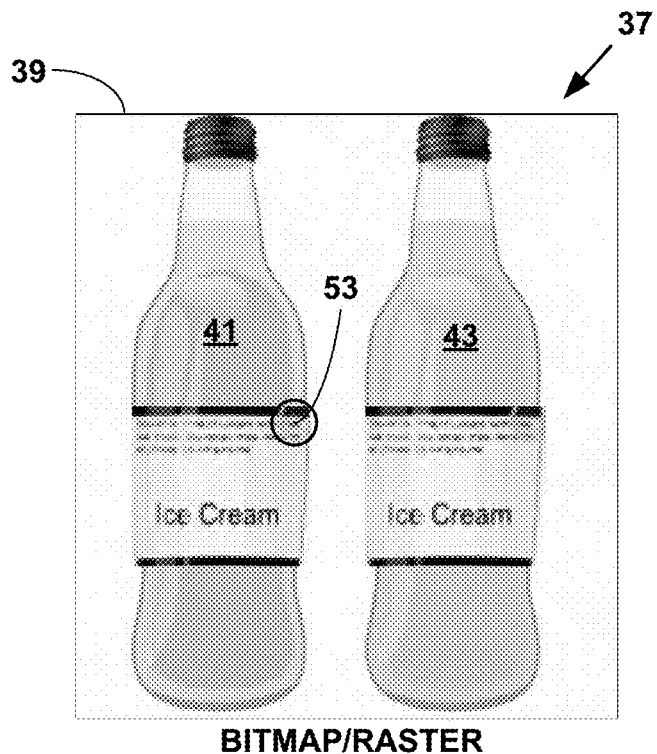
FIG. 1C is a block diagram 37 illustrating an original raster digital image with two glass soda bottles.

FIG. 1C is a block diagram 37 illustrating an original raster digital image 39 with two glass soda bottles 41 and 43. The original raster digital image 39 was obtained on the Internet.

Figure 1D:
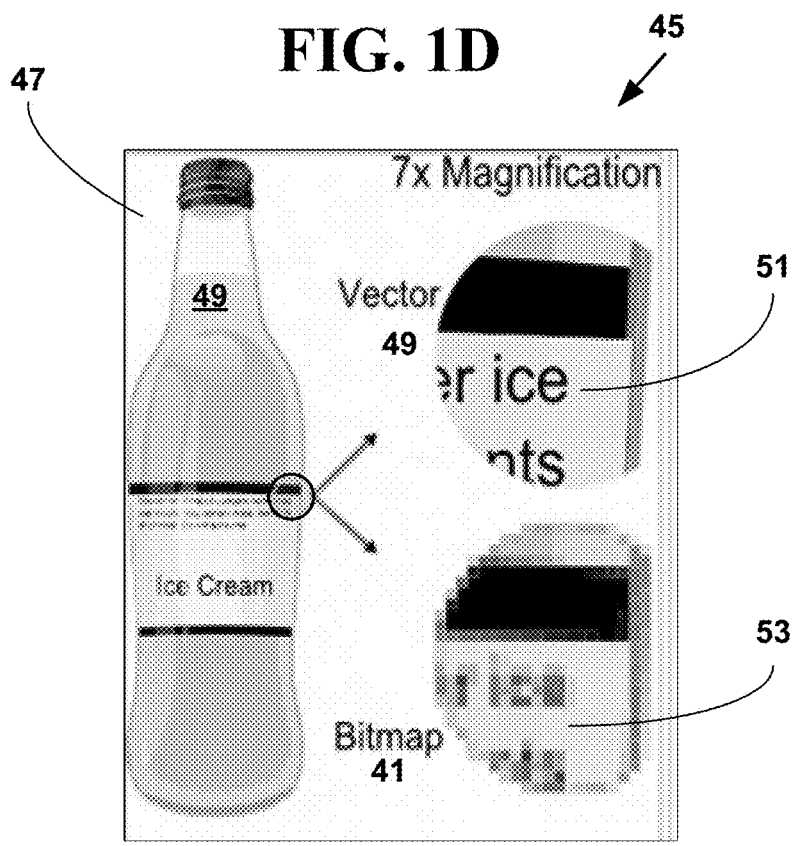
FIG. 1D is a block diagram illustrating a vector image created from the original raster digital image of FIG. 1B.

FIG. 1D is a block diagram 45 illustrated a vector image 47 created from the original raster digital image 39 of FIG. 1B. This vector image was obtained on the Internet.

FIG. 1D illustrates the effect of vector image display versus raster image display. The original vector digital image 47 is at the left. The upper-right image circle 51 illustrates magnification of seven times (7×) as a vector image 47. The lower-right image circle 53 illustrates the same magnification of the original raster bitmap image 39. As was discussed above, raster bitmap images are based on pixels and thus scale and/or magnify with loss of clarity, while vector images can be scaled and/or magnified indefinitely without any corresponding degrading or loss of image quality. Vector image are ideal for simple or composite photos that need to be device-independent and/or need to achieve a high degree of photo-realism when displayed.

As a vector image is displayed with deeper levels of magnification and/or zoom, it never loses resolution and does not display any rectangular grid of pixels and displays a digital image without loss of image quality as is illustrated in FIG. 1C.

"Progressive resolution," includes, but is not limited to, both an image storage format and an image display technique.

As an image storage format, "progressive resolution" includes, but is not limited to, area of interest encoding, spatial relationship descriptor encoding, visual descriptor encoding and/or multi-resolution mosaic encoding of vector digital images created from an original raster digital image.

In another embodiment, it includes, but is no limited to, area of interest encoding, spatial relationship descriptor encoding, visual descriptor encoding and/or multi-resolution mosaic encoding of raster digital images. In another embodiment, it includes, but is no limited to, area of interest encoding, spatial relationship descriptor encoding, visual descriptor encoding and/or multi-resolution mosaic encoding of both original raster digital images and plural vector images created from the original raster digital images.

"Area of interest (AOI) encoding," includes, but is not limited to, designating a particular area of interest within an original raster image to remain a high quality, high resolution area and encoded as a lossless image AOI encoding that dramatically reduces a size of a created image and allow for efficient storage and distribution of the digital image file.

"Spatial relationship descriptor encoding," includes, but is not limited to, providing encoding of a description of points, lines, polygons, such as squares, rectangles, etc. and other geometric components as a geometric representation properties of discerned geographic features and also includes encoding common spatial relationships such as equals, disjoint, intersects, touches, crosses, within, contains, overlaps, etc.

"Visual descriptor encoding," includes, but is not limited to, providing encoding that describes various visual characteristics of objects such as color, shape, texture, etc. For example, a dominant color visual descriptor is used to describe a number and an assigned value of dominant colors that are present in a region of interest and a percentage of the region that each associated dominant color value has, etc.

"Multi-resolution mosaic encoding," includes, but is not limited to, combining digital images with different input resolutions and different input formats into one seamless mosaic for which an image output resolution and re-sampling method are defined. In one embodiment, plural created vector images are encoded with multi-resolution mosaic encoding.

For more information, see "W3C Geospatial Vocabulary," W3C Incubator Group Report, 23 Oct. 2007, and "W3C Image Annotation on the Semantic Web," W3C Incubator Group Report 14 Aug. 2007, the contents of all of which are incorporated by reference.

In one embodiment of the invention, plural created vector images are stored in a progressive resolution digital image format without any corresponding raster images. In such an embodiment, the plural created vector images are stored in a progressive resolution digital image format and are displayed in with a progressive resolution display technique or other types of display techniques without having to use or download any original raster digital images from which the plural vector images were created from. The vector images are displayed without converting them to other image formats.

In another embodiment, plural created vector images are storage are stored in a progressive resolution digital image format with corresponding raster images. In such an embodiment, the plural created vector images are stored in a progressive resolution digital image format and are displayed in with a progressive resolution display technique with having to use or download one or more of the original raster digital images from which the plural vector images were created from.

As an image display technique, "progressive resolution" includes, but is not limited to, displaying plural different vector digital images created from plural different original raster digital images with plural different vector image layers. Progressive resolution as a display technique is fast, efficient and allows viewing and zooming in and out of vector images without loss of image quality. Progressive resolution as a display technique does not require downloading vector images (or raster images) from the communications network 24. However, the present invention is not limited to this embodiment and other types of progressive resolution can be use to practice the invention.

In one embodiment, the vector images are stored in M-layer vector image hierarchy including one or more vector digital images and one or more set of electronic links in one or more upper vector image layers in the M-layer vector image hierarchy that allow a user to link to general information about the consumer products. The M-layer vector image hierarchy includes one or more vector digital images including one or more set of electronic links in one or more intermediate vector image layers in the M-layer vector image hierarchy that allow a user to link to more specific information about the consumer products. The M-layer vector image hierarchy includes one or more vector digital images including one or more set of electronic links in one or more lower vector image layers in the M-layer vector hierarchy that allow a user to link to specific information about the consumer products. However, the present invention is not limited to the M-layer vector hierarchy described and other types of hierarchies and progressive resolution techniques can also be used to practice the invention.

In one exemplary embodiment, the general information in the one or more upper vector layers include brand information, the on or more intermediate vector layers with the intermediate information includes sub-brand information and the one or more lower vector layers with the specific information includes product packaging and ingredient information. In another embodiment, the information placed in the vector layers are reversed. In another embodiment, the information placed in the vectors layers includes no particular ordering. However, the present invention is not limited to the type of information and display described and other types of information and display orderings can also be used to practice the invention.

As an image display technique, "progressive resolution" includes displaying one or more different vector images by displaying a selected vector image in greater and greater level of detail (or magnification, etc.) without loss of image quality and allows zooming in, and zooming out of a whole vector image or a portion of vector image without loss of image quality.

In another embodiment, progressive resolution" as a display technique, includes, but is not limited to, displaying plural different vector digital images created from an original raster digital image with plural different vector images without an M-layer hierarchy of vector images. In such an embodiment, the one or more different vector images also allow displaying a selected vector image in greater and greater levels of detail without loss of image quality and allows zooming in, and zooming out of a whole vector image or a portion of vector image without loss of image quality Digital image "compression" is the translation of data in any format to a more compact form for storage or transmission. Compression reduces redundancy of the image data in order to be able to store or transmit data in an efficient form. Compression techniques include joint pictures expert group (JPEG), graphics interchange format (GIF), Tagged Image File Format (TIFF), Portable Network Graphics (PNG) and other compression techniques.

The compression may be lossy and/or lossless. A lossless compression methods discards no information. A lossy compression method works by analyzing images and discarding kinds of information (e.g., that a human eye is least likely to notice, does not have the capacity to see, etc.) thereby decreasing output file size.

The digital images 20 are typically obtained by photographing consumer and other types of products alone and in pre-determined shelf-set formats. "Shelf-sets" include a pre-determined layout and ordering of products that appear on a shelf.

Exemplary Method for Displaying Products

FIG. 2 is a flow diagram illustrating a Method 26 for displaying and managing products. At Step 28 plural images of consumer products are selected to display in a virtual display environment. At Step 30, a display layout for the selected plural images consumer products is determined. The display layout includes a pre-determined ordering. At Step 32, an N-layer digital image of a shelf layout is created on which the selected plural images of consumer products are displayed. At Step 34, the N-layer digital image is displayed via a communications network to allow virtual shopping via the communications network.

Method 26 is illustrated with an exemplary embodiment. However, the present invention is not limited to such an embodiment other embodiments can also be used to practice the invention.

In such an exemplary embodiment at Step 28, plural images of plural consumer products are selected to display in a virtual display environment. For example, plural images of types of related (e.g., shampoo, conditioner, etc.) or unrelated consumer products in various product categories are selected such as books, music, consumer electronics, tools, clothing, shoes, personal care products including skin care, personal cleansing, AP/DO, hair care, hair styling aids, hair colorants, feminine care (e.g., napkins, tampons, etc.) male care, (e.g., shaving, etc.), baby care (e.g., diapers and wipes, etc.), food items including produce, stables, salty snacks, coffee, etc. groceries, including fresh meats, seafood, produce, etc. cleaning products including fabric care, hard-surface cleansers, floor systems, dish care, etc. However, the present invention is not limited to these consumer products and the invention can be used to sell virtually any type of product that can or cannot be placed on a shelf in a store. For example, the present invention can be used to sell vehicles (e.g., cars, trucks, boats, airplanes, etc.).

In another embodiment, the consumer products include products for pets and other types of animals.

At Step 30, a layout for the selected plural consumer products is determined. The display layout includes a pre-determined ordering. The layout groups the images of the plural selected products by size, shape, color, other packaging characteristics, brand, sub-brand, product category, etc.

In one embodiment, the pre-determined ordering includes an ordering that is used on actual shelves in retail stores. In another embodiment, the pre-determined ordering includes an ordering developed via live focus groups. In another embodiment, the pre-determined ordering includes an ordering based on package coloring or package size or package shape.

In one embodiment, the pre-determined ordering, layout and display of the digital image provides a viewer a shopping experience that is identical or nearly identical to that a consumer would have in an actual retail store. In most embodiments know in the art, the e-commerce and shopping sites on the Internet are not close and typically do not come anywhere close to that a consumer would have in an actual retail store.

At Step 32, an N-layer digital image (e.g., FIG. 3, item 36, FIG. 11, item 112, FIG. 17) of a shelf layout 37 is created on which the selected plural images of consumer products are displayed. The N-layer digital image includes one or more vector images in plural different vector image layers created from and overlaying one or more original raster images. The digital image allows progressive resolution on the selected plural images of consumer products that appear in the digital image without use of the raster images. The vector images include a plural electronic links to information associated with the consumer products. The digital image of the self layout includes, but is not limited to, compilations of one or more very high resolution digital images of individual products, digital images taken of actual store shelves, or digital images of new store shelves that are displayed on in a virtual environment.

Using progressive resolution, a user can zoom in very close to the product image or zoom out to view the shelf in it's entirety. The created image is resolved as the user zooms in to a specific product and also resolves the image to clarity as the user zooms out to view the entire shelf.

In one embodiment, the created image includes vector image layering in an N-layer hierarchy. Each digital vector image will have one or more vector images that overlay one or more raster images. These vector layers provide the user with electronic information, electronic links (e.g., HTML, XML, other electronic links, etc.) to other information including information about the company that produces the consumer product, ingredient information, options for product purchase, electronic coupons and sale information about products that are currently on sale. The links also allow a user to view the reverse side of the package.

In one embodiment, the created digital image is created as plural individual high resolution digital images are taken of an existing retail shelf to create a stitched panoramic photograph of the entire retail shelf from plural retail stores. Individual photos are taken of 4 foot wide by 7 foot high shelves. These individual images are then stitched together to form the category panoramic photos.

At Step 34, the created image is displayed via a communications network 24. For example, the create image may be displayed on a web-site on the Internet.

Figure 3:
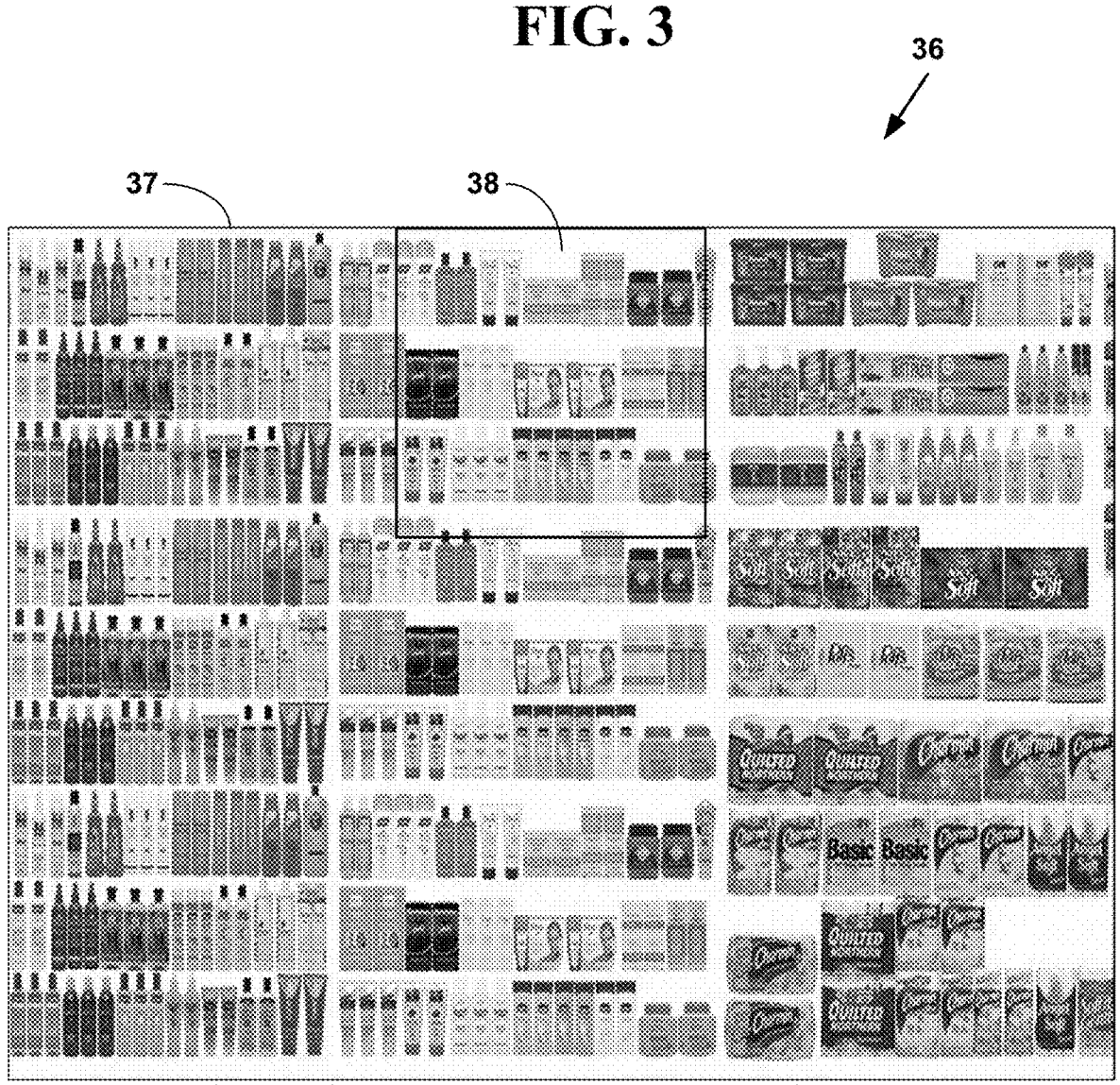
FIG. 3 is a block diagram illustrating an exemplary image of a shelf layout created with the method of FIG. 2.

FIG. 3 is a block diagram 36 illustrating an exemplary image of an actual shelf layout 37 created with Method 26. FIG. 3 illustrates a first selected progressive resolution portion 38 of an actual digital image created to emulate an actual retail store shopping experience. The digital image 36 includes hair care and skin care products that are displayed on a shelf in a manner similar or identical to that of an actual retail store.

Figure 4:
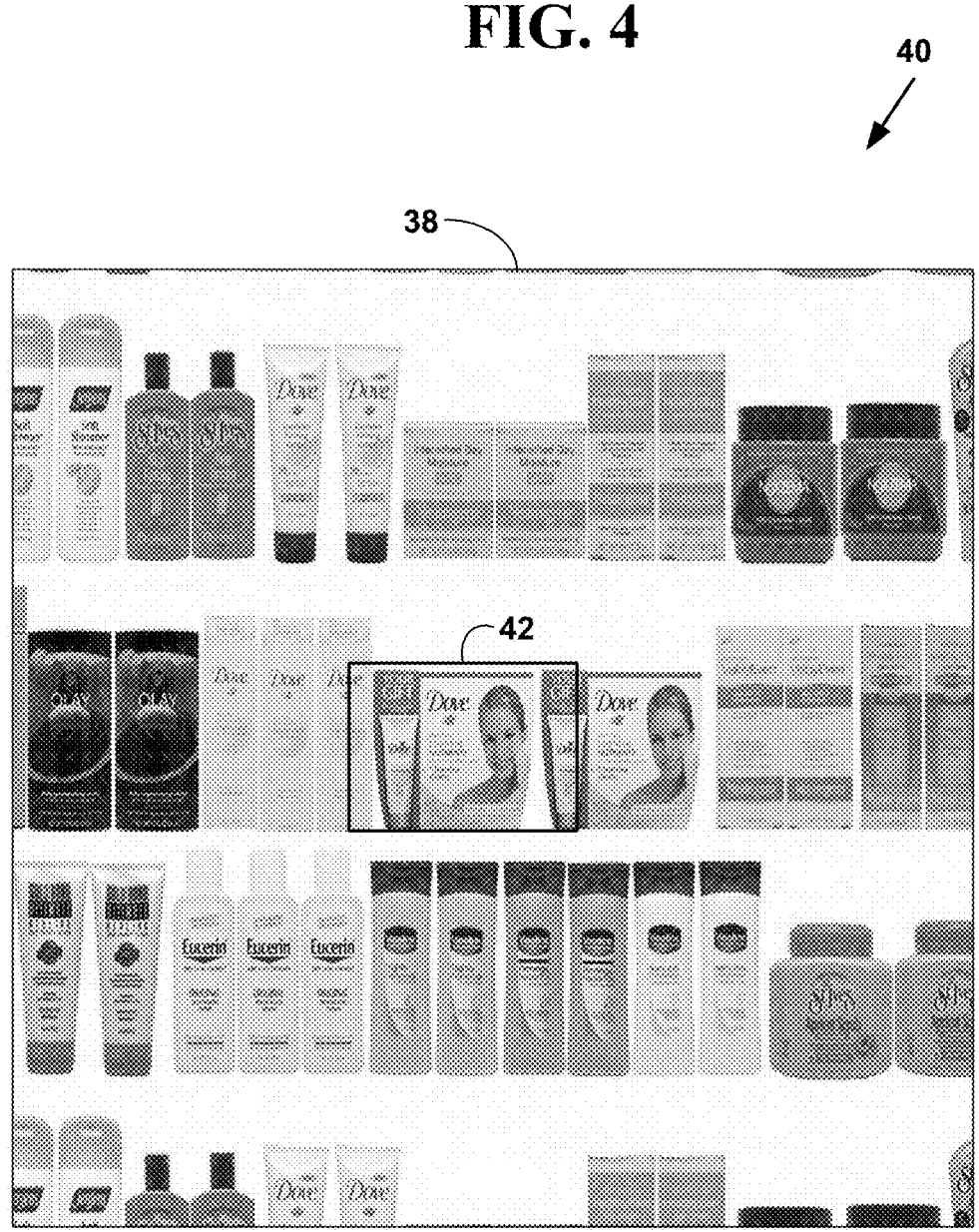
FIG. 4 is a block diagram illustrating an exemplary first progressive resolution portion of the shelf layout image of FIG. 3.

FIG. 4 is a block diagram 40 illustrating an exemplary progressive resolution portion of the shelf layout image of FIG. 3. FIG. 4 illustrates a second selected progressive resolution portion 42 selected within the first selected progressive resolution portion.

Figure 5:
FIG. 5 is a block diagram illustrating details of a second selected progressive resolution portion of FIG. 4.

FIG. 5 is a block diagram 44 illustrating details of the second selected progressive resolution portion 42. FIG. 5 illustrates plural links 46, 47, 48, 50, 52 added to the progressive resolution portion 42 to provide addition information. For example, link 46 provides additional information on Dove products Link 47 provides an electronic coupon that can be printed out and redeemed or used for an electronic purchase. Link 48 provides additional information on the essential nutrients included in the products. Link 50 provides additional information on the cleansing clothes. Link 52 provides a link to another progressive image with information on the reverse side of the product packaging.

Figure 6:
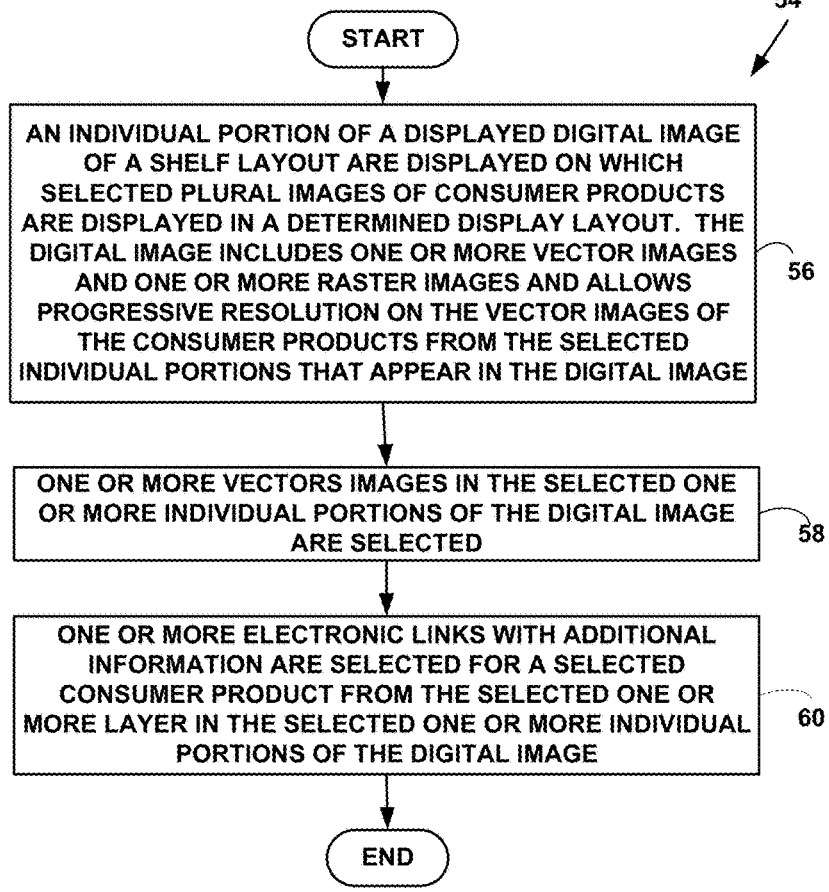
FIG. 6 is a flow diagram illustrating a method for displaying and managing products.

FIG. 6 is a flow diagram illustrating a Method 54 for displaying and managing products. At Step 56, an individual portion of a displayed digital image of a shelf layout is displayed on which selected plural images of consumer products are displayed in a determined display layout. The digital image includes one or more vector images and one or more raster images and allows progressive resolution on the vector images of the consumer products from the selected individual portions that appear in the digital image. At Step 58, one or more vectors images in the selected one or more individual portions of the digital image are selected. At Step 60, one or more electronic links with additional information are selected for a selected consumer product from the selected one or more layer in the selected one or more individual portions of the digital image.

Method 54 is illustrated with an exemplary embodiment. However, the present invention is not limited to such an embodiment other embodiments can also be used to practice the invention.

In such an exemplary embodiment, at Step 56, an individual portion 38, 42, 46, 48, 50, 52 of a displayed digital image of a shelf layout 36 are displayed on which selected plural images of consumer products are displayed in a determined display layout. The digital image includes one or more vector images and one or more raster images and allows progressive resolution on the vector images of the consumer products from the selected individual portions that appear in the digital image At Step 58, one or more vectors images in the selected one or more individual portions of the digital image are selected.

At Step 60, one or more electronic links with additional information are selected for a selected consumer product from the selected one or more layer in the selected one or more individual portions of the digital image.

At Steps 58 and 60, a seller will have the option of selecting which layers to make visible on the shelf image. Layer options include, but are not limited to: product purchase options, links to a product's web site, information on sales, price, advertising or other relevant information that the user might need in making a purchase decision about that product or products. The available options will also allow the seller to create their own customized on-line stores of products that have attributes important to them. Examples might be products that are all natural, products to combat aging, products for children, etc. Products sold domestically and internationally can be displayed side-by-side on a created image.

Figure 7:
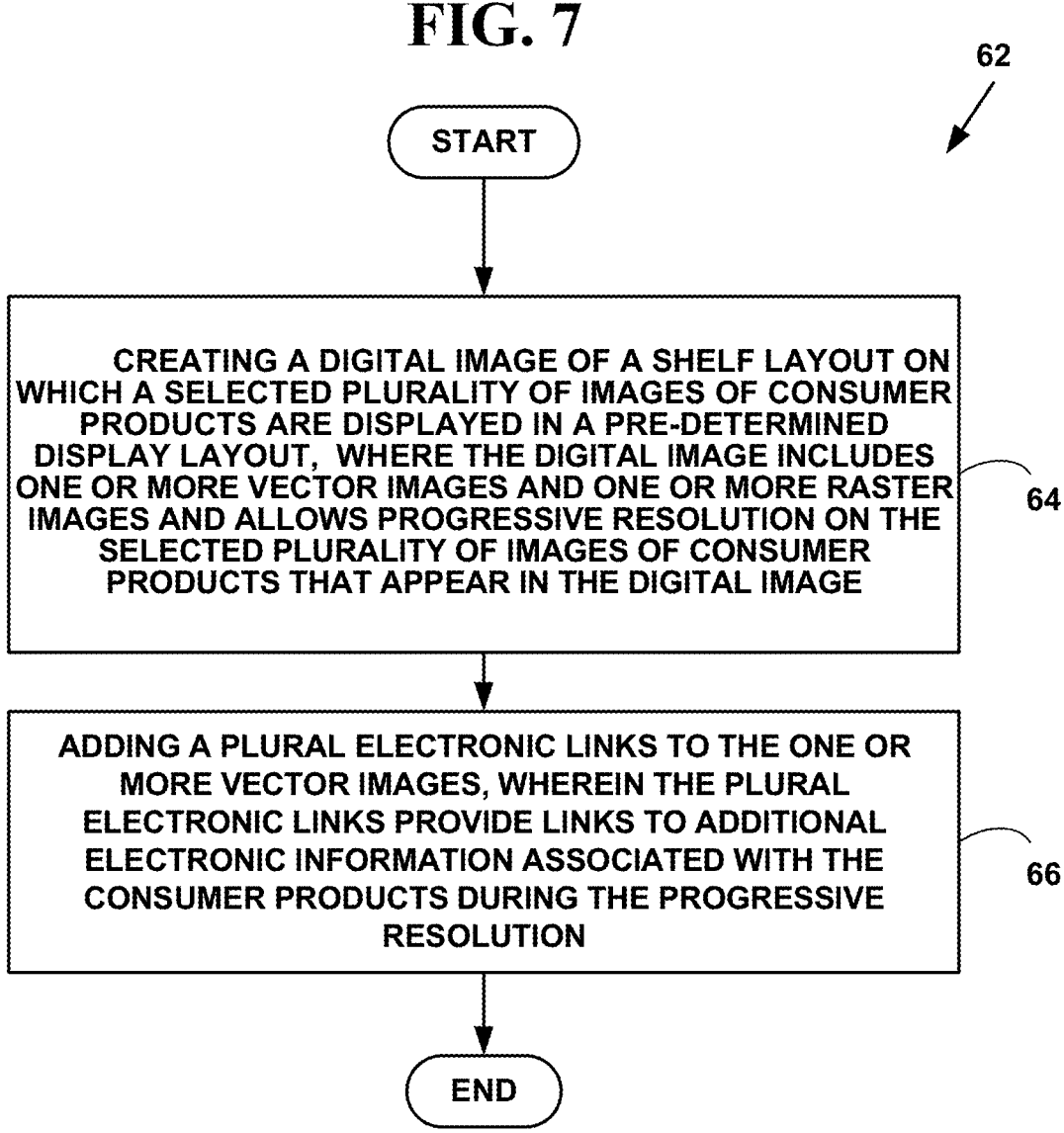
FIG. 7 is a flow diagram illustrating a method for creating images of products in a virtual shopping environment.

FIG. 7 is a flow diagram illustrating a Method 62 for creating images of products in a virtual shopping environment. At Step 64, a digital image of a shelf layout 36 is created on which selected plural images of consumer products are displayed in a pre-determined display layout. The digital image includes one or more vector images and one or more raster images and allows progressive resolution on the selected plural images of consumer products that appear in the digital image. At Step 66, plural electronic links are added to the one or more vector images. The plural electronic links provide links to additional electronic information associated with the consumer products during the progressive resolution.

Method 62 is illustrated with an exemplary embodiment. However, the present invention is not limited to such an embodiment other embodiments can also be used to practice the invention.

In such an exemplary embodiment, at Step 64, a digital image of a shelf layout 36 is created on which selected plural images of consumer products are displayed in a pre-determined display layout. The digital image includes one or more vector images and one or more raster images and allows progressive resolution on the selected plural images of consumer products that appear in the digital image.

At Step 66, plural electronic links 46, 48, 50, 52 are added to the one or more vector images. The plural electronic links provide links to additional electronic information associated with the consumer products during the progressive resolution.

Figure 8:
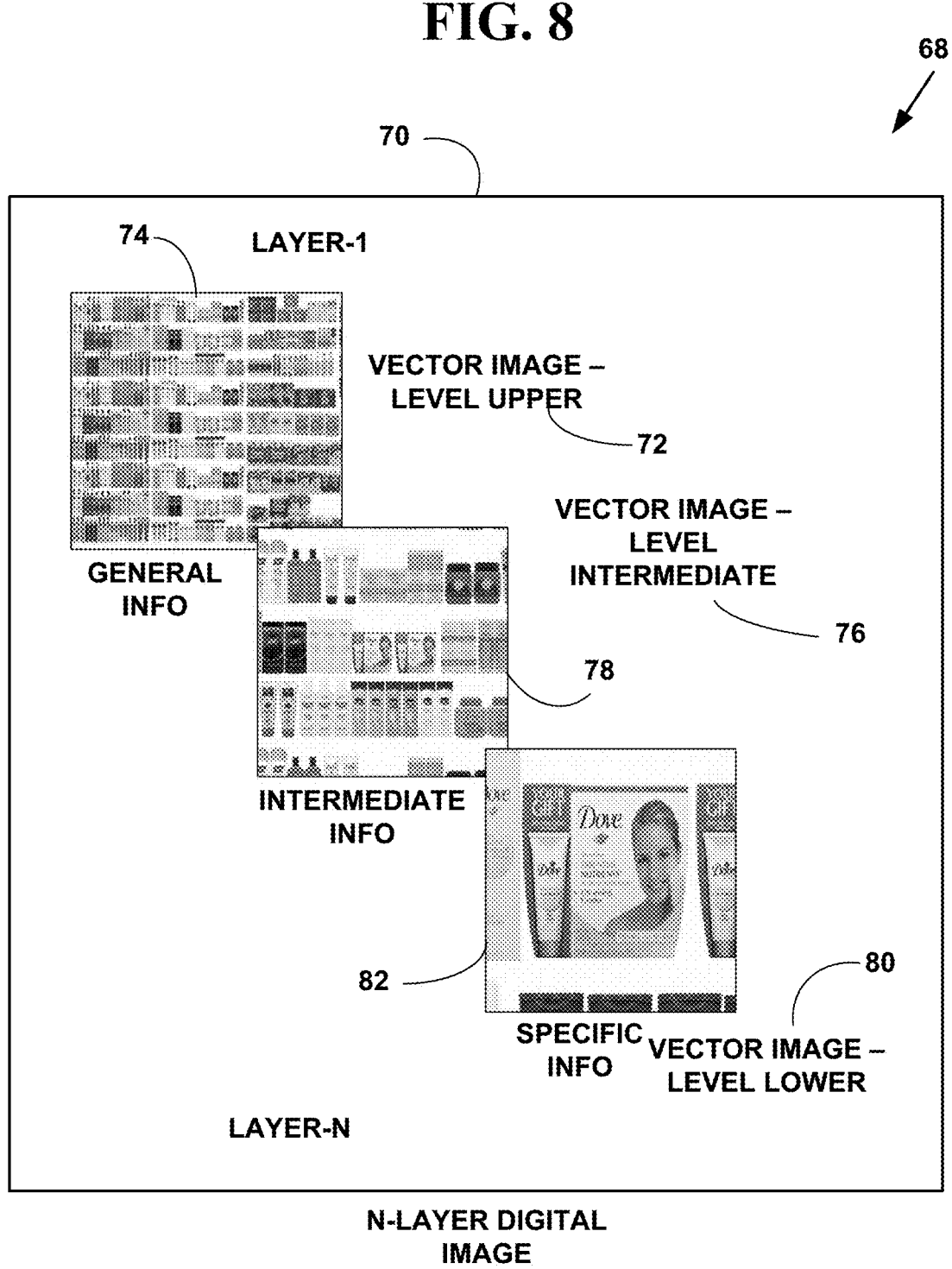
FIG. 8 is a block diagram illustrating details of an N-layer digital image.

FIG. 8 is a block diagram 68 illustrating details of an N-layer digital image 70 including a top vector image layer 72 with general information 74, an intermediate vector image layer 76 with intermediate information 78 and a lower vector image layer 80 with specific information 82. The images in FIG. 8 appear in FIGS. 3-5 and the N-layer digital image 70 is created with the methods and system described herein.

Figure 9B:
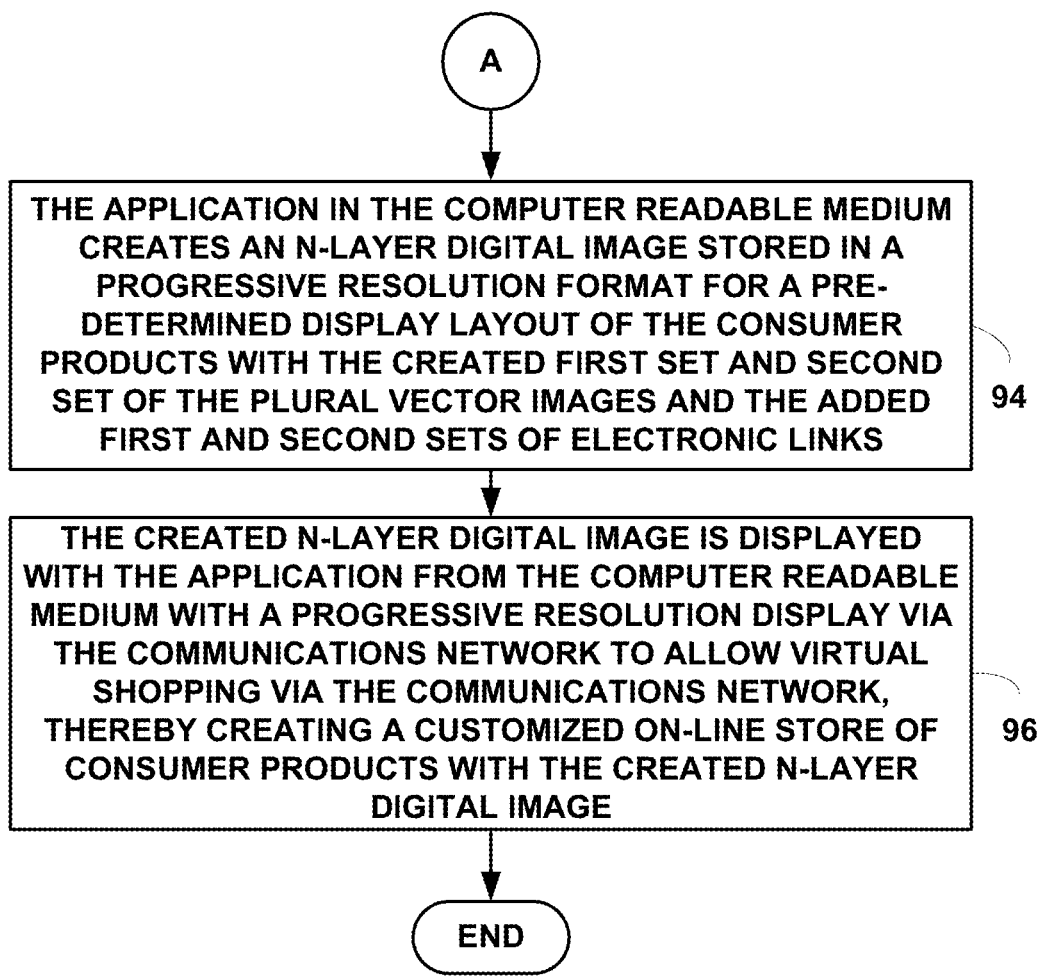

Exemplary Method for Displaying Products Including Visual Overlays in Vector Images FIGS. 9A and 9B are a flow diagram illustrating a Method 84 for displaying and managing products in a virtual shopping environment. In FIG. 9A at step 86, an application in a computer readable medium on a server network device with one or more processors connected to a communications network creates a first set of plural vector images from plural corresponding raster images of consumer products. The created plural vector images include selected ones of the first set of the plural vector images created at different views of the consumer products and also include other selected ones of the created first set of plural vector images included vector images at varying levels of detail from general details to specific details for the consumer products included in the created first set of the plural vector images. At step 88, the application in the computer readable medium creates a second set of plural vector images for pre-determined groups of consumer products comprising plural visual overlays. At Step 90, the application in the computer readable medium adds a first set of electronic links to individual vector images in the created first set of plural vector images. Only selected ones of electronic links from a set of electronic links added to an individual vector image are visible and displayable when the individual vector image for a consumer product is displayed. At Step 92, the application in the computer readable medium adds a second set of electronic links to the second set of the plural vector images for the created plural visual overlays. Only selected ones of electronic links from the second set of electronic links added to an individual vector image are visible and displayable when the individual vector image for a visual overlay is displayed. In FIG. 9B at Step 94, the application in the computer readable medium creates an N-layer digital image stored in a progressive resolution format for a pre-determined display layout of the consumer products with the created first set and second set of the plural vector images and the added first and second sets of electronic links. The N-layer digital image includes an M-layer vector image hierarchy of the created first set and second set of the plural vector images. The M-layer vector image hierarchy includes selected ones of vector images from the created first set of the plural vector images displaying general details for the consumer products or groups of consumer products at a first set of highest levels in the M-layer vector image hierarchy and other selected ones of vector images from the created first set of plural vector images displaying specific details for the consumer products at lowest levels in the M-layer hierarchy. Selected ones from the created second set of vector images displays visual overlays of varying level of details from general to specific for the pre-determined groups of consumer products at a second set of highest levels in the M-layer vector image hierarchy. At Step 96, the created N-layer digital image is displayed with the application from the computer readable medium with a progressive resolution display via the communications network to allow virtual shopping via the communications network, thereby creating a seller customized on-line store of consumer products with the created N-layer digital image. The created N-layer digital image allows progressive resolution display of consumer products with the created plural vector images in the M-layer vector image hierarchy. The progressive resolution display allows displaying, zooming in and zooming out on selected portions of the created N-layer digital image without loss of any image quality and allows displaying selected ones of the added first set and second set of electronic links in the plural vector image layers and allows linking to one or more different sets of electronic information from different vector image layers in the plural vector image layers during the progressive resolution display of the created N-layer digital image. The progressive resolution display of the N-layer digital image displays only those one or more sets of electronic links added to a vector image layer currently being viewed in the N-layer digital image. The progressive resolution display allows display of different vector images and different sets of electronic links providing vector images and electronic links to selected electronic information varying from general electronic information to specific electronic information as lower layers are viewed in the plural vector image layers. The progressive resolution display of the N-layer digital image allows display of the N-layer digital image from the computer readable medium with the created plural vector images in the plural vector image layers without converting any of the created plural vector images to another format or having to download any raster images associated with the created plural vector images over the communications network.

Figure 10:
FIG. 10 is a block diagram illustrating a front view vector image and a back view vector image including specific information for a consumer product.

FIG. 10 is a block diagram 98 illustrating a front view vector image 100 and a back view vector image 102 including specific information for a consumer product (e.g., detoxifying pore scrub in a tube, etc.) viewed at level N in the N-layer digital image and level-M in the M-layer vector image hierarchy.

In one embodiment, the values of N and M are equal. That is, a number of layers-N in the N-layer digital image equal a number of layers-M in the M-layer vector image hierarchy. In another embodiment, the values of N and M are not equal. In such an embodiment, there are typically more vectors image layers in the M-layer vector image hierarchy than there are in the N-layer digital image. In another embodiment, there are more layers in the N-layer digital image than in the M-layer vector image hierarchy. However, the present invention is not limited to these exemplary embodiments and others numbers of layers and values for N and M can be used to practice the invention.

In one exemplary embodiment, the value of N for the N-layer digital image ranges from one to about 100 layers. In a typical exemplary embodiment, the N-layer digital image includes five to ten layers. In one exemplary embodiment, the value of M for the M-layer vector image hierarchy ranges from one to about 1000 layers. In a typical exemplary embodiment, the M-layer vector image hierarchy includes about 100 layers. However, the present invention is not limited to these exemplary embodiments and others numbers of layers and values for N and M can be used to practice the invention.

Figure 11:
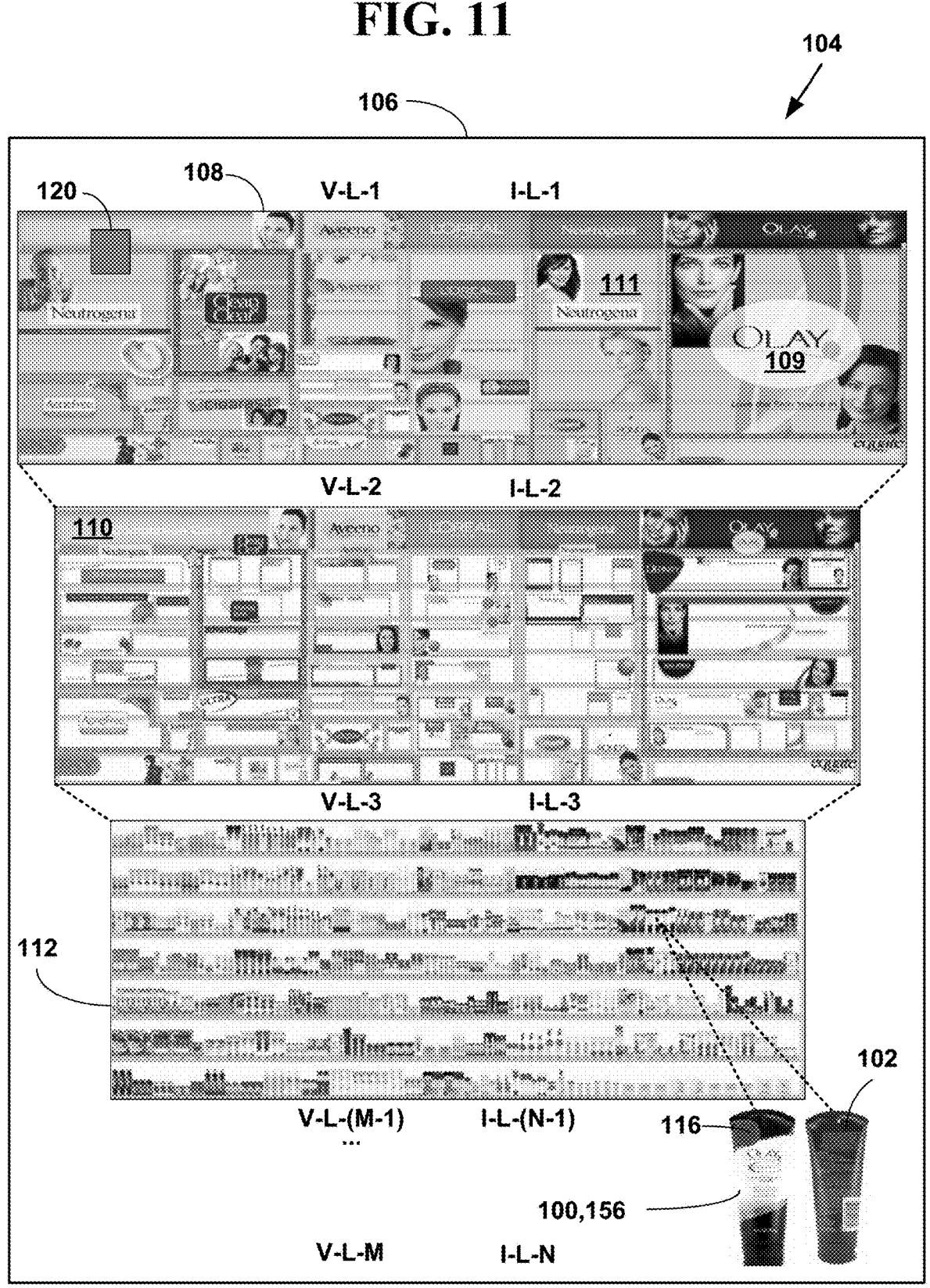
FIG. 11 is a block diagram illustrating a create N-layer digital image comprising plural vector images in a M-layer vector image hierarchy.

FIG. 11 is a block diagram 104 illustrating a created N-layer digital image 106 comprising plural vector images 100, 108, 110, 112 in a M-layer vector image hierarchy. FIG.

11 illustrates vector images comprising visual overlays 108, 110, 112 for groups of consumer products and vector images of individual consumer products 100, 102. Visual overlays may include sub-overlays 109, 111 (two of which are illustrated). Vector image layers are illustrated as "V-L" and the N-layer digital image layers are illustrated as "I-L." In FIG. 11 there are N-layers in the digital image and M-layers in the vector hierarchy where N=M. However, the present invention is not limited embodiments where N=M and can be practiced with N not equal to M.

FIG. 11 illustrates a first vector image at level-1 in the M-layer vector image hierarchy including a first visual overlay 108 with brand information, a second vector image at level-2 including a second visual overlay 110 with sub-brand information, a third vector image 112 at level-3 including a pre-determined shelf layout of product information and a fourth and fifth vector image 100, 102 at level-M including specific product information. However, the present invention is not limited to this exemplary embodiment and others numbers of layers and values for N and M can be used to practice the invention.

In addition, an ordering in the N-layer digital image and/or M-layer vector image hierarchy can be changed or adjusted. For example, in one exemplary embodiment, specific information may be included at top most levels and general information may be included at lowest levels in the N and/or M layers and visa-versa.

In addition, various combinations of general, specific and/or intermediate information may be used and sub-layers may be grouped together to include one or more sub-hierarchies of electronic information. For example, sub-layers 3-7 may be used only for face products that include sun screen with the highest priced products displayed at top levels in the sub-hierarchy.

FIG. 12 is a block diagram 114 illustrating exemplary electronic links 116 added to an individual vector image 100 of a consumer product at pre-determined locations. Only selected ones of the electronic links are visible and displayed in a selected layer in the N-layer digital image 70, 106 in the M-layer vector image hierarchy (e.g., See FIG. 18). In addition, the locations and descriptions of the electronic links are exemplary only. The present invention is not limited to such electronic links and more, fewer and other types of electronic links, other descriptions and other locations can be used to practice the invention.

Figure 13:
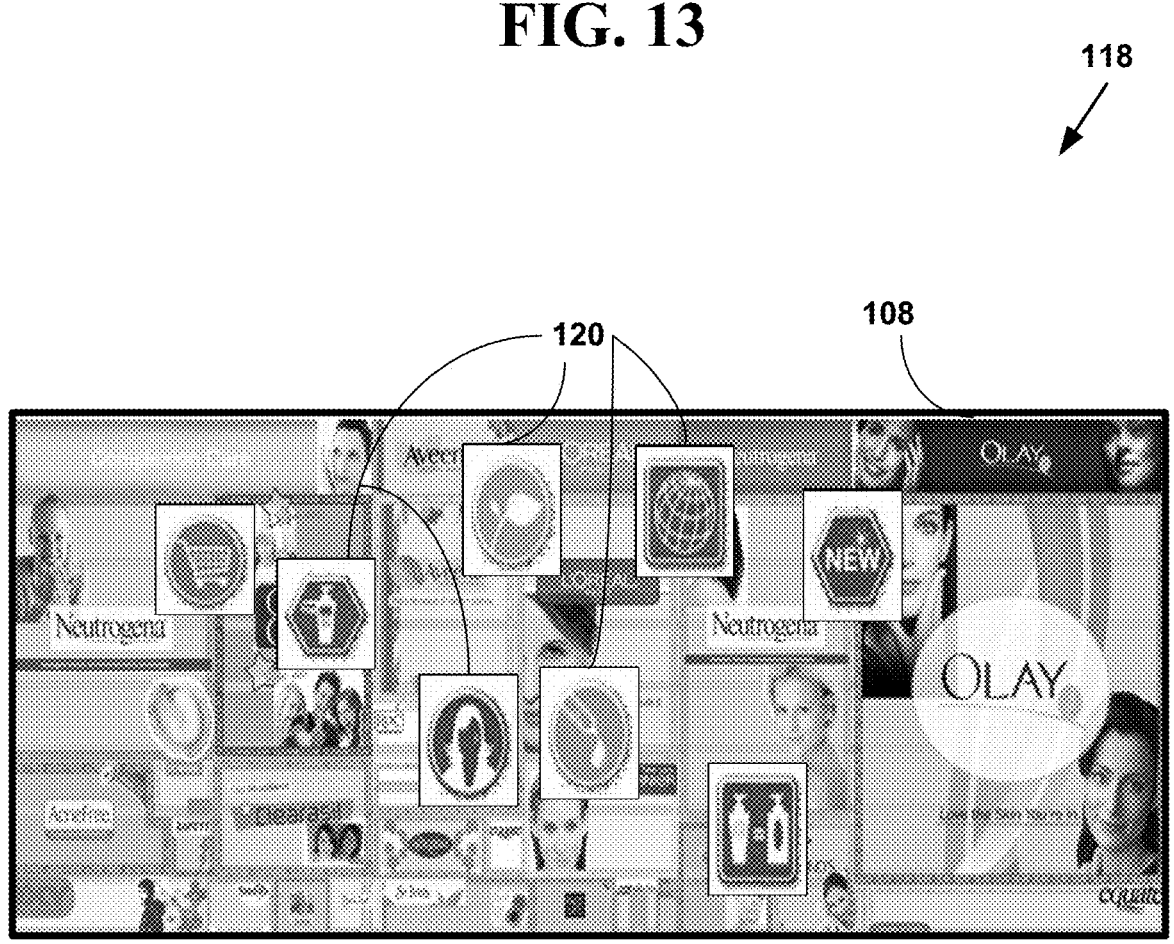
FIG. 13 is a block diagram illustrating exemplary electronic links added to an individual vector image of a visual overlay.

FIG. 13 is a block diagram 118 illustrating exemplary electronic links 120 added to an individual vector image of a visual overlay 108 at pre-determined locations. FIG. 13 illustrates the electronic links as graphical icons. The graphical icon are easily recognizable (e.g., a leaf for natural products, the word NEW for new products, etc.) for selected product types and/or pre-determined demographic groups (e.g., teen age girls, etc.) (See FIG. 14 for additional descriptive text of graphical icons illustrated in FIG. 13). The graphical icons also include icons for plural different types of personal shoppers of various age groups. (e.g., a teen age girl, a young woman (e.g., 20-30, etc.) a middle age woman (e.g., 31-50, etc.), a senior age woman (e.g. 51-90+, etc.), a teenage boy, young man, middle age man, etc.) The present invention is not limited to such electronic links and more, fewer and other types of electronic links, other descriptions and other locations can be used to practice the invention.

Returning to FIG. 9, Method 84 is illustrated with an exemplary embodiment. However, the present invention is not limited to such an exemplary embodiment other embodiments can also be used to practice the invention.

In such an exemplary embodiment in FIG. 9A at Step 86, an application 25 in a computer readable medium on a server network device 12 with one or more processors connected to a communications network 24 creates a first set of plural vector images (e.g., FIG. 1D, FIG. 10, items 100, 102, etc.) from plural corresponding raster images (e.g., FIG. 1C) of consumer products 20. The created plural vector images include selected ones of the first set of the plural vector images created at different views (e.g., FIG. 10, front 100, back 102, etc.) of the consumer products and also include other selected ones of the created first set of plural vector images included vector images at varying levels of detail from general details 38 (e.g., FIGS. 3, 11, etc.) to specific details 42 (FIGS. 5, 10) for the consumer products included in the created first set of the plural vector images. However, the present invention is not limited to this order and other orderings can be used in the N-layer digital image and the M-layer vector image hierarchy.

At step 88, the application 25 in the computer readable medium creates a second set of plural vector images for pre-determined groups of consumer products comprising plural visual overlays (e.g., FIG. 11, etc.). In one specific exemplary embodiment, the vector images including the visual overlays include plural vector images comprising, brand information, sub-brand information, product category information and/or product information. However, the present invention is not limited to such an embodiment, more, fewer and/or other types of overlays and other embodiments can be used to practice the invention.

At Step 90, the application 25 in the computer readable medium adds a first set of electronic links (e.g., 116, FIG. 11) to individual vector images in the created first set of plural vector images. Only selected ones of electronic links from a set of electronic links added to an individual vector image are visible and displayable when the individual vector image for a consumer product is displayed in the N-layer digital image and/or M-layer vector image hierarchy (See, FIG. 18 for display of electronic links at level-N in the N-layer digital image and level M in the M-layer vector image hierarchy). In one embodiment, the first set of electronic links includes a first set of graphical icons. However, the present invention is not limited to such electronic links and other types of electronic links (e.g., text, etc.) can be used to practice the invention.

One advantage of displaying only selected ones of the electronic links and making these selected ones of the electronic links visible only when a selected individual vector image is displayed allows the N-layer digital image to be cleanly displayed without cluttered images displayed. If this method of was not used then all links at all layers on all the vector images would be displayed and none of the vector images for the visual overlays or the consumer products would be visible when the N-layer digital image is displayed.

Figure 14:
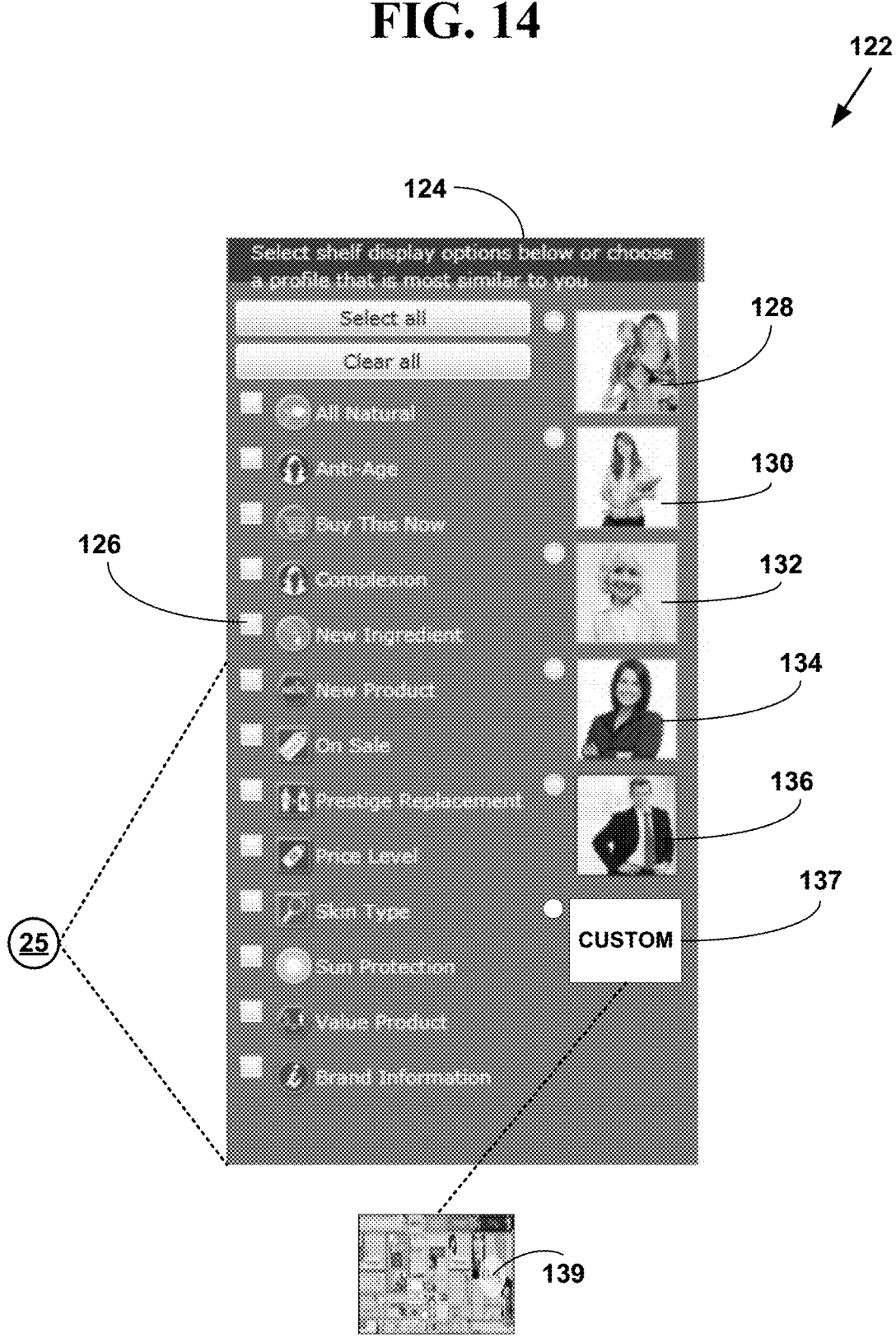
FIG. 14 is a block diagram illustrating an exemplary product selection tool for determining types of electronic links and vector images displayed.

In one embodiment, the graphical icons include graphical icons for new products, products on sale, all natural products, anti-age products, products with new ingredients, products with sun screen, products for specific pre-defined demographic groups, products associated with a brand or products at similar price level (See FIGS. 13 and 14). However, the present invention is not limited to such an embodiment and more, fewer or other types of graphical icons can be used to practice the invention.

FIG. 14 is a block diagram 122 illustrating an exemplary product selection tool 124 for determining types of electronic links and vector images displayed. FIG. 14 illustrates selecting electronic links and corresponding vector images for displaying various types of product information 126 or via pre-determined demographic categories such mothers with children 128, teen age girls 130, women over age fifty 132, professional women 134, men's products, 136, a custom product selection 137 that does not include any pre-determined demographics or categories allowing a user to create custom shopping environment with a customized multi-resolution, multi-layer mosaic (MRM) digital image 139 and select any consumer product from any category, to create a customized on-line store, etc. Electronic selection tool 124 is displayed via application 25. In one embodiment, electronic selection tool 124 is used only by an image creator (e.g., a retailer who is creating an N-layer digital image for display) via a server network device 12.

In another embodiment, the product selection tool 124 is also used via a client network device 12 via application 25 via GUI 16 by a user who desires to create electronic links and display vector images only to products that interest them. In such an embodiment, the N-layer digital image 106 created at Step 94 will include all possible vector images and all possible electronic links A consumer will select and activate only those vector images and electronic links for consumer products that are of interest to the user and only those electronic links and vector images will be displayed.

Returning to FIG. 9 at Step 92, the application in the computer readable medium adds a second set of electronic links (e.g., 120, FIG. 13) to the second set of the plural vector images for the created plural visual overlays. Only selected ones of electronic links from the second set of electronic links added to an individual vector image are visible and displayable when the individual vector image for a visual overlay is displayed. FIG. 13 illustrates the electronic links as graphical icons. However, the present invention is not limited to such electronic links and other types of electronic links (e.g., text, etc.) can be used to practice the invention.

In one embodiment, the graphical icons include graphical icons for new products, products on sale, all natural products, anti-age products, products with new ingredients, products with sun screen, products for specific pre-defined demographic groups, products associated with a brand or products at similar price level (See FIGS. 13 and 14). However, the present invention is not limited to such embodiments and more, fewer or other types of graphical icons can be used to practice the invention.

In one embodiment, the first set of electronic links and/or the second set of electronic links include electronic links to print advertising (e.g., magazine, newspaper, electronic media (e.g., social network sites, etc.), audio advertising (e.g., radio, etc.), video advertising (e.g., TV commercials, etc.), and web-sites including additional information about the consumer product. Such links may link to electronic information in the computer readable medium and/or database 22 on the server network device 12 or target network device 12' or to other information sites and/or database 22 accessible via the communications network 24 (e.g., web-sites on the Internet, etc.). In one embodiment, additional electronic information is stored completely in the computer readable medium and/or database 22 on the server network device 12. In another embodiment, selected ones of the types of electronic information (e.g., video advertising, etc.) is not stored and must be downloaded and/or retrieved from other network devices 12, 12' via the communications network 24. However, the present invention is not limited to such embodiments and more, fewer or other types of electronic links and electronic information storage can be used to practice the invention.

In FIG. 9B at Step 94, the application 25 in the computer readable medium creates an N-layer digital image (e.g., FIGS. 8, 11) that is stored in a progressive resolution format for a pre-determined display layout of the consumer products with the created first set (e.g., 100, 102) and second set of the plural vector images (e.g., 108, 110, 112) and the added first and second sets of electronic links (116, 120) The N-layer digital image includes an M-layer vector image hierarchy of the created first set and second set of the plural vector images and the first and second set of added electronic links In one exemplary embodiment, The M-layer vector image hierarchy includes selected ones of vector images from the created first set of the plural vector images displaying general details for the consumer products or groups of consumer products at a first set of highest levels in the M-layer vector image hierarchy and other selected ones of vector images from the created first set of plural vector images displaying specific details for the consumer products at lowest levels in the M-layer hierarchy. Selected ones from the created second set of vector images displays visual overlays of varying level of details from general to specific for the pre-determined groups of consumer products at a second set of highest levels in the M-layer vector image hierarchy. However, the present invention is not limited to such a hierarchy and other types of hierarchies can be used to practice the invention.

In another exemplary embodiment, the invention is practiced without the M-layer hierarchy. In addition, the M-layer vector image hierarchy may include specific information at highest levels and general information at lowest levels. Various combinations of information types and layering are possible to practice the invention.

At Step 96, the created N-layer digital image 106 is displayed with the application 25 from the computer readable medium with a progressive resolution display via the communications network 24 to allow virtual shopping via the communications network, thereby creating a seller customized on-line store of consumer products with the created N-layer digital image.

The created N-layer digital image 106 allows progressive resolution display of consumer products with the created plural vector images in the M-layer vector image hierarchy. The progressive resolution display allows displaying, zooming in and zooming out on selected portions of the created N-layer digital image 106 without loss of any image quality and allows displaying selected ones of the added first set and second set of electronic links in the plural vector image layers and allows linking to one or more different sets of electronic information from different vector image layers in the plural vector image layers during the progressive resolution display of the created N-layer digital image 106.

The progressive resolution display of the N-layer digital image 106 displays only those one or more sets of electronic links added to a vector image layer currently being viewed in the N-layer digital image 106. The progressive resolution display allows display of different vector images and different sets of electronic links providing vector images and electronic links to selected electronic information varying from general electronic information to specific electronic information as lower layers are viewed in the plural vector image layers. The progressive resolution display of the N-layer digital image 106 allows display of the N-layer digital image 106 from the computer readable medium with the created plural vector images in the plural vector image layers without converting any of the created plural vector images to another format or having to download any raster images associated with the created plural vector images over the communications network 24.

Figure 15:
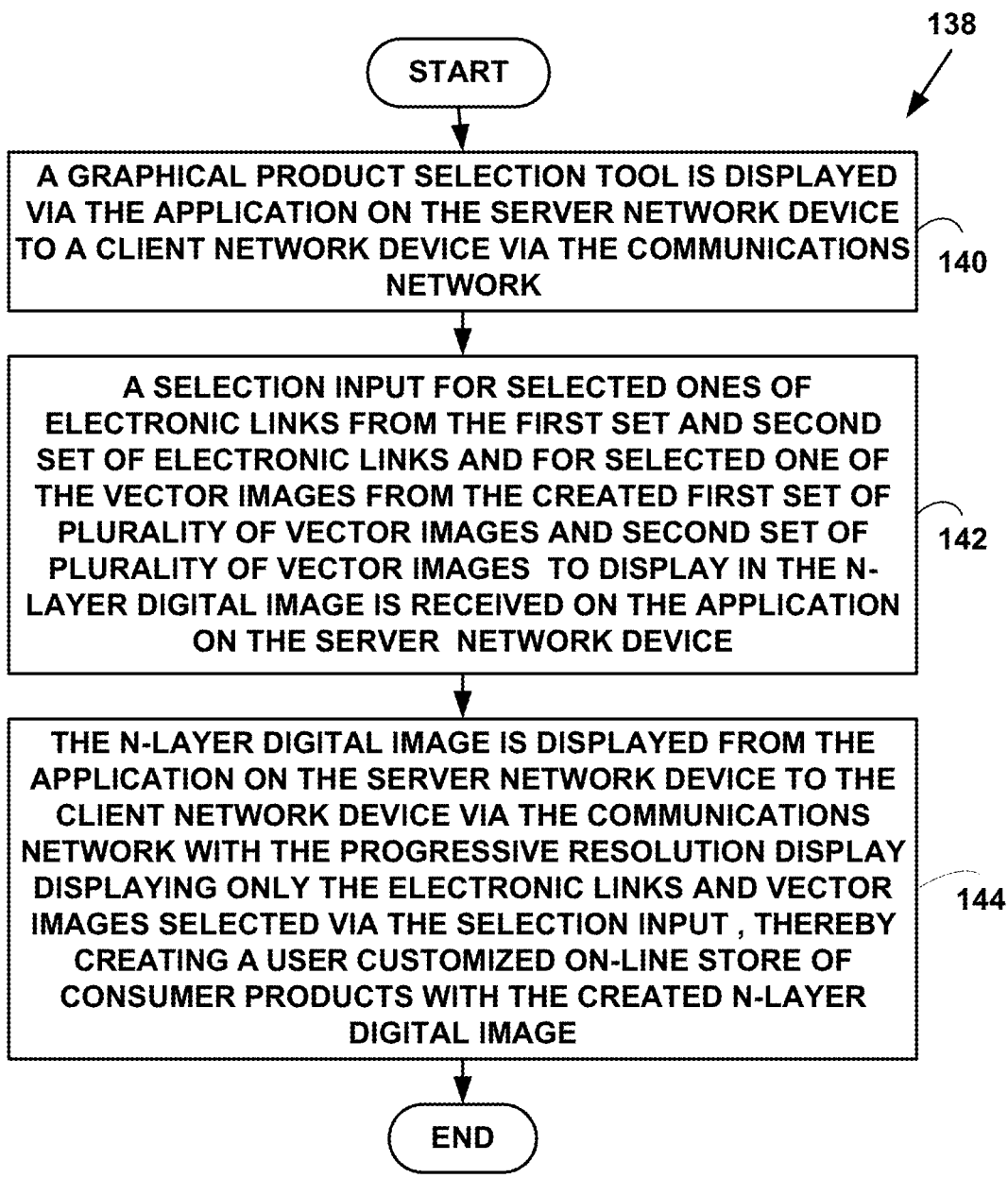
FIG. 15 is flow diagram illustrating a method for selecting products to display in an N-layer digital image.

FIG. 15 is flow diagram illustrating a Method 138 for selecting products to display in an N-layer digital image. At Step 140, a graphical product selection tool is displayed via the application on the server network device to a client network device via the communications network. At Step 142, a selection input is received on the application on the server network device via the communications network for selected ones of electronic links from the first set and second set of electronic links and for selected one of the vector images from the created first set of plural vector images and second set of plural vector images to display in the N-layer digital image. At Step 144, the N-layer digital image is displayed from the application on the server network device to the client network device via the communications network with the progressive resolution display displaying only the electronic links and vector images included in the received selection input, thereby creating a user customized on-line store of consumer products with the created N-layer digital image.

Method 138 is illustrated with an exemplary embodiment. However, the present invention is not limited to such an exemplary embodiment other embodiments can also be used to practice the invention.

In such an exemplary embodiment at Step 140, a graphical product selection tool 124 is displayed via the application 25 on the server network device 12 to a client network device 12' via the communications network 24. In another embodiment, the product selection tool is displayed via the application 25 directly on the client network device 12'. The graphical product selection tool 124 displays specific product information 126 and product information specifically related to pre-determined demographic groups 128-136.

The graphical selection tool 124 allows a user to select which electronic links on which vector images will be visible and will be displayed when a corresponding vector image of a visual overlay or a consumer product is displayed. The graphical selection tool 124 allows a user to customize display of the N-layer digital image by allowing display of only those items a user is interesting in seeing.

In one exemplary embodiment, the graphical selection tool 124 is includes pre-determined information. In another exemplary embodiment, the items displayed by the graphical selection tool are fully and/or partially customizable by a user.

In one exemplary embodiment, items in a visual overlay and/or for a consumer product in which electronic links are not selected for display are changed to a different color (e.g., changed from full color to a gray scale coloring, etc.) to further distinguish the items that are selected to make visible. However, the present invention is not limited to this embodiment and other embodiments can also be used to practice the invention.

At Step 142, a selection input is received on the application 25 on the server network device 12 via the communications network 24 for selected ones of electronic links from the first set and second set of electronic links and for selected one of the vector images from the created first set of plural vector images and second set of plural vector images to display in the N-layer digital image 70, 106.

For example, the selection input may include a request to display all consumer products that all include all natural ingredients, that further include sun screen and are currently on sale for Brand-X. for the demographic group of teen age girls 130, etc.

At Step 144, the N-layer digital image 106 is displayed from the application 25 on the server network device 12 to the client network device 12' via the communications network 24 with the progressive resolution display displaying only the electronic links and vector images included in the received selection input, thereby creating a user customized on-line store of consumer products with the created N-layer digital image 70, 106.

In another exemplary embodiment, Method 136 is practiced only with client network device 12' and application 25 and the graphical product selection tool 124 is displayed via the application 25 only the client network device 12'. In such an embodiment, the N-layer digital image 70, 106 may be created directly on the client network device 12' without using the server network device 12.

In one exemplary embodiment the type of information displayed in the N-layer digital image and/or the M-layer vector image hierarchy is completely configurable (e.g., with product selection tool 124). For example, a user may select create a N-layer digital image and/or M-layer vector image hierarchy by having vector images of consumer products (e.g., 100, 102) at a highest level, wherein a top most level includes consumer products with a lowest price, a next level includes consumer products with higher prices, etc. and a lowest level includes consumer products with a highest price. Virtually any ordering and virtually any type of electronic information can be selected and displayed in the N-layer digital image and/or the M-layer vector image hierarchy. However, the present invention is not limited to these embodiments and other embodiments can be used to practice the invention.

Returning to FIG. 9, in another exemplary embodiment, Step 94 further includes storing plural data base entries in a database 22 associated with the server network device 12. The stored plural database entries allow individual vector images in the created N-layer digital image 70, 106 to be retrieved and displayed in a progressive resolution format at pre-determined display locations on a display 14.

Figure 16:
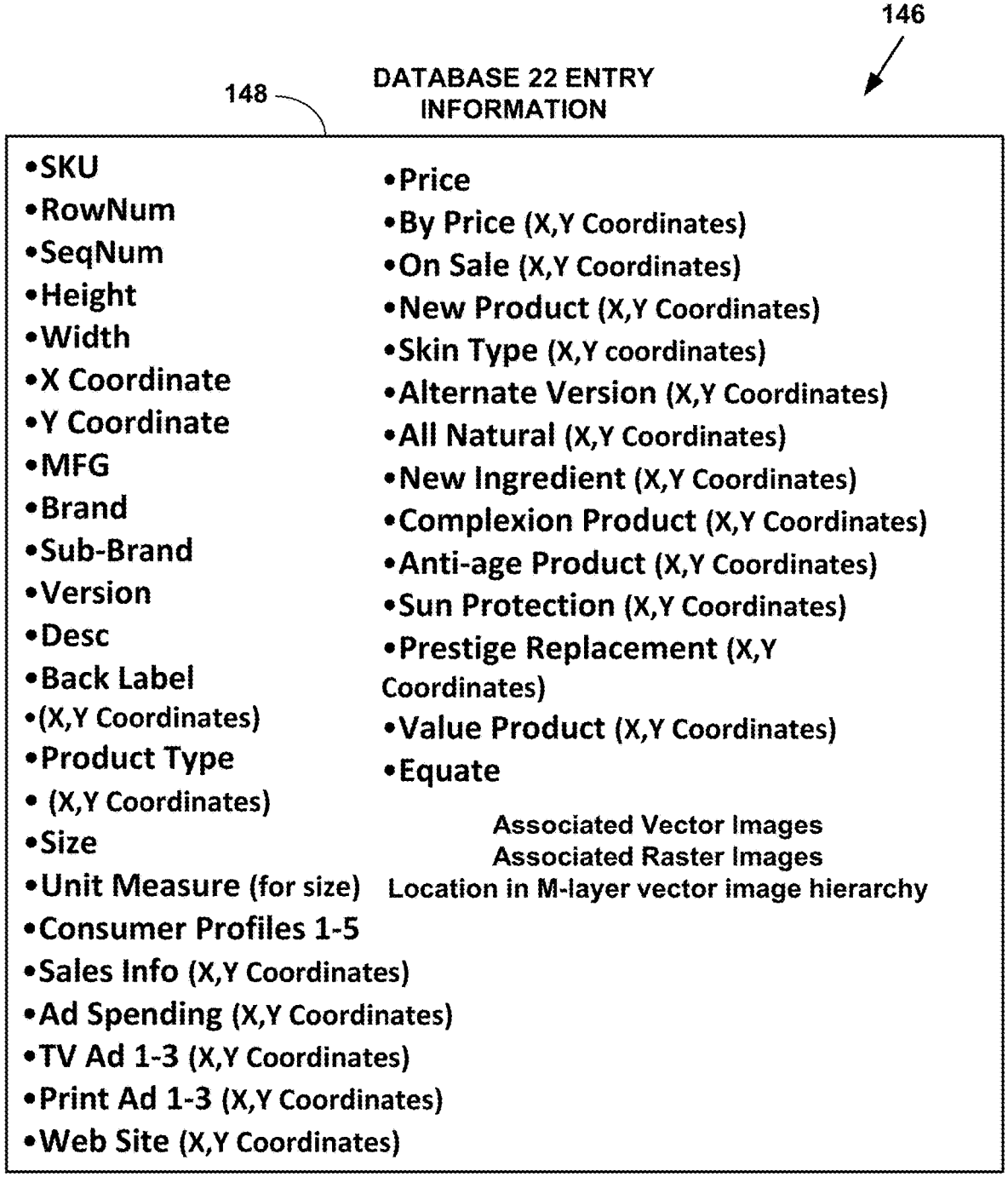
FIG. 16 is a block diagram illustrating an exemplary database entry.

FIG. 16 is a block diagram 146 illustrating an exemplary database entry 148. However, the present invention is not limited to this exemplary database entry and more, fewer or other database field may be used in the database entries. FIG. 16 also indicates only a two-dimensional data display (e.g., (X,Y) coordinates). In another embodiment, the database entries include three-dimensional display (e.g., (X,Y,Z) coordinates.) (See FIG. 17).

Figure 17:
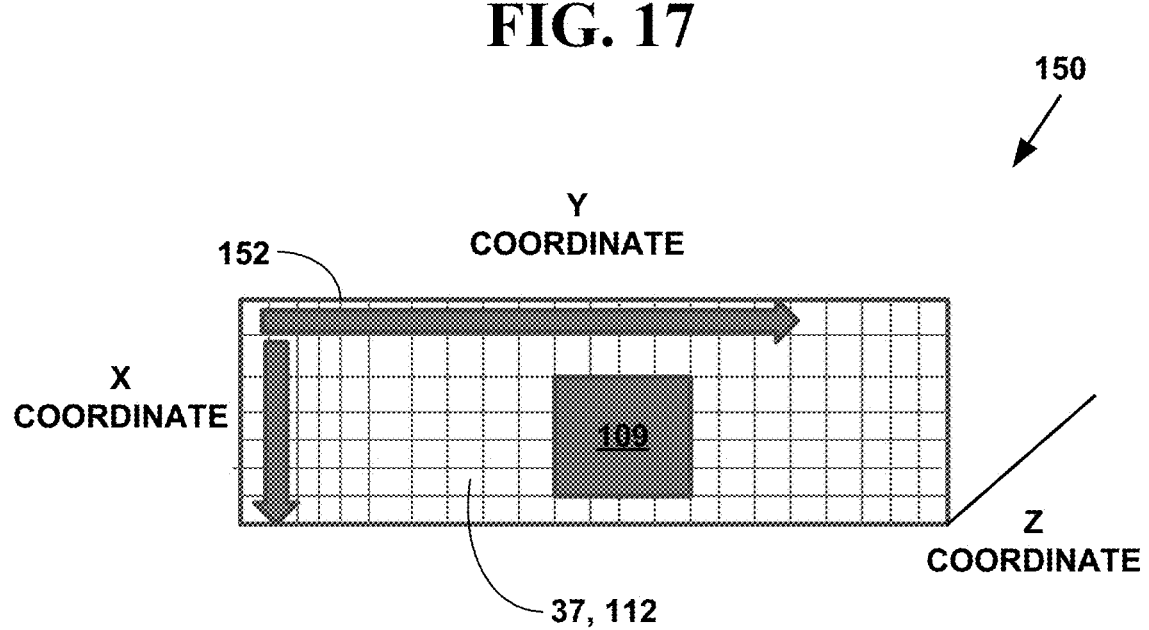
FIG. 17 is a block diagram illustrating an exemplary display grid for a created N-layer digital image.

FIG. 17 is a block diagram 150 illustrating an exemplary display grid 152 for a created N-layer digital image. In one exemplary embodiment, the pre-determined shelf layout (FIG. 3, item 36, FIG. 11, item 112) is created using database entries 148 from database 22 and display grid 152. In such an embodiment, a database entry 148 is read from database 22 and the grid 152 is used to display one or more vector images at pre-determined locations on the shelf layout. FIG. 17 illustrates various X, Y and Z orientations. However, the present invention is not limited to such an embodiment and other X, Y and Z orientations can be used to practice the invention.

Returning to FIG. 9 at Step 96 with additional steps added, Step 96 further includes reading a database entry 148 from the database 22 associated with the server network device 12 for a selected vector image, determining an set of display coordinates (X, Y, Z) from the database entry 148 for the selected vector image and displaying with the application 25 from the computer readable medium the selected vector image in N-layer digital image 70, 106 with a progressive resolution display using the determined set of display coordinates.

Figure 18:
FIG. 18 is a block diagram illustrating a vector image of a consumer product displayed at Level-N in the N-level digital image.

FIG. 18 is a block diagram 154 illustrating a vector image of a consumer product 156 displayed at Level-N in the N-level digital image 106. This vector image is vector image 100 (FIG. 10) displayed only with a set of exemplary electronic links added (all original links displayed in FIG. 12) at step 90 of Method 84. However, FIG. 18 is exemplary only and more, fewer and other electronic links can be displayed at Level-N in the N-level digital image. Similarly, FIG. 13 illustrates only those electronic links 120 displayed on a visual overlay In another exemplary embodiment, with additions, Step 96 further includes displaying with the application 25 from the computer readable medium the created N-layer digital image 106 with a progressive resolution display by displaying the created vector images for created visual overlays 108, 110 at a first level; and displaying with the displaying with the application from the computer readable medium vector images for the consumer products 112, 100, 102 at a second lower level beneath the first level. (FIG. 11). However, the present invention is not limited to this embodiment.

However the present invention is not limited to use of the exemplary database entries (FIG. 16) or the exemplary display grid (FIG. 17) and the present invention can be practiced with the N-layer digital image 70, 106 stored in a computer readable medium of the network devices 12, 12' and displayed using different types of display grids.

In one embodiment, virtual store display application 25 is used with the SILVERLIGHT® application by MICROSOFT® of Redmond, Wash. to practice the methods and systems described herein. SILVERLIGHT is a free plug-in powered by the MICROSOFT .NET framework that is compatible across multiple browsers, devices and operating systems to bring a new level of interactivity wherever the Web works. With support for advanced data integration, multithreading, HD video using IIS Smooth Streaming, and built in content protection, SILVERLIGHT enables online and offline applications for a broad range of business and consumer scenarios. However, present invention is not limited to this embodiment, and the present invention can be practiced with or without, SILVERLIGHT and/or other similar or non-similar applications and/or frameworks.

In another embodiment, virtual store display application 25 is used with an HTML-5 application. In another embodiment, the virtual store display application 25 is used with a JAVA application, XML application, and/or other types of markup, scripted or complied language (e.g., C, C++, C#, etc.) applications.

In one embodiment, the N-layer digital image 70, 160 is stored in a progressive resolution format. In another embodiment, the N-layer digital image is stored in a vector image format. In yet another embodiment, the N-layer digital image is stored in other storage format other than a progressive resolution format. In one embodiment, the N-layer digital image 70, 160 is displayed with a progressive resolution display. In another embodiment, the N-layer digital image 70, 160 is displayed with a display format other than a progressive resolution display. Various combinations of using and not using progressive resolution display storage format and using and not using progressive resolution display techniques can be used with other storage formats and other display techniques as well to practice the invention.

The methods and system described herein are illustrated with descriptions of consumer products. However, the present invention is not limited for use with consumer products and other types of products (e.g., commercial products, etc.) and other types of items can also be used to practice the invention.

Displaying Web-site Information with N-layer Digital Images

In one embodiment, a N-layer digital image is created using the methods and system described herein to be used as home page for a website on the Internet, an intranet, cloud communications network 24, etc. In such an embodiment, the N-layer digital image is stored in progressive resolution format and is view with progressive resolution display. The N-layer digital image replaces HTML, XML, Java and other types of textual and/or "flat" and/or one-dimensional electronic information types. In one embodiment, the N-layer digital image is viewed with a conventional browser. In another embodiment, the N-layer digital image is view with a network (e.g., Internet, intranet, etc. browser plug in (e.g., application 25, etc.).

Figure 19:
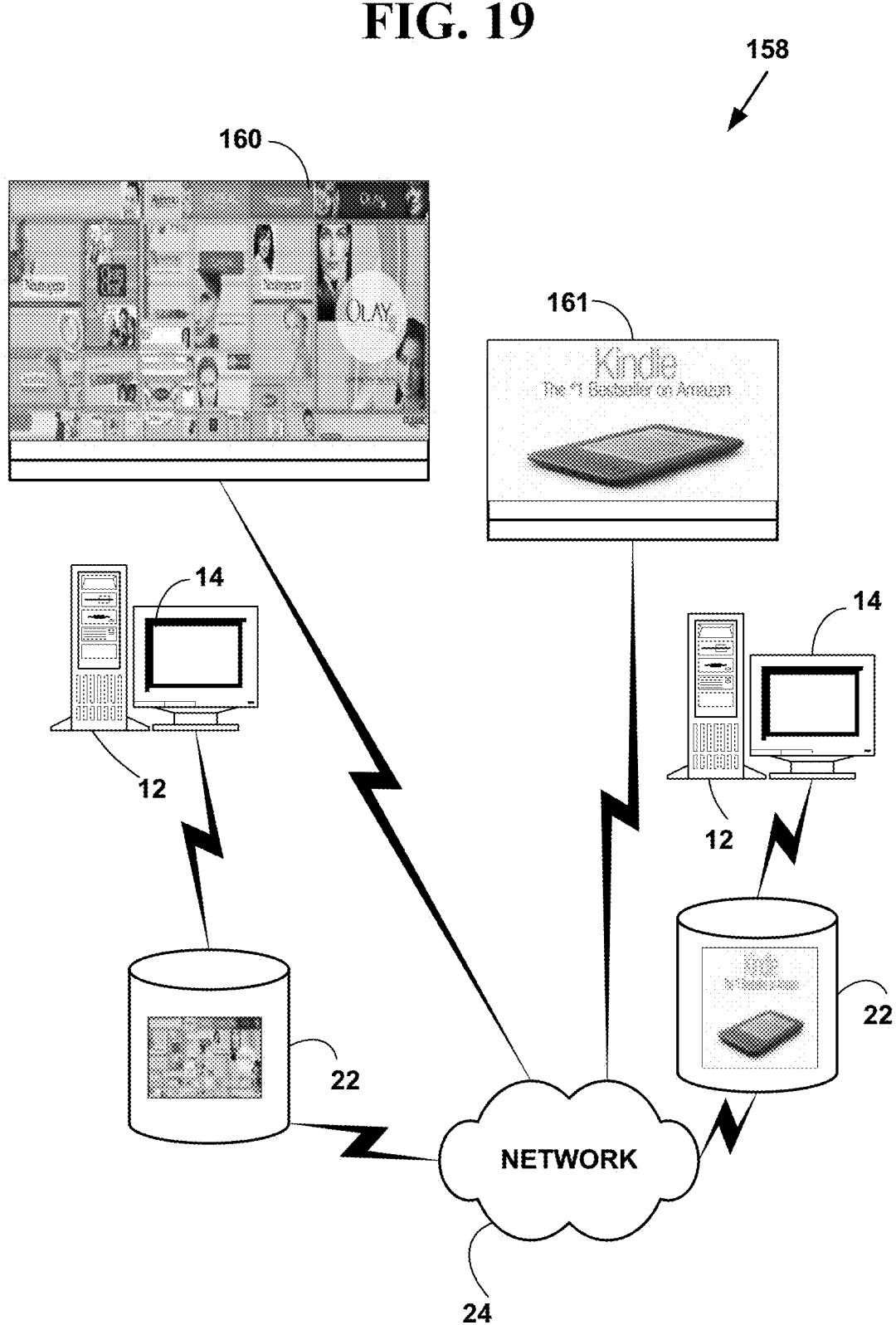
FIG. 19 is a block diagram illustrating an N-layer digital image used as a home page on a website.

FIG. 19 is a block diagram 158 illustrating an N-layer digital image 160, 161 used as a home page on a website. The N-layer digital image 160, 161 includes various combinations of vector images including visual overlays and other vector images. For example, the N-layer digital image 160, 161 may include vector images of visual overlays for a group of web-sites for a specific type of search information (e.g., restaurants, hotels, airlines, etc.) or general information. The N-layer digital image 160, 161 may also include vector images of visual overlays for groups of information (e.g., search engine web-sites, etc.). The present invention provides a new way to store, display and view information on web-sites and other information sites connected to a communications network (e.g., the Internet, an intranet, etc.).

FIG. 19 illustrates an N-layer digital image as a home page on a web-site that sells face products 160 or general consumer products 161. However, the present invention is not limited to such an embodiment and other embodiments can be used to practice the invention.

When used as a home page for a web-site the N-layer digital image may be stored in a progressive resolution format and/or other than a progressive resolution format, and displayed in a progressive resolution format and/or displayed in other than progressive resolution format.

The methods and system described herein create an N-layer digital image in a stored progressive resolution format and displayed with a progressive resolution display method that provides a virtual shopping experience is similar to and emulates a shopping experience in an actual retail store.

Cloud Computing Networks

Figure 20:
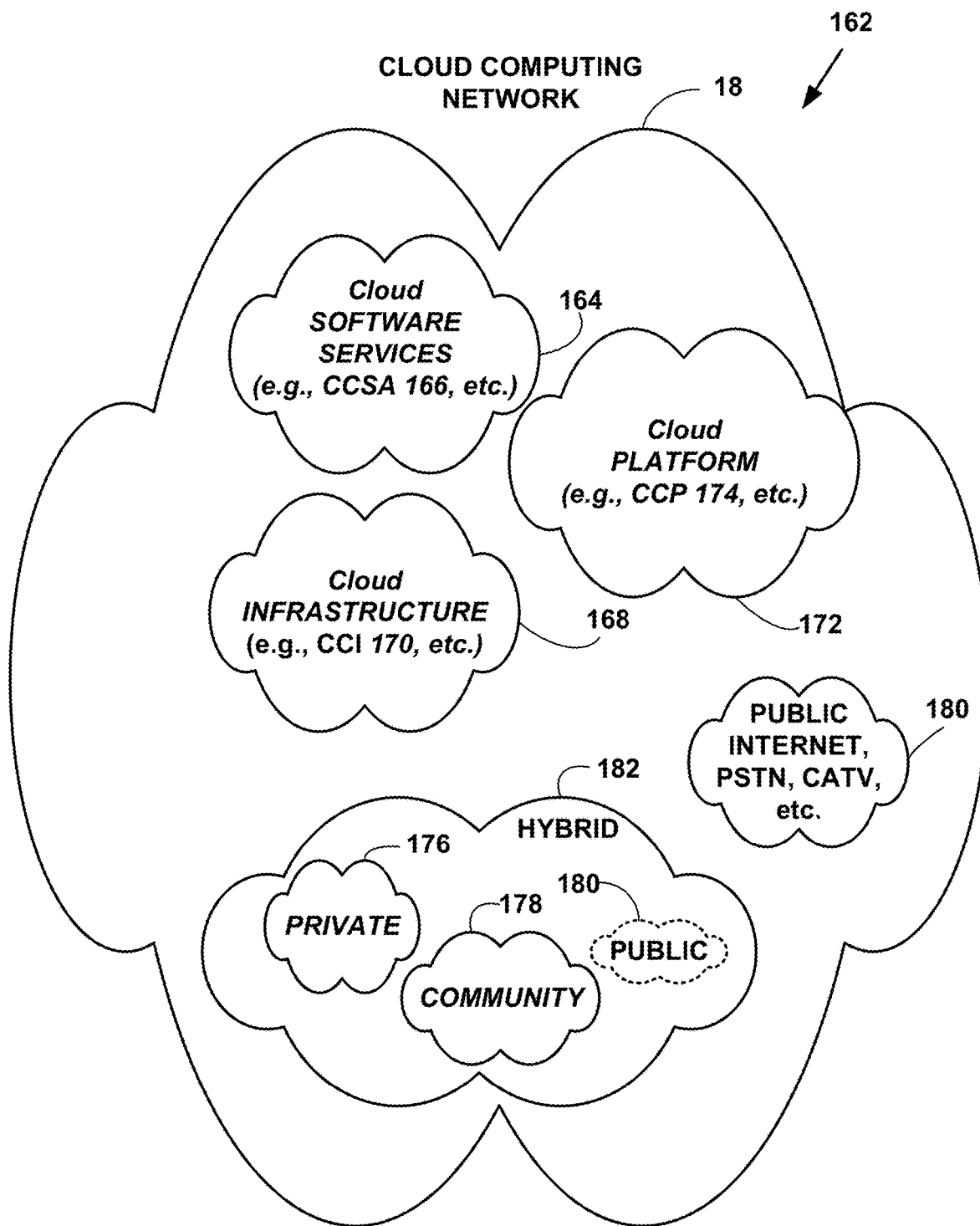
FIG. 20 is a block diagram illustrating a cloud communications network.

FIG. 20 is a block diagram 162 illustrating a cloud communications network 24. The cloud computing network 24 is also referred to as a "cloud communications network" 24. However, the present invention is not limited to this cloud computing model and other cloud computing models can also be used to practice the invention. The exemplary cloud communications network includes both wired and/or wireless components of public and private networks.

In one embodiment, the cloud computing network 24 includes a cloud communications network 24 comprising plural different cloud component networks 174, 176, 178, 180. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand image creation and display services. Electronic image creation and display servers can unilaterally provision computing capabilities, such as server time and network storage, as needed automatically without requiring human interaction with each network server 11, 12 on the cloud communications network 24.
2. Broadband network access. Electronic image creation and display capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G and/or 4G wireless and/or wired and broadband and/or ultra-broad band (e.g., WiMAX, etc.) network access.
3. Resource pooling. Electronic image and display computing resources are
pooled to serve multiple requesters using a multi-tenant model, with different physical and virtual resources dynamically assigned and reassigned according to electronic content retrieval demand There is location independence in that an requester of electronic content has no control and/ or knowledge over the exact location of the provided by the electronic image creation and display resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for electronic image creation and displayers. To the electronic image creation and displayers, the electronic content storage and retrieval capabilities available for provisioning appear to be unlimited and can be used in any quantity at any time.
5. Measured Services. Cloud computing systems automatically control and optimize resource use by leveraging a metering capability at some level of abstraction appropriate to the type of electronic image creation and display services (e.g., storage, processing, bandwidth, custom electronic content retrieval applications, etc.). Electronic image creation and display usage is monitored, controlled, and reported providing transparency for both the electronic content provider and the electronic content requester of the utilized electronic content storage retrieval service.

Exemplary cloud computing service models illustrated in FIG. 20 appear in Table 2. However, the present invention is not limited to these service models and more, fewer or other service models can also be used to practice the invention.

TABLE 2

1. Cloud Computing Software Applications 164 for Electronic Image Creation and Display Service (CCSA 166). The capability to use the provider's applications 25 running on a cloud infrastructure 168. The cloud computing applications 164, are accessible from the server network device 11, 12 from various client devices 12, 12' through a thin client interface such as a web browser, etc. The user does not manage or control the underlying cloud infrastructure 176 including network, servers, operating systems, storage, or even individual application 25 capabilities, with the possible exception of limited user-specific application configuration settings.

TABLE 2-continued

2. Cloud Computing Infrastructure 168 for an Electronic Image Creation and Display Service (CCI 170). The capability provided to the user is to provision processing, storage and retrieval, networks 18, 174, 166, 178, 180 and other fundamental computing resources where the consumer is able to deploy and run arbitrary software, which can include operating systems and applications 25. The user does not manage or control the underlying cloud infrastructure 168 but has control over operating systems, storage, deployed applications, and possibly limited control of select networking components (e.g., host firewalls, etc.).
3. Cloud Computing Platform 172 for the an Electronic Content Storage and Retrieval Service (CCP 174). The capability provided to the user to deploy onto the cloud infrastructure 170 created or acquired applications created using programming languages and tools supported servers 11, 12, , etc.. The user not manage or control the underlying cloud infrastructure 66 including network, servers, operating systems, or storage, but has control over the deployed applications 25 and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 176. The cloud network infrastructure is operated solely for electronic image and display. It may be managed by the electronic content retrieval or a third party and may exist on premise or off premise.
2. Community cloud network 178. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise.
3. Public cloud network 180. The cloud network infrastructure such as the Internet, PSTN, SATV, CATV, Internet TV, etc. is made available to the general public or a large industry group and is owned by one or more organizations selling cloud services.
4. Hybrid cloud network 182. The cloud network infrastructure 168 is a composition of two and/or more cloud networks 24 (e.g., private 176, community 178, and/or public 180, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 25 for electronic image creation and display takes full advantage of the cloud paradigm by being service oriented with a focus on statelessness, low coupling, modularity, and semantic interoperability for electronic content retrieval. However, cloud software services 174 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 25, offers cloud services for electronic content storage and retrieval. The application 25 offers the cloud computing Infrastructure 168 as a Service 170 (IaaS), including a cloud software infrastructure service 170, the cloud Platform 172 as a Service 174 (PaaS) including a cloud software platform service 174 and/or offers specific cloud software services as a Service 164 (SaaS) including a specific cloud software service 166 for electronic content storage and retrieval. The IaaS, PaaS and SaaS include one or more of cloud services comprising networking, storage, server network device, virtualization, operating system, middleware, run-time, data and/or application services, or plural combinations thereof, on the cloud communications network 24.

Television Services

In one embodiment, the cloud application 25 provides cloud electronic image creation and display services IaaS, PaaS and SaaS from television services over the cloud communications network 24. The television services include digital television services, including, but not limited to, cable television, satellite television, high-definition television (HDTV), three-dimensional (3D), televisions and other types of network devices.

However, the present invention is not limited to such television services and more, fewer and/or other television services can be used to practice the invention.

Internet Television Services

In one embodiment, the cloud application 25 provides cloud electronic image creation and display services IaaS, PaaS and SaaS from Internet television services over the cloud communications network 24. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud application 25 provides cloud electronic image creation and display services IaaS, PaaS and SaaS from general search engine services. A search engine is designed to search for information on a cloud communications network 24 such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud application 25 provides cloud electronic image creation and display services IaaS, PaaS and SaaS from general search engine services. In another embodiment, the cloud application 25 provides general search engine services by interacting with one or more other public search engines (e.g., GOOGLE, BING, YAHOO, etc.) and/or private search engine services.

In another embodiment, the cloud application 25 provides cloud electronic image creation and display services IaaS, PaaS and SaaS from specialized search engine services, such as vertical search engine services by interacting with one or more other public vertical search engines (e.g., GALAXY-.COM, etc.) and/or private search engine services.

However, the present invention is not limited to such general and/or vertical search engine services and more, fewer and/or other general search engine services can be used to practice the invention.

Social Networking Services

In one embodiment, the cloud application 25 provides cloud electronic image creation and display services IaaS, PaaS and SaaS from one more social networking services including to/from one or more social networking web-sites (e.g., FACEBOOK, U-TUBE, TWITTER, MY-SPACE, MATCH.COM, E-HARMONY, GROUP ON, SOCIAL LIVING, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Music Downloading Services

In one embodiment, the the cloud application 25 provides cloud electronic image creation and display services from services IaaS, PaaS and SaaS from one more music downloading services (e.g., ITUNES, RHAPSODY, etc.) at one or more music downloading sites.

However, the present invention is not limited to the social networking services described and other public and private social networking services can also be used to practice the invention.

Cloud Storage Objects

Figure 21:
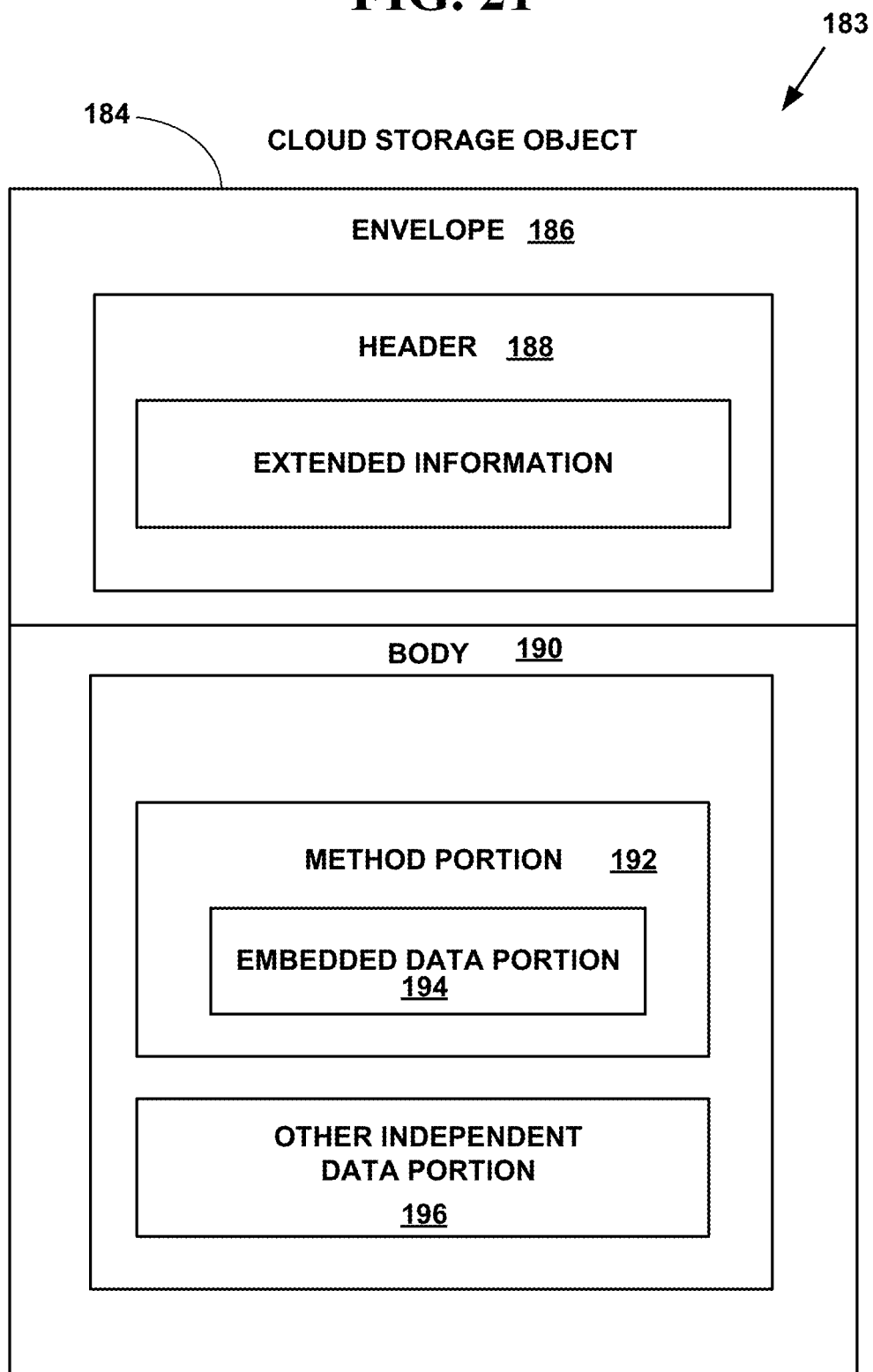
FIG. 21 is a block diagram illustrating an exemplary cloud storage object.

FIG. 21 is a block diagram 183 illustrating an exemplary cloud storage object 184.

The cloud storage object 184 includes an envelope portion 186, with a header portion 188, and a body portion 190. However, the present invention is not limited to such a cloud storage object 184 and other cloud storage objects and other cloud storage objects with more, fewer or other portions can also be used to practice the invention.

The envelope portion 186 uses unique namespace Uniform Resource Identifiers (URIs) and/or Uniform Resource Names (URNs), and/or Uniform Resource Locators (URLs) unique across the cloud communications network 24 to uniquely specify, location and version information and encoding rules used by the cloud storage object 184 across the whole cloud communications network 24. For more information, see IETF RFC-3305, Uniform Resource Identifiers (URIs), URLs, and Uniform Resource Names (URNs), the contents of which are incorporated by reference.

The envelope portion 186 of the cloud storage object 184 is followed by a header portion 188. The header portion 188 includes extended information about the cloud storage objects such as authorization and/or transaction information, etc.

The body portion 190 includes methods 192 (i.e., a sequence of instructions, etc.) for using embedded application-specific data in data elements 194. The body portion 190 typically includes only one portion of plural portions of application-specific data 194 and independent data 196 so the cloud storage object 184 can provide distributed, redundant fault tolerant, security and privacy features described herein.

Cloud storage objects 184 have proven experimentally to be a highly scalable, available and reliable layer of abstraction that also minimizes the limitations of common file systems. Cloud storage objects 184 also provide low latency and low storage and transmission costs.

Cloud storage objects 184 are comprised of many distributed resources, but function as a single storage object, are highly fault tolerant through redundancy and provide distribution of desired electronic content across public communication networks 180, and one or more private networks 176, community networks 178 and hybrid networks 182 of the cloud communications network 24. Cloud storage objects 184 are also highly durable because of creation of copies of portions of desired electronic content across such networks 176, 178, 180, 182 of the cloud communications network 24. Cloud storage objects 184 includes one or more portions of desired electronic content and can be stored on any of the 176, 178, 180, 182 networks of the cloud communications network 24. Cloud storage objects 184 are transparent to a requester of desired electronic content and are managed by cloud applications 25.

In one embodiment, cloud storage objects 184 are configurable arbitrary objects with a size up to hundreds of terabytes, each accompanied by with a few kilobytes of metadata. Cloud objects 184 are organized into and identified by a unique identifier unique across the whole cloud communications network 24. However, the present invention is not limited to the cloud storage objects described, and more fewer and other types of cloud storage objects can be used to practice the invention.

Cloud storage objects 184 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 24, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 24. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

Creating, Displaying and Managing Product images with Cloud Computing

FIGS. 22A. 22B, 22C, 22D and 22E are a flow diagram illustrating a Method 198 for creating, displaying and managing products in a virtual shopping environment. In FIG. 22A at Step 200, a cloud application in a non-transitory computer readable medium on a cloud server network device with one or more processors connected to a cloud communications network comprising: one or more public communication networks, one or more private networks, one or more community networks and one or more hybrid networks, creates a first set of plural vector images from plural corresponding raster images of consumer products. The created first set of the plural vector images include selected ones of the created first set of the plural vector images created at different views of the consumer products and also includes other selected ones of the created plural the first set of plural vector images created at varying levels of detail from the general details to the specific details for the consumer products. At Step 202, the cloud application on the cloud server network device creates a second set of plural vector images for pre-determined groups of consumer products comprising plural visual overlays. At Step 204, the cloud application on the cloud server network device adds a first set of electronic links to individual vector images in the created first set of plural vector images. Only selected ones of electronic links from the first set of electronic links added to an individual vector image are visible and displayable when the individual vector image for a consumer product is displayed. In FIG. 22B at Step 206, the cloud application on the cloud server network device adds a second set of electronic links to the created second set of the plural vector images for the created plural of visual overlays. Only selected ones of electronic links from the second set of electronic links added to an individual vector image are visible and displayable when the individual vector image for a visual overlay from the plurality of visual overlays is displayed. At Step 208, the cloud application on the cloud server network device creates a multi-resolution mosaic (MRM) digital image stored in one or more cloud storage objects in a progressive resolution format for a pre-determined display layout of the consumer products with the created first set and the created second set of the plural vector images and the added first and the added second sets of electronic links. The MRM digital image includes an layered vector image hierarchy of the created first set and the created second set of the plural vector images and wherein the layered vector image hierarchy includes selected ones of vector images from the created first set of the plural vector images displaying the general details for the consumer products or groups of consumer products at a first set of highest levels in the layered vector image hierarchy and other selected ones of vector images from the created first set of plural vector images displaying the specific details for the consumer products at lowest levels in the layered hierarchy and selected ones from the created second set of vector images displaying visual overlays of varying level of details from the general details to specific details for the pre-determined groups of consumer products at a second set of highest levels in the layered vector image hierarchy. In FIG. 22C at Step 210, the cloud application on the cloud server network device displays the created MRM digital image with a progressive resolution display from the one or more cloud storage objects via the cloud communications network to allow virtual shopping via the cloud communications network, thereby creating a seller customized on-line store of consumer products with the created MRM digital image. At Step 212, the cloud application on the cloud server network device displays from the one or more cloud storage objects the created MRM digital image with the progressive resolution display of consumer products with the created plural vector images in the layered vector image hierarchy, the progressive resolution display including displaying, zooming in and zooming out on selected portions of the created MRM digital image and displaying selected ones of the added one or more sets of electronic links in the plural vector image layers and allowing linking to one or more sets of electronic information from different vector image layers in the plural vector image layers during the progressive resolution display of the created MRM digital image. The progressive resolution display of the MRM digital image displays only those one or more sets of electronic links added to a vector image layer currently being viewed in the MRM digital image. At Step 214, the cloud application on the cloud server network device displays from the one or more cloud storage objects with the progressive resolution display of different vector images and different sets of electronic links providing vector images and electronic links to selected electronic information varying from general electronic information to specific electronic information as lower layers are viewed in the plurality of vector image layers. In FIG. 22D, at Step 216, the cloud application on the cloud server network device displays from the one or more cloud storage objects with the progressive resolution display of the MRM digital image the created plural vector images in the plural vector image layers without converting any of the created plural vector images to another format or downloading any raster images associated with the created plural vector images over the cloud communications network. At step 218, the cloud application on the cloud server network device displays from the one or more cloud storage objects a graphical product selection tool via the cloud communications network. At Step 220, the graphical product selection tool displays plural types of different consumer product categories and plural pre-determined demographic groups. At Step 222, one or more selection inputs are received on the graphical product selection tool on the cloud application on the cloud server network device via the cloud communications network to select one or more of the plural types of different consumer product categories or one or more of plural pre-determined demographic groups. In FIG. 22E at Step 224, the graphical product selection tool on the cloud application on the cloud server network device creates on the created plural vector images from the MRM digital image plural graphical markers and a plural electronic links only for any selected ones of the plural selected types of different consumer product categories or the pre-determined demographic groups received in the one or more selection inputs, thereby creating a further seller customized on-line store of consumer products with the created MRM digital image. At Step 226, the cloud application on the cloud server network device stores the created plural graphical markers and the plural electronic links created with the graphical product selection tool with the created MRM digital image in the one or more cloud storage objects. At Step 228, the cloud application on the cloud server network device displays from the one or more cloud storage objects in the progressive resolution display the created MRM digital image with the plural graphical markers and the plural electronic links created with the graphical product selection tool on the created plural vector images and on the MRM digital image on one or more target network devices each with one or more processors via the cloud communications network.

Method 198 is illustrated with an exemplary embodiment. However, the present invention is not limited to such an exemplary embodiment other embodiments can also be used to practice the invention.

Figure 22:
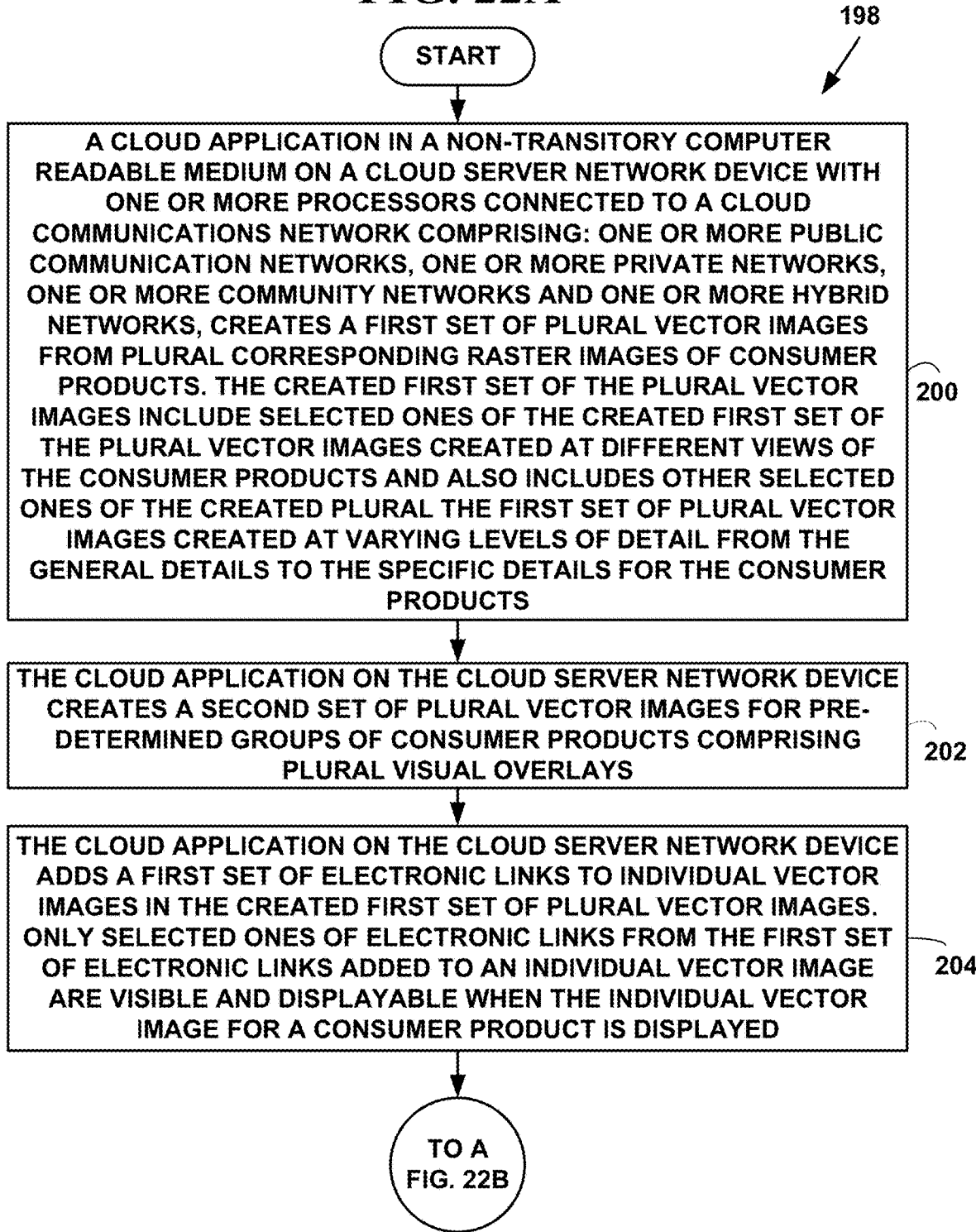
FIGS. 22A, 22B, 22C, 22D and 22E are a flow diagram illustrating a method for creating, displaying and managing products in a virtual shopping environment.

In such an exemplary embodiment in FIG. 22 A at Step 200, a cloud application 25 in a non-transitory computer readable medium on a cloud server network device 12 with one or more processors connected to a cloud communications network 24 comprising: one or more public communication networks 180, one or more private networks 176, one or more community networks 178 and one or more hybrid networks 182, creates a first set of plural vector images from plural corresponding raster images of consumer products 20. The created first set of the plural vector images include selected ones of the created first set of the plural vector images created at different views of the consumer products and also includes other selected ones of the created plural the first set of plural vector images created at varying levels of detail from the general details to the specific details for the consumer products (See, e.g., FIGS. 8 and 11 and corresponding text).

At Step 202, the cloud application 25 on the cloud server network device 12 creates a second set of plural vector images for pre-determined groups of consumer products comprising plural visual overlays.

At Step 204, the cloud application 25 on the cloud server network device 25 adds a first set of electronic links to individual vector images in the created first set of plural vector images. Only selected ones of electronic links from the first set of electronic links added to an individual vector image are visible and displayable when the individual vector image for a consumer product is displayed. (See e.g., FIGS. 8, 11, 13).

In FIG. 22B at Step 206, the cloud application 25 on the cloud server network device 12 adds a second set of electronic links to the created second set of the plural vector images for the created plural of visual overlays. Only selected ones of electronic links from the second set of electronic links added to an individual vector image are visible and displayable when the individual vector image for a visual overlay from the plurality of visual overlays is displayed. (See e.g., FIGS. 8, 11, 12, 13, 18, etc.).

At Step 208, the cloud application 25 on the cloud server network device 12 creates a multi-resolution mosaic (MRM) digital image 37, 38, 42, 70 stored in one or more cloud storage objects 184 in a progressive resolution format for a pre-determined display layout of the consumer products with the created first set and the created second set of the plural vector images and the added first and the added second sets of electronic links.

The MRM digital image 37, 38, 42, 70 includes an layered vector image hierarchy of the created first set and the created second set of the plural vector images and wherein the layered vector image hierarchy includes selected ones of vector images from the created first set of the plural vector images displaying the general details for the consumer products or groups of consumer products 20 at a first set of highest levels in the layered vector image hierarchy and other selected ones of vector images from the created first set of plural vector images displaying the specific details for the consumer products at lowest levels 108 in the layered hierarchy and selected ones from the created second set of vector images displaying visual overlays of varying level of details from the general details 112 to specific details 108 for the pre-determined groups of consumer products 20 at a second set of highest levels in the layered vector image hierarchy. (See e.g., FIGS. 8, 11, 12, 13, 18, etc.).

In FIG. 22C at Step 210, the cloud application 25 on the cloud server network device 12 displays the created MRM digital image 37, 38, 42, 70 with a progressive resolution display from the one or more cloud storage objects 184 via the cloud communications network 24 to allow virtual shopping via the cloud communications network, thereby creating a seller customized on-line store of consumer products with the created MRM digital image 37, 38, 42, 70.

At Step 212, the cloud application 25 on the cloud server network device 12 displays from the one or more cloud storage objects 184 the created MRM digital image 37, 38, 42, 70 with the progressive resolution display of consumer products with the created plural vector images in the layered vector image hierarchy, the progressive resolution display including displaying, zooming in and zooming out on selected portions of the created MRM digital image 37, 38, 42, 70 and displaying selected ones of the added one or more sets of electronic links in the plural vector image layers and allowing linking to one or more sets of electronic information from different vector image layers in the plural vector image layers during the progressive resolution display of the created MRM digital image 37, 38, 42, 70. The progressive resolution display of the MRM digital image displays only those one or more sets of electronic links added to a vector image layer currently being viewed in the MRM digital image 37, 38, 42, 70.

At Step 214, the cloud application 25 on the cloud server network device 12 displays from the one or more cloud storage objects 184 with the progressive resolution display of different vector images and different sets of electronic links providing vector images and electronic links to selected electronic information varying from general electronic information to specific electronic information as lower layers are viewed in the plurality of vector image layers.

In FIG. 22C at Step 216, the cloud application 25 on the cloud server network device 12 displays from the one or more cloud storage objects 184 with the progressive resolution display of the MRM digital image 37, 38, 42, 70 the created plural vector images in the plural vector image layers without converting any of the created plural vector images to another format or downloading any raster images associated with the created plural vector images over the cloud communications network 24.

At step 218, the cloud application 25 on the cloud server network device 12 displays from the one or more cloud storage objects 184 a graphical product selection tool 124 (FIG. 14) via the cloud communications network 24.

At Step 220, the graphical product selection tool displays plural types of different consumer product categories 126 and plural pre-determined demographic groups 128, 130, 132, 134, 136.

At Step 222, one or more selection inputs are received on the graphical product selection tool 124 on the cloud application 25 on the cloud server network device 12 via the cloud communications network 24 to select one or more of the plural types of different consumer product categories 126 or one or more of plural pre-determined demographic groups 128, 130, 132, 134, 136.

In FIG. 22E at Step 224, the graphical product selection tool 124 on the cloud application 25 on the cloud server network device 12 creates on the created plural vector images from the MRM digital image 108, 37, 38, 42, 70 plural graphical markers 120 and a plural electronic links only for any selected ones of the plural selected types of different consumer product categories 126 or the pre-determined demographic groups 128, 130, 132, 134, 136 received in the one or more selection inputs, thereby creating a further seller customized on-line store of consumer products with the created MRM digital image 108, 37, 38, 42, 70.

At Step 226, the cloud application 25 on the cloud server network device 12 stores the created plural graphical markers and the plural electronic links created with the graphical product selection tool 124 with the created MRM digital image 108, 37, 38, 42, 70 in the one or more cloud storage objects 184.

At Step 228, the cloud application 25 on the cloud server network device 12 displays from the one or more cloud storage objects 184 in the progressive resolution display the created MRM digital image 108, 37, 38, 42, 70 with the plural graphical markers and the plural electronic links created with the graphical product selection tool 124 on the created plural vector images and on the MRM digital image 108, 37, 38, 42, 70 on one or more target network devices 12' each with one or more processors via the cloud communications network 24.

In one embodiment, created MRM digital image comprises 108, 37, 38, 42, 70 a web-site 160, 161 used on another cloud server network device 11 on the cloud communications network 24. In another embodiment, the created MRM digital image 108, 37, 38, 42, 70 comprises an advertising platform 160, 161 available on internet television services, search engine services and/or social networking services via the cloud communications network 24.

Progressive Resolution Display of Product Images from a Graphical Shopping Purchase Object In one embodiment, one or more selection inputs are received on the graphical product selection tool from a target network device to select one or more consumer products from a created MRM digital image.

The graphical product selection tool creates on plural vector images from the created MRM digital image plural graphical markers and plural electronic links only for any selected ones of the plural selected consumer products received in the one or more selection inputs, thereby creating a further seller customized on-line store of selected consumer products that is stored as a customized MRM digital image.

A user selects one or more of the selected consumer products for purchase and places the items in a graphical shopping purchase object that allows progressive resolution display of the items in the graphical shopping purchase object.

Figure 23:
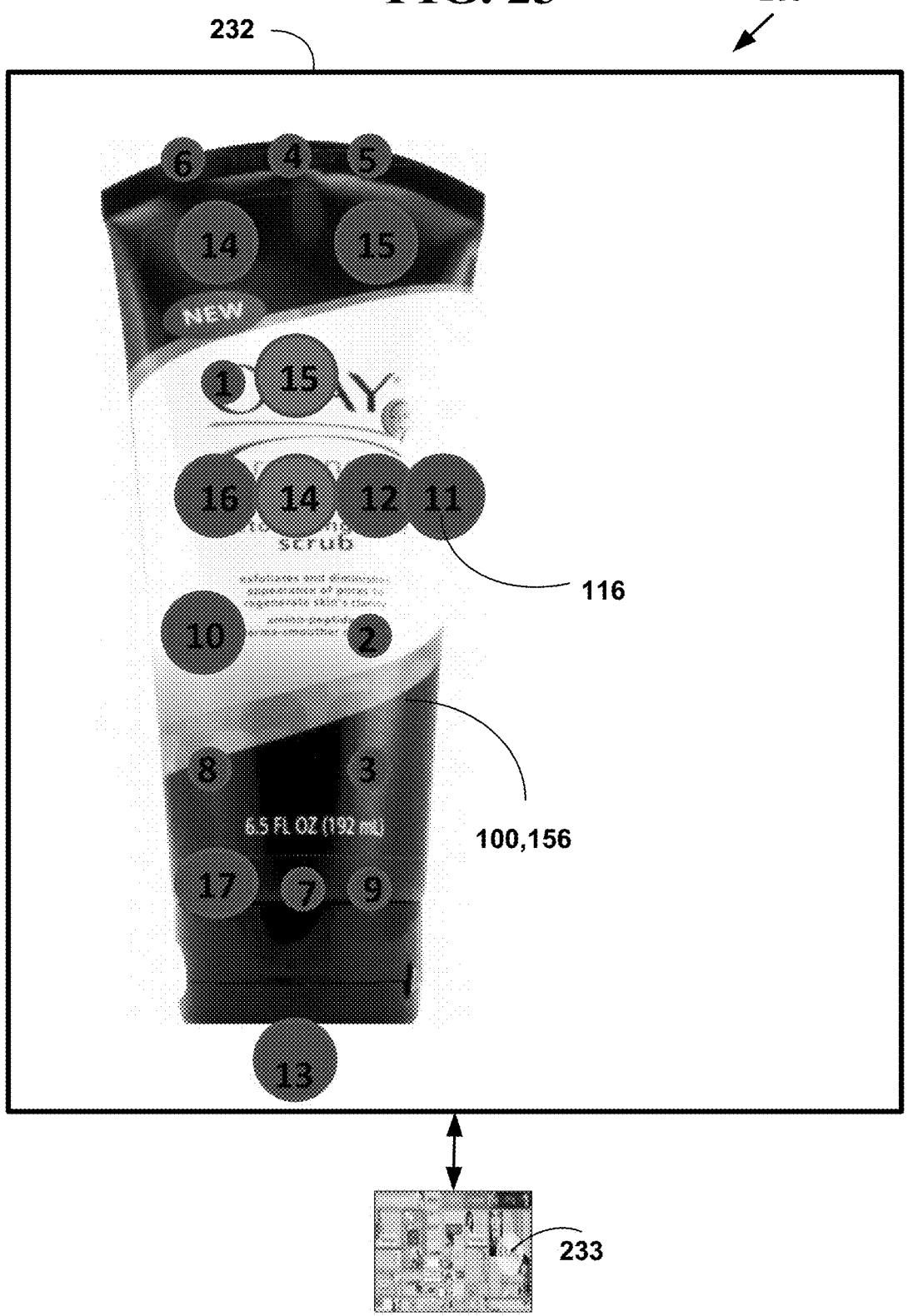
FIG. 23 is a block diagram illustrating a virtual visual shopping cart providing progressive resolution display of selected consumer products.

FIG. 23 is a block diagram 230 illustrating a graphical shopping purchase object 232 that provides progressive resolution display of any consumer products selected by a user. Consumer products selected by a user are displayed as one or more vector images at a lowest level-N in the N-level digital image in the M-level customized MRM digital image. Only one selected consumer product 100,156 is illustrated for simplicity. However, the graphical shopping purchase object 232 would typically include plural selected consumer products for purchase.

For example, if a user selected consumer product 100, it would appear in the graphical shopping purchase object 232 as consumer product 156 displayed at Level-N in the N-level digital image 106 created with user inputs. This vector image of the consumer product in FIG. 23 is the vector image 100 (FIG. 10) displayed with the set of exemplary electronic links added (all original links 116 displayed in FIG. 12) at step 90 of Method 84. The consumer product 156 is at a lowest level-N in the N-level digital image 106. If the user selected consumer product 156, they could return to the various layers of the progressive resolution display back up to the first or highest level such as Level one 108 (FIG. 11) and then back down again, etc., directly from the graphical shopping purchase object 232.

A user can select the consumer product 156 in the graphical shopping purchase object 232 and with the progressive resolution display return to the highest level, level-1 in the N-level digital image to select new or different consumer products directly from the graphical shopping purchase object.

Progressive resolution display of selected consumer products directly from the graphical shopping purchase object 232 allows a user to review items that the user desire to purchase and select new, additional and/or different items from the customized on-line store in the customized plural layer MRM digital image.

In on embodiment, the graphical shopping purchase object 232 includes a graphical shopping cart and/or a graphical shopping bag and/or some other graphical shopping entity used to collect consumer products a user desires to purchase. However, the present invention is not limited to these graphical objects and other objects can be used to practice the invention.

Figure 24B:
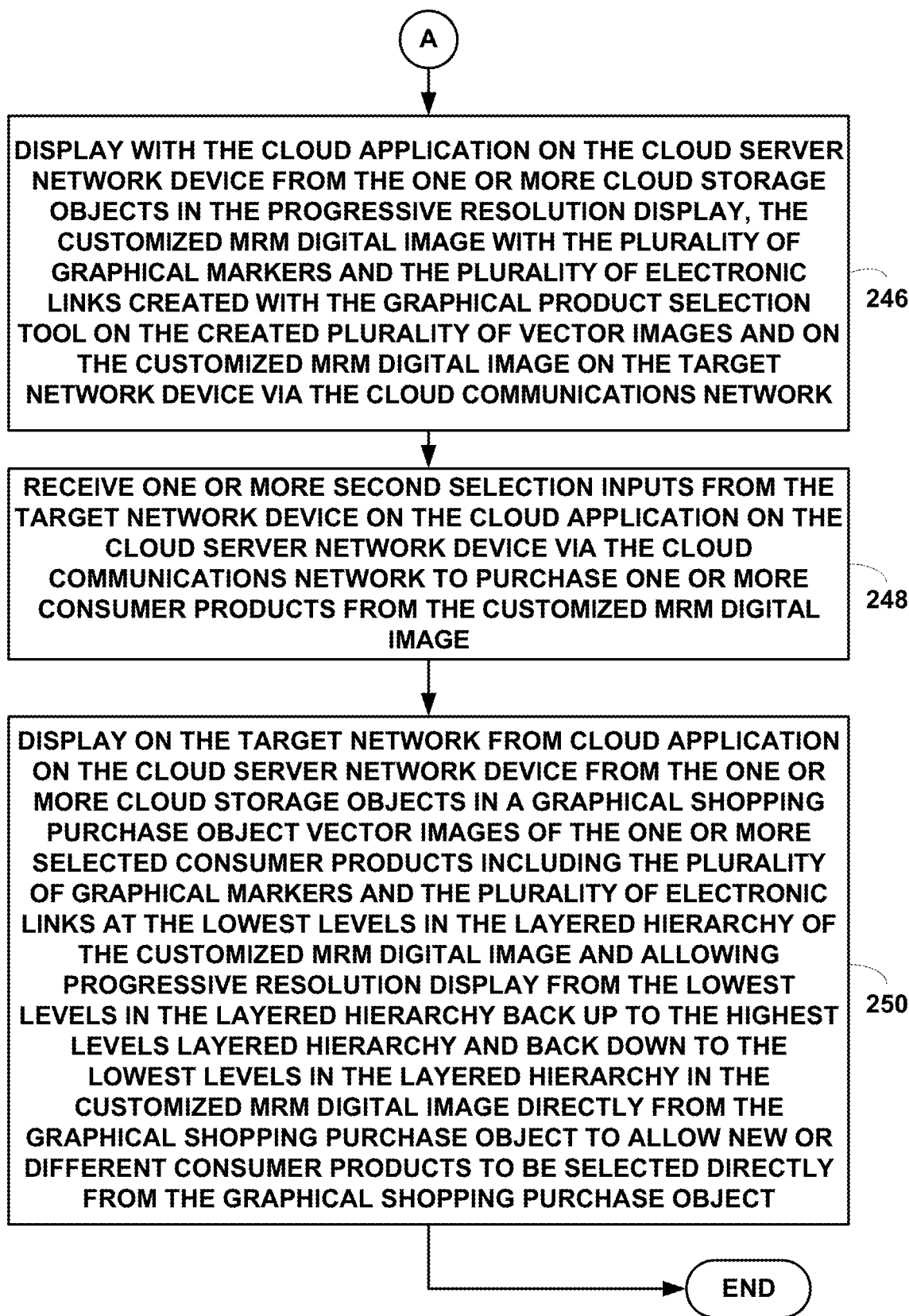

FIGS. 24A and 24B are a flow diagram illustrating Method 234 for progressive resolution display of selected consumer products directly from a graphical shopping cart/ bag. In FIG. 24A at Step 236, Method 198 of FIG. 22 is executed until Step 218. At Step 238, the cloud application displays from the one or more cloud storage objects a graphical product selection tool via the cloud communications network. At Step 240, one or more selection inputs are received on the graphical product selection tool from a target network device with one or more processors on the cloud application on the cloud server network device via the cloud communications network to select one or more consumer products from the created MRM digital image. At Step 242, the graphical product selection tool on the cloud application on the cloud server network device creates on the created plural vector images from the created MRM digital image plural graphical markers and plural electronic links for the one or more consumer products received in the one or more selection inputs, thereby creating a further seller customized on-line store of selected consumer products as a customized MRM digital image. At Step 244, the cloud application stores in the one or more cloud storage objects the customized MRM digital image. In FIG. 24B at Step 246, the cloud application on the cloud server network device displays from the one or more cloud storage objects in the progressive resolution display, the customized MRM digital image with the plural graphical markers and the plural electronic links created with the graphical product selection tool on the created plural vector images and on the customized MRM digital image on the target network device via the cloud communications network. At Step 248, one or more second selection inputs from the target network device are received on the cloud application on the cloud server network device via the cloud communications network to purchase one or more consumer products from the customized MRM digital image. At Step 250, the cloud application on the cloud server network device displays on the target network device from the one or more cloud storage objects in a graphical shopping purchase object vector images of the one or more selected consumer products including the plural graphical markers and the plural electronic links at the lowest levels in the layered hierarchy of the customized MRM digital image and allowing progressive resolution display from the lowest levels in the layered hierarchy back up to the highest levels layered hierarchy and back down to the lowest levels in the layered hierarchy in the customized MRM digital image directly from the graphical shopping purchase object to allow new or different consumer products to be selected directly from the graphical shopping purchase object.

Method 234 is illustrated with an exemplary embodiment. However, the present invention is not limited to such an exemplary embodiment other embodiments can also be used to practice the invention.

In such an exemplary embodiment in FIG. 24A at Step 236, Method 198 of FIG. 22 is executed until Step 218. However, other methods can be used to practice the invention and the present invention is not limited to using Method 198.

At Step 238, the cloud application 25 displays from the one or more cloud storage objects 184 a graphical product selection tool 124 via the cloud communications network 24.

At Step 240, one or more selection inputs are received on the graphical product selection tool 124 from a target network device 12' with one or more processors on the cloud application 25 on the cloud server network device 12 via the cloud communications network 24 to select one or more consumer products from the created MRM digital image 37, 38, 42, 70, 108.

At Step 242, the graphical product selection tool 124 on the cloud application 25 on the cloud server network device 12 creates on the created plural vector images from the created MRM digital image 37, 38, 42, 70, 108 plural graphical markers 120 and plural electronic links 116 for the one or more consumer products received in the one or more selection inputs, thereby creating a further seller customized on-line store of selected consumer products as a customized MRM digital image 139, 233.

At Step 244, the cloud application 25 stores in the one or more cloud storage objects 184 the customized MRM digital image 139, 233.

In FIG. 24B at Step 246, the cloud application 25 on the cloud server network device 12 displays from the one or more cloud storage objects 184 in the progressive resolution display, the customized MRM digital image 139, 233 with the plural graphical markers 120 and the plural electronic links 116 created with the graphical product selection tool 124 on the created plural vector images and on the customized MRM digital image 33 on the target network device 12' via the cloud communications network 24.

At Step 248, one or more second selection inputs from the target network device 12' are received on the cloud application 25 on the cloud server network device 12 via the cloud communications network 24 to purchase one or more consumer products from the customized MRM digital image 139, 233.

At Step 250, the cloud application 25 on the cloud server network device 12 displays on the target network device 12' from the one or more cloud storage objects 184 in a graphical shopping purchase object 232, vector images of the one or more selected consumer products including the plural graphical markers 120 and the plural electronic links 124 at the lowest levels in the layered hierarchy of the customized MRM digital image 139, 233 and allowing progressive resolution display from the lowest levels in the layered hierarchy back up to the highest levels layered hierarchy and back down to the lowest levels in the layered hierarchy in the customized MRM digital image 139, 233 directly from the graphical shopping purchase object 232 to allow new and/or different consumer products to be selected directly from the graphical shopping purchase object 232.

If new and/or different consumer products are selected via progressive resolution display from the graphical shopping purchase object 232, they are added to the graphical shopping purchase object 232 without affecting any selected consumer products 234 already in the graphical shopping purchase object 232. The progressive resolution display of selected consumer products in the graphical shopping purchase object 232 also allows selected consumer products in the graphical shopping purchase object 232 to be compared to other consumer products in the customized MRM digital image 139, 233 without removing them from the graphical shopping purchase object 232. Such actions are not possible with graphical shopping carts/bags known the art.

The methods and system described herein create a plural layer MRM digital image in a stored progressive resolution format in one or more cloud storage objects and displayed via a cloud communications network with progressive resolution display methods including progressive resolution display method from a graphical shopping cart and/or bag that provides a virtual shopping experience is similar to and emulates a shopping experience in an actual retail store.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

I claim:

1. A method for displaying and managing products in a virtual display environment with a cloud communications network, comprising:
   creating with a cloud application in a non-transitory computer readable medium on a cloud server network device with one or more processors connected to a cloud communications network, a first set of a plurality of vector images from a plurality of corresponding raster images of a set of consumer products, wherein the created first set of the plurality of vector images include selected ones of the created first set of the plurality of vector images created at different views of the set of consumer products and also include other selected ones of the created first set of the plurality of vector images created at varying levels of detail from general details to specific details for the set of consumer products;
   creating with the cloud application a second set of a plurality of vector images for pre-determined groups of the set of consumer products comprising a plurality of visual overlays;
   adding with the cloud application a first set of electronic links to individual vector images in the created first set of the plurality of vector images, wherein only selected ones of electronic links from the first set of electronic links added to an individual vector image are visible and displayable when the individual vector image for an individual consumer product from the set of consumer products is displayed;
   adding with the cloud application a second set of electronic links to the created second set of the plurality of vector images for the created plurality of visual overlays, wherein only selected ones of electronic links from the second set of electronic links added to the individual vector image are visible and displayable when the individual vector image for an individual visual overlay from the created plurality of visual overlays is displayed;
   creating with the cloud application a multi-resolution mosaic (MRM) digital image stored in one or more cloud storage objects in a progressive resolution format for a pre-determined display layout of the set of consumer products with the created first set and the created second set of the plurality of vector images and the added first and the added second sets of electronic links,
   wherein the created MRM digital image includes an layered vector image hierarchy of the created first set and the created second set of the plurality of vector images and wherein the layered vector image hierarchy includes selected ones of vector images from the created first set of the plurality of vector images displaying the general details for the set of consumer products at a first set of highest levels in the layered vector image hierarchy and other selected ones of vector images from the created first set of the plurality of vector images displaying the specific details for the set of consumer products at lowest levels in the layered hierarchy and selected ones from the created second set of the plurality of vector images displaying the created plurality of visual overlays of varying level of details from the general details to specific details for the pre-determined groups of the set of consumer products at a second set of highest levels in the layered vector image hierarchy;
   displaying with the cloud application the created MRM digital image with a progressive resolution display from the one or more cloud storage objects via the cloud communications network to allow virtual shopping via the cloud communications network, thereby creating a seller customized on-line store of the set of consumer products with the created MRM digital image;
   displaying with the cloud application from the one or more cloud storage objects the created MRM digital image with the progressive resolution display of the set of consumer products with the created plurality of vector images in the layered vector image hierarchy, the progressive resolution display including displaying, zooming in and zooming out on selected portions of the created MRM digital image and displaying selected ones of the added first set or second set of electronic links in the plurality of vector image layers and allowing linking to one or more sets of electronic information from different vector image layers in the plurality of vector image layers during the progressive resolution display of the created MRM digital image, wherein the progressive resolution display of the created MRM digital image displays only the selected ones of electronic links added to a vector image layer currently being viewed in the created MRM digital image, wherein varying from general electronic information to specific electronic information as lower layers are viewed in the plurality of vector image layers;

displaying with the cloud application from the one or more cloud storage objects with the progressive resolution display of the created MRM digital image the created plurality of vector images in the plurality of vector image layers without converting any of the created plurality of vector images to another format or downloading any raster images associated with the created plurality of vector images over the cloud communications network;

displaying with the cloud application from the one or more cloud storage objects a graphical product selection tool via the cloud communications network;

receiving one or more selection inputs on the graphical product selection tool from a target network device with one or more other processors on the cloud application on the cloud server network device via the cloud communications network to select one or more consumer products in the set of consumer products from the created MRM digital image;

creating from the graphical product selection tool on the cloud application on the cloud server network device on the created plurality of vector images from the created MRM digital image a plurality of graphical markers and a plurality of new electronic links for the selected one or more consumer products received in the one or more selection inputs, thereby creating a further seller customized on-line store of the selected one or more consumer products as a customized MRM digital image;

storing with the cloud application in the one or more cloud storage objects the customized MRM digital image;

displaying with the cloud application on the cloud server network device from the one or more cloud storage objects in the progressive resolution display, the customized MRM digital image with the plurality of graphical markers and the plurality of new electronic links created with the graphical product selection tool on the created plurality of vector images and on the customized MRM digital image on the target network device via the cloud communications network;

receiving one or more second selection inputs from the target network device on the cloud application on the cloud server network device via the cloud communications network to purchase a desired set of one or more consumer products from the customized MRM digital image; and displaying on the target network device from the cloud application on the cloud server network device from the one or more cloud storage objects in a graphical shopping purchase object, vector images of the desired set of one or more selected consumer products including the plurality of graphical markers and the plurality of new electronic links at the lowest levels in the layered hierarchy of the customized MRM digital image and allowing progressive resolution display from the lowest levels in the layered hierarchy back up to the highest levels layered hierarchy and back down to the lowest levels in the layered hierarchy in the customized MRM digital image directly from the graphical shopping purchase object, the progressive resolution display also allowing a new or different second desired set of consumer products from the set of consumer products to be selected directly from the graphical shopping purchase object.

2. The method of claim 1 wherein the cloud storage object includes one or more of a REpresentational State Transfer (REST) or Simple Object Access Protocol (SOAP) cloud storage objects, portions thereof, or a combination thereof.

3. The method of claim 1 wherein the cloud application offers the cloud computing Infrastructure as a Service (IaaS), the cloud computing Platform, as a Service (PaaS) and offers Specific cloud Electronic Image Creation and Display services as a Service (SaaS) including a cloud software service, wherein the IaaS, PaaS and SaaS include one or more of automatic secure electronic image creation and display services comprising networking, storage, server network device, virtualization, operating system, middleware, runtime, data or application services, or plural combinations thereof, on the cloud communications network.

4. The method of claim 3 wherein the cloud automatic secure electronic image creation and display services are provided via internet television services, search engine services and/or social networking services on the cloud communications network.

5. The method of claim 1 wherein the target network device includes desktop computers, laptop computers, tablet computers, mobile phones, non-mobile phones, smart phones, personal digital/data assistants (PDA), digital cameras, portable game consoles, non-portable game consoles, wearable network devices, cable television (CATV) set-top boxes, satellite television boxes, or digital televisions including high-definition (HDTV) and three-dimensional (3D) televisions.

6. The method of claim 1 wherein the vector images including the visual overlays include a plurality of vector images comprising, brand information, sub-brand information, product category information or product information.

7. The method of claim 1 wherein the first set of electronic links or the second set of electronic links includes electronic links to print advertising, audio advertising, video advertising, or web-sites accessible via the cloud communications network including additional information about the consumer products.

8. The method of claim 1 wherein the graphical markers include graphical icons for new products, products on sale, all natural products, anti-age products, products with new ingredients, products with sun screen, products for specific pre-defined demographic groups, products associated with a brand or products at similar price level.

9. The method of claim 1 wherein the graphical markers include graphical icons for a plurality of different types of personal shoppers for a plurality of different age groups for both male and female personal shoppers.

10. The method of claim 1 wherein the consumer products include books, music, consumer electronics, tools, clothing, shoes, personal care products including skin care, personal cleansing, hair care, hair styling aids and hair colorants, feminine care products, male care products, baby care products, food products, groceries, and cleaning products.

11. The method of claim 1 wherein the consumer products include a plurality of products for pets or other animals.

12. The method of claim 1 wherein the customized MRM digital image comprises a web-site used on another cloud server network device on the cloud communications network.

13. The method of claim 1 wherein the customized MRM digital image comprises an advertising platform available on internet television services, search engine services and/or social networking services via the cloud communications network.

14. The method of claim 1 wherein the graphical shopping purchase object includes a graphical shopping cart or a graphical shopping bag.

15. The method of claim 1 wherein the cloud communications network includes wired or wireless connections between the target network device and the cloud server network device.

16. A non-transitory computer readable medium having stored therein a plurality of instructions for causing one or more processors to execute a processor implemented method including steps comprising:

creating with a cloud application in a non-transitory computer readable medium on a cloud server network device with one or more processors connected to a cloud communications network, a first set of a plurality of vector images from a plurality of corresponding raster images of a set of consumer products, wherein the created first set of the plurality of vector images include selected ones of the created first set of the plurality of vector images created at different views of the set of consumer products and also include other selected ones of the created first set of the plurality of vector images created at varying levels of detail from general details to specific details for the set of consumer products;

creating with the cloud application a second set of a plurality of vector images for pre-determined groups of the set of consumer products comprising a plurality of visual overlays;

adding with the cloud application a first set of electronic links to individual vector images in the created first set of the plurality of vector images, wherein only selected ones of electronic links from the first set of electronic links added to an individual vector image are visible and displayable when the individual vector image for an individual consumer product from the set of consumer products is displayed;

adding with the cloud application a second set of electronic links to the created second set of the plurality of vector images for the created plurality of visual overlays, wherein only selected ones of electronic links from the second set of electronic links added to the individual vector image are visible and displayable when the individual vector image for an individual visual overlay from the created plurality of visual overlays is displayed;

creating with the cloud application a multi-resolution mosaic (MRM) digital image stored in one or more cloud storage objects in a progressive resolution format for a pre-determined display layout of the set of consumer products with the created first set and the created second set of the plurality of vector images and the added first and the added second sets of electronic links, wherein the created MRM digital image includes an layered vector image hierarchy of the created first set and the created second set of the plurality of vector images and wherein the layered vector image hierarchy includes selected ones of vector images from the created first set of the plurality of vector images displaying the general details for the set of consumer products at a first set of highest levels in the layered vector image hierarchy and other selected ones of vector images from the created first set of the plurality of vector images displaying the specific details for the set of consumer products at lowest levels in the layered hierarchy and selected ones from the created second set of the plurality of vector images displaying the created plurality of visual overlays of varying level of details from the general details to specific details for the pre-determined groups of the set of consumer products at a second set of highest levels in the layered vector image hierarchy;

displaying with the cloud application the created MRM digital image with a progressive resolution display from the one or more cloud storage objects via the cloud communications network to allow virtual shopping via the cloud communications network, thereby creating a seller customized on-line store of the set of consumer products with the created MRM digital image;

displaying with the cloud application from the one or more cloud storage objects the created MRM digital image with the progressive resolution display of the set of consumer products with the created plurality of vector images in the layered vector image hierarchy, the progressive resolution display including displaying, zooming in and zooming out on selected portions of the created MRM digital image and displaying selected ones of the added first set or second set of electronic links in the plurality of vector image layers and allowing linking to one or more sets of electronic information from different vector image layers in the plurality of vector image layers during the progressive resolution display of the created MRM digital image, wherein the progressive resolution display of the created MRM digital image displays only the selected ones of electronic links added to a vector image layer currently being viewed in the created MRM digital image, wherein varying from general electronic information to specific electronic information as lower layers are viewed in the plurality of vector image layers;

displaying with the cloud application from the one or more cloud storage objects with the progressive resolution display of the created MRM digital image the created plurality of vector images in the plurality of vector image layers without converting any of the created plurality of vector images to another format or downloading any raster images associated with the created plurality of vector images over the cloud communications network;

displaying with the cloud application from the one or more cloud storage objects a graphical product selection tool via the cloud communications network;

receiving one or more selection inputs on the graphical product selection tool from a target network device with one or more other processors on the cloud application on the cloud server network device via the cloud communications network to select one or more consumer products in the set of consumer products from the created MRM digital image;

creating from the graphical product selection tool on the cloud application on the cloud server network device on the created plurality of vector images from the created MRM digital image a plurality of graphical markers and a plurality of new electronic links for the selected one or more consumer products received in the one or more selection inputs, thereby creating a further seller customized on-line store of the selected one or more consumer products as a customized MRM digital image;

storing with the cloud application in the one or more cloud storage objects the customized MRM digital image;

displaying with the cloud application on the cloud server network device from the one or more cloud storage objects in the progressive resolution display, the customized MRM digital image with the plurality of graphical markers and the plurality of new electronic links created with the graphical product selection tool on the created plurality of vector images and on the customized MRM digital image on the target network device via the cloud communications network;

receiving one or more second selection inputs from the target network device on the cloud application on the cloud server network device via the cloud communications network to purchase a desired set of one or more consumer products from the customized MRM digital image; and displaying on the target network device from the cloud application on the cloud server network device from the one or more cloud storage objects in a graphical shopping purchase object, vector images of the desired set of one or more selected consumer products including the plurality of graphical markers and the plurality of new electronic links at the lowest levels in the layered hierarchy of the customized MRM digital image and allowing progressive resolution display from the lowest levels in the layered hierarchy back up to the highest levels layered hierarchy and back down to the lowest levels in the layered hierarchy in the customized MRM digital image directly from the graphical shopping purchase object, the progressive resolution display also allowing a new or different second desired set of consumer products from the set of consumer products to be selected directly from the graphical shopping purchase object.

17. A system for displaying and managing products in a virtual display environment on a cloud communications network, comprising in combination:

a cloud communications network;

a graphical shopping purchase object on a non-transitory computer readable medium on a cloud server network device with one or more processors providing progressive resolution display of multi-layer digital images stored on the graphical shopping purchase object;

a cloud application on the non-transitory computer readable medium on the cloud server network device with the one or more processors connected to the cloud communications network, the cloud application on the cloud server network device configured:

for creating with the cloud application in the non-transitory computer readable medium on the cloud server network device with the one or more processors connected to the cloud communications network, a first set of a plurality of vector images from a plurality of corresponding raster images of a set of consumer products, wherein the created first set of the plurality of vector images include selected ones of the created first set of the plurality of vector images created at different views of the set of consumer products and also include other selected ones of the created first set of the plurality of vector images created at varying levels of detail from general details to specific details for the set of consumer products;

for creating with the cloud application a second set of a plurality of vector images for pre-determined groups of the set of consumer products comprising a plurality of visual overlays;

for adding with the cloud application a first set of electronic links to individual vector images in the created first set of the plurality of vector images, wherein only selected ones of electronic links from the first set of electronic links added to an individual vector image are visible and displayable when the individual vector image for an individual consumer product from the set of consumer products is displayed;

for adding with the cloud application a second set of electronic links to the created second set of the plurality of vector images for the created plurality of visual overlays, wherein only selected ones of electronic links from the second set of electronic links added to the individual vector image are visible and displayable when the individual vector image for an individual visual overlay from the created plurality of visual overlays is displayed;

for creating with the cloud application a multi-resolution mosaic (MRM) digital image stored in one or more cloud storage objects in a progressive resolution format for a pre-determined display layout of the set of consumer products with the created first set and the created second set of the plurality of vector images and the added first and the added second sets of electronic links, wherein the created MRM digital image includes an layered vector image hierarchy of the created first set and the created second set of the plurality of vector images and wherein the layered vector image hierarchy includes selected ones of vector images from the created first set of the plurality of vector images displaying the general details for the set of consumer products at a first set of highest levels in the layered vector image hierarchy and other selected ones of vector images from the created first set of the plurality of vector images displaying the specific details for the set of consumer products at lowest levels in the layered hierarchy and selected ones from the created second set of the plurality of vector images displaying the created plurality of visual overlays of varying level of details from the general details to specific details for the pre-determined groups of the set of consumer products at a second set of highest levels in the layered vector image hierarchy;

for displaying with the cloud application the created MRM digital image with a progressive resolution display from the one or more cloud storage objects via the cloud communications network to allow virtual shopping via the cloud communications network, thereby creating a seller customized on-line store of the set of consumer products with the created MRM digital image;

for displaying with the cloud application from the one or more cloud storage objects the created MRM digital image with the progressive resolution display of the set of consumer products with the created plurality of vector images in the layered vector image hierarchy, the progressive resolution display including displaying, zooming in and zooming out on selected portions of the created MRM digital image and displaying selected ones of the added first set or second set of electronic links in the plurality of vector image layers and allowing linking to one or more sets of electronic information from different vector image layers in the plurality of vector image layers during the progressive resolution display of the created MRM digital image, wherein the progressive resolution display of the created MRM digital image displays only the selected ones of electronic links added to a vector image layer currently being viewed in the created MRM digital image, wherein varying from general electronic information to specific electronic information as lower layers are viewed in the plurality of vector image layers;

for displaying with the cloud application from the one or more cloud storage objects with the progressive resolution display of the created MRM digital image the created plurality of vector images in the plurality of vector image layers without converting any of the created plurality of vector images to another format or downloading any raster images associated with the created plurality of vector images over the cloud communications network;

for displaying with the cloud application from the one or more cloud storage objects a graphical product selection tool via the cloud communications network;

for receiving one or more selection inputs on the graphical product selection tool from a target network device with one or more other processors on the cloud application on the cloud server network device via the cloud communications network to select one or more consumer products in the set of consumer products from the created MRM digital image;

for creating from the graphical product selection tool on the cloud application on the cloud server network device on the created plurality of vector images from the created MRM digital image a plurality of graphical markers and a plurality of new electronic links for the selected one or more consumer products received in the one or more selection inputs, thereby creating a further seller customized on-line store of the selected one or more consumer products as a customized MRM digital image;

for storing with the cloud application in the one or more cloud storage objects the customized MRM digital image;

for displaying with the cloud application on the cloud server network device from the one or more cloud storage objects in the progressive resolution display, the customized MRM digital image with the plurality of graphical markers and the plurality of new electronic links created with the graphical product selection tool on the created plurality of vector images and on the customized MRM digital image on the target network device via the cloud communications network;

for receiving one or more second selection inputs from the target network device on the cloud application on the cloud server network device via the cloud communications network to purchase a desired set of one or more consumer products from the customized MRM digital image; and for displaying on the target network device from the cloud application on the cloud server network device from the one or more cloud storage objects in a graphical shopping purchase object, vector images of the desired set of one or more selected consumer products including the plurality of graphical markers and the plurality of new electronic links at the lowest levels in the layered hierarchy of the customized MRM digital image and allowing progressive resolution display from the lowest levels in the layered hierarchy back up to the highest levels layered hierarchy and back down to the lowest levels in the layered hierarchy in the customized MRM digital image directly from the graphical shopping purchase object, the progressive resolution display also allowing a new or different second desired set of consumer products from the set of consumer products to be selected directly from the graphical shopping purchase object.

* * * * *